United States Patent [19]
Kubota et al.

[11] Patent Number: 6,014,352
[45] Date of Patent: Jan. 11, 2000

[54] OPTICAL STORAGE SYSTEM AND STORAGE MEDIUM STORING COPY PROCESSING PROGRAM

[75] Inventors: Hiromi Kubota; Ichizou Ohshika; Yuji Nomura; Masao Yamamoto, all of Kawasaki, Japan

[73] Assignee: Fujitsu Limited, Kawasaki, Japan

[21] Appl. No.: 08/878,531

[22] Filed: Jun. 19, 1997

[30] Foreign Application Priority Data

Dec. 5, 1996 [JP] Japan .................................... 8-325161

[51] Int. Cl.⁷ .................................................. G11B 17/22
[52] U.S. Cl. ........................................ 369/34; 364/478.02
[58] Field of Search .................................. 369/34, 84, 36, 369/37, 38, 41, 83; 364/478.02, 478.11; 711/111; 300/15

[56] References Cited

U.S. PATENT DOCUMENTS

| | | |
|---|---|---|
| 4,494,156 | 1/1985 | Kadison et al. . |
| 4,672,554 | 6/1987 | Hirokazu . |
| 4,794,467 | 12/1988 | Yoshikazw et al. . |
| 5,287,459 | 2/1994 | Gniewek .................... 711/111 |
| 5,412,791 | 5/1995 | Martin et al. .............. 369/34 |
| 5,623,471 | 4/1997 | Prigge ........................ 369/84 |
| 5,640,535 | 6/1997 | Suzuki et al. ............. 369/34 |

FOREIGN PATENT DOCUMENTS 22 74 193   7/1994   United Kingdom .

*Primary Examiner*—Tan Dinh
*Attorney, Agent, or Firm*—Staas & Halsey LLP

[57] ABSTRACT

An MO drive apparatus and an MO library apparatus are connected to an upper apparatus through device buses. A copy processing module of the upper apparatus copies storage contents of a medium of a copy source apparatus to a medium of a copy destination apparatus. When check regions provided for apparatus graphics of a plurality of apparatuses serving as targets to be accessed are clicked, a confirmation processing module of the upper apparatus sends a check command to the corresponding apparatus and flickers a display lamp, thereby allowing the user to confirm. A system construction can be arbitrarily set by a connection and a disconnection using the apparatus graphics.

51 Claims, 60 Drawing Sheets

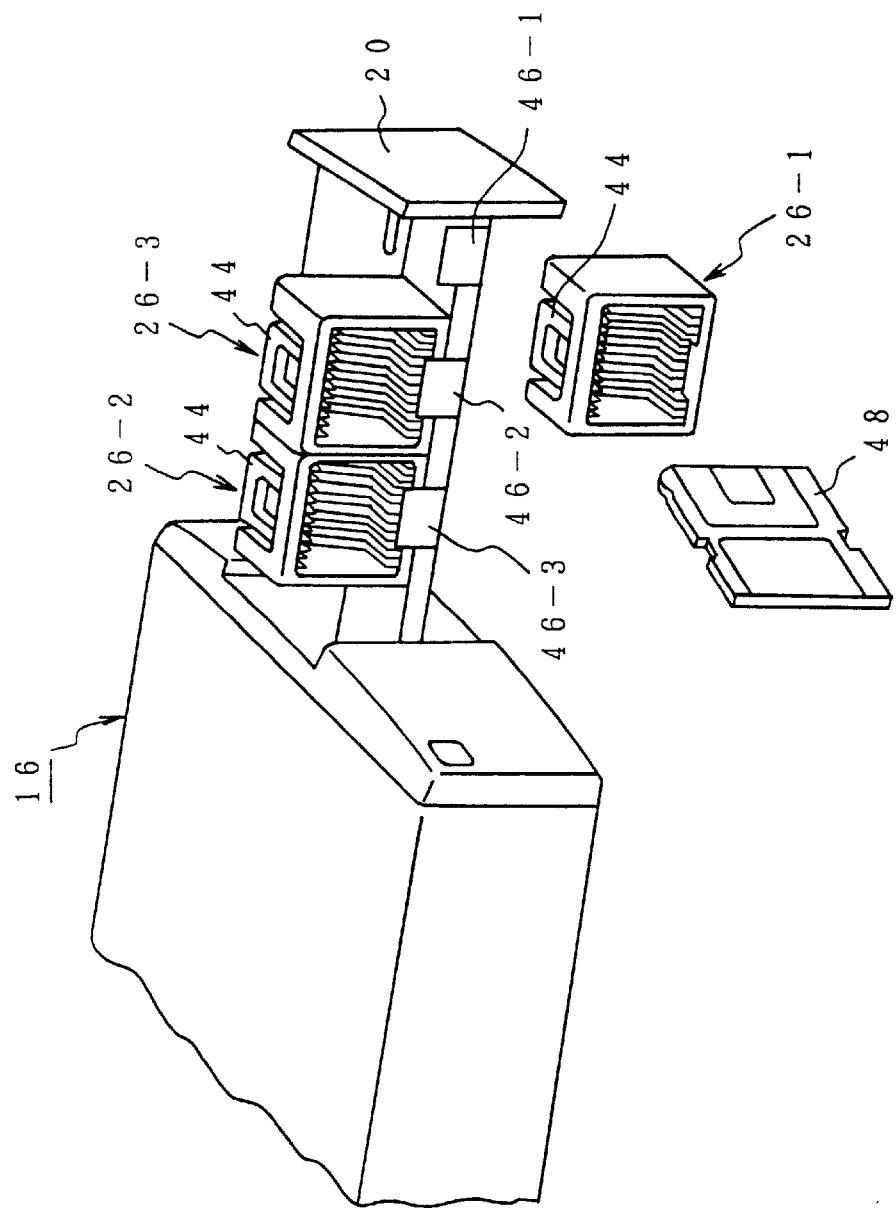

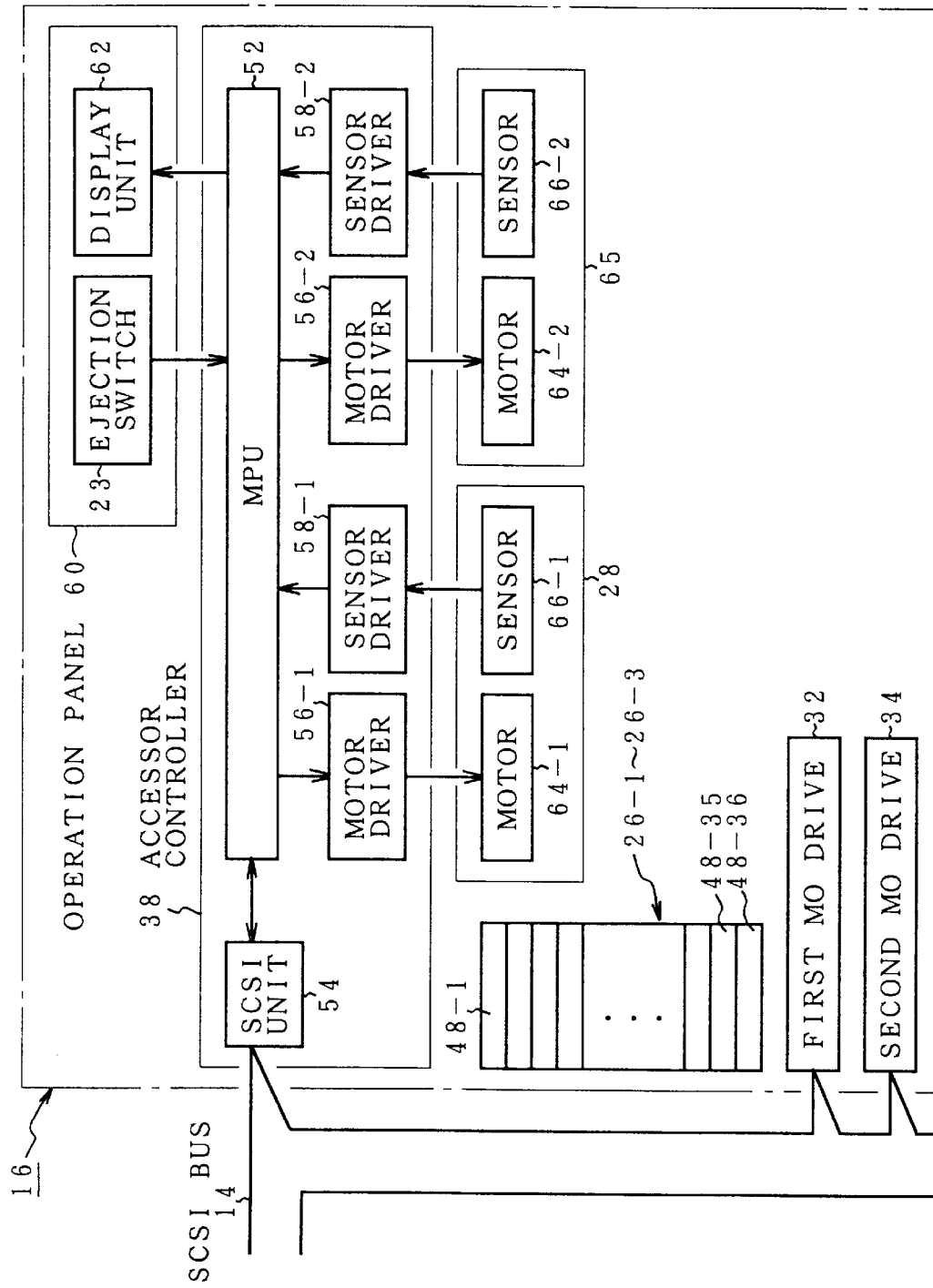

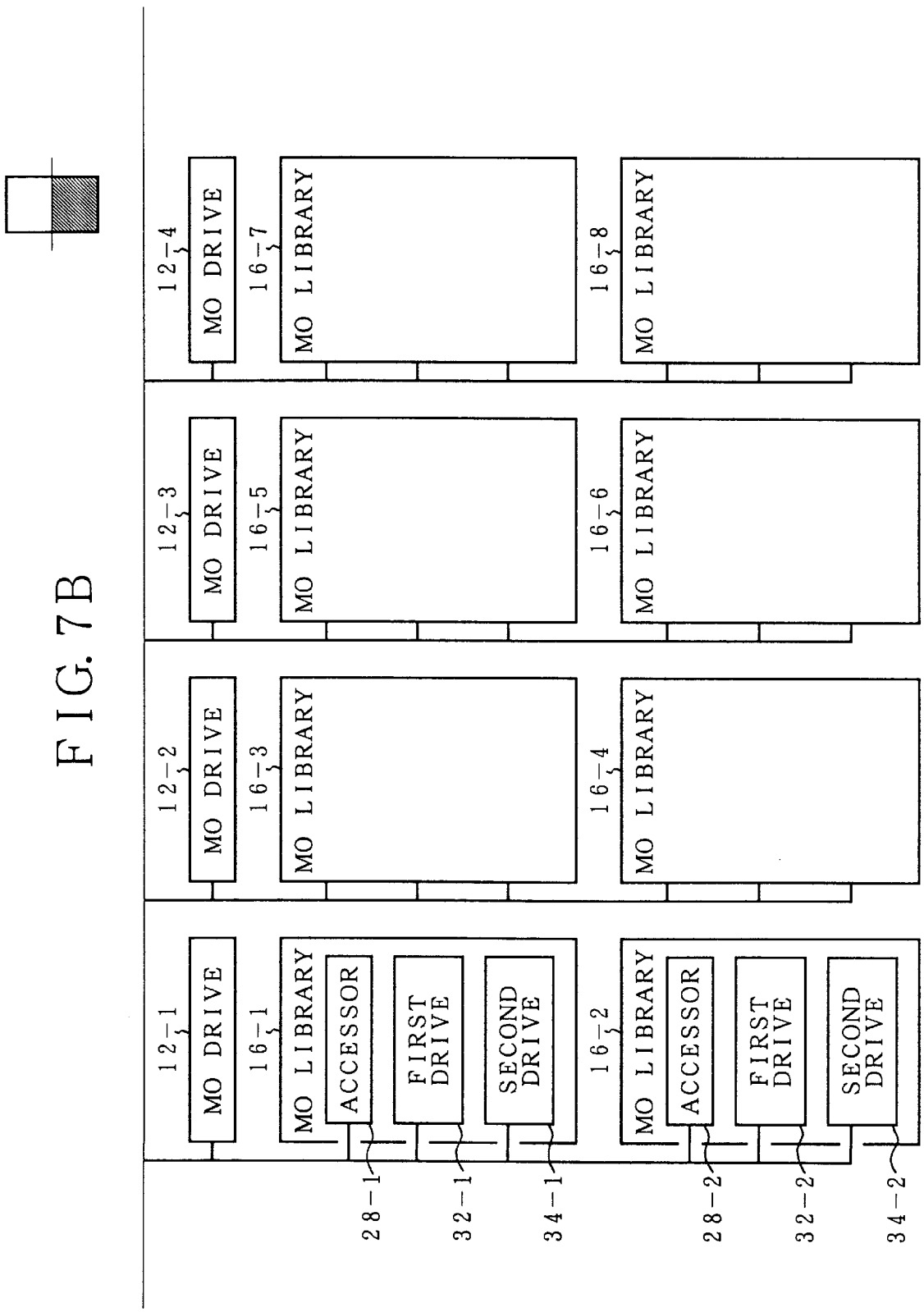

FIG. 10A

| 98 | 100 | 102 | 104 |
|---|---|---|---|
| MOVE | DEVICE ADDRESS HHDD | MOVEMENT SOURCE ADDRESS FROM-ADDR | MOVEMENT DESTINATION ADDRESS TO-ADDR |

FIG. 10B

| NAME | ELEMENT NO. |
|---|---|
| FIRST DRIVE | 0 0 |
| SECOND DRIVE | 0 1 |
| SLOT 0 1 | 0 2 |
| SLOT 0 2 | 0 3 |
| SLOT 0 3 | 0 4 |
| ⋮ | ⋮ |
| SLOT 3 4 | 3 6 |
| SLOT 3 5 | 3 7 |

FIG. 11

| GROUP | DEVICE NAME | | DEVICE ADAPTER | | REMARKS |
|---|---|---|---|---|---|
| | | | SCSI HOST ADAPTER NO. HH | SCSI DEVICE ADAPTER NO. DD | |
| G0 | MO DRIVE #0 | | 0 0 | 0 1 | MASTER |
| | MO LIBRARY #0 | ACCESSOR | 0 0 | 0 2 | |
| | | FIRST DRIVE | 0 0 | 0 3 | MASTER |
| | | SECOND DRIVE | 0 0 | 0 4 | MASTER |
| | MO LIBRARY #1 | ACCESSOR | 0 0 | 0 5 | |
| | | FIRST DRIVE | 0 0 | 0 6 | |
| | | SECOND DRIVE | 0 0 | 0 7 | |
| G1 | MO DRIVE #1 | | 0 1 | 0 1 | |
| | MO LIBRARY #2 | ACCESSOR | 0 1 | 0 2 | |
| | | FIRST DRIVE | 0 1 | 0 3 | |
| | | SECOND DRIVE | 0 1 | 0 4 | |
| | MO LIBRARY #3 | ACCESSOR | 0 1 | 0 5 | |
| | | FIRST DRIVE | 0 1 | 0 6 | |
| | | SECOND DRIVE | 0 1 | 0 7 | |

FIG. 12

| GROUP | DEVICE NAME | | DEVICE ADAPTER | | REMARKS |
|---|---|---|---|---|---|
| | | | SCSI HOST ADAPTER NO. HH | SCSI DEVICE ADAPTER NO. DD | |
| G2 | MO DRIVE #2 | | 02 | 01 | |
| | MO LIBRARY #4 | ACCESSOR | 02 | 02 | |
| | | FIRST DRIVE | 02 | 03 | |
| | | SECOND DRIVE | 02 | 04 | |
| | MO LIBRARY #5 | ACCESSOR | 02 | 05 | |
| | | FIRST DRIVE | 02 | 06 | |
| | | SECOND DRIVE | 02 | 07 | |
| G3 | MO DRIVE #3 | | 03 | 01 | |
| | MO LIBRARY #6 | ACCESSOR | 03 | 02 | |
| | | FIRST DRIVE | 03 | 03 | |
| | | SECOND DRIVE | 03 | 04 | |
| | MO LIBRARY #7 | ACCESSOR | 03 | 05 | |
| | | FIRST DRIVE | 03 | 03 | |
| | | SECOND DRIVE | 03 | 04 | |

FIG. 13A

| 106 | 108 | 110 |
|---|---|---|
| READ | DEVICE ADDRESS HHDD | SECTOR NUMBER |

FIG. 13B

| 112 | 114 | 116 | 118 |
|---|---|---|---|
| WRITE | DEVICE ADDRESS HHDD | SECTOR NUMBER | SECTOR DATA |

FIG. 16

```
                                                    125
┌─────────────────────────────────────────────────────┐
│ ☐    BASIC SYSTEM CONSTRUCTION COPY                 │
│      INFORMATION SET PICTURE PLANE                  │
├─────────────────────────────────────────────────────┤
│                                                     │
│   135─☐ SET MASTER APPARATUS TO MO DRIVE            │
│   145─☐ SET MASTER APPARATUS TO MO LIBRARY          │
│   154─☐ CHECK MEDIA CAPACITY                        │
│   156─☐ COPY AND VERIFY                             │
│                                                     │
│                                                     │
│        158─┤  OK   │      │ CANCEL ├─160            │
│                                                     │
└─────────────────────────────────────────────────────┘
```

| | MO LIBRARY #0 SHELF INFORMATION | | | | | | | |
|---|---|---|---|---|---|---|---|---|
| SLOT NO. | SIZE | WP | SLOT NO. | SIZE | WP | SLOT NO. | SIZE | WP |
| 0 1 | ● | | 1 2 | | | 2 4 | | |
| 0 2 | ● E | | 1 3 | | | 2 5 | | |
| 0 3 | ● 1 2 8MB | | 1 4 | | | 2 6 | | D 1 |
| 0 4 | | | 1 5 | | | 2 7 | | D 2 |
| 0 5 | | | 1 6 | | | 2 8 | | |
| 0 6 | | | 1 7 | ● | * | 2 9 | | |
| 0 7 | | | 1 8 | | | 3 0 | | |
| 0 8 | | | 1 9 | | | 3 1 | | |
| 0 9 | | | 2 0 | ● CLN | | 3 2 | | |
| 1 0 | | | 2 1 | | | 3 3 | | |
| 1 1 | | | 2 2 | | | 3 4 | | |
| | | | 2 3 | | | 3 5 | | |

SLOT NO. ● : EXIST
WP   * : WRITE PROTECT
      E : SIZE ERROR

| CONFIRM | ~178

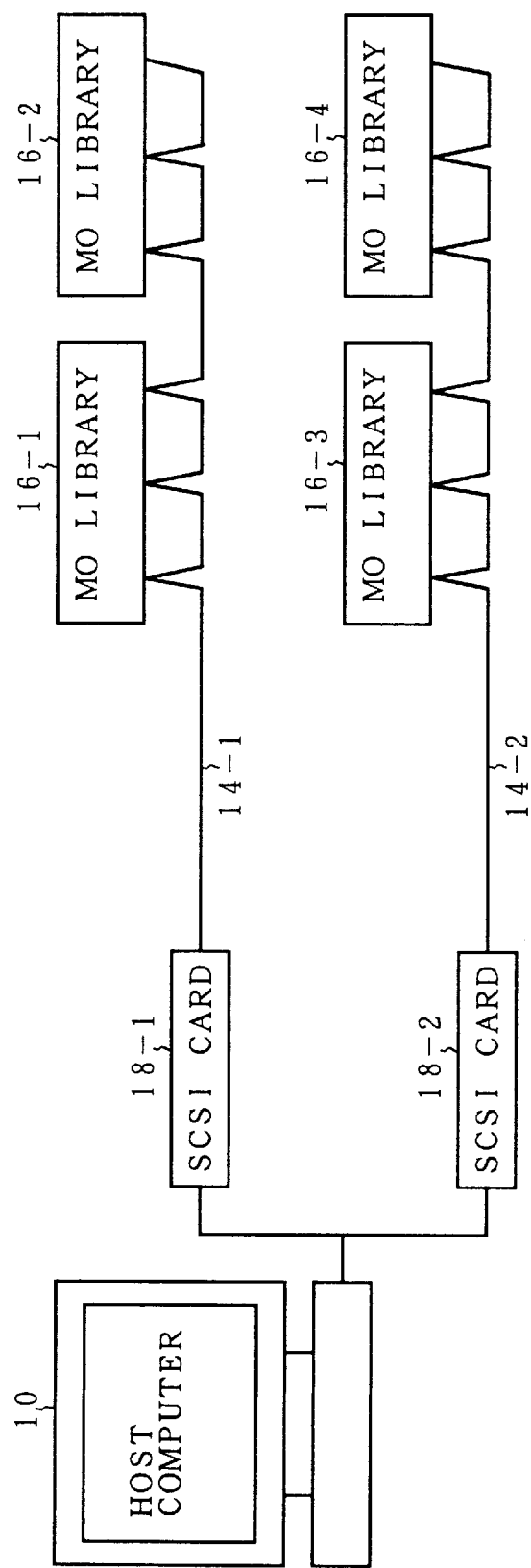

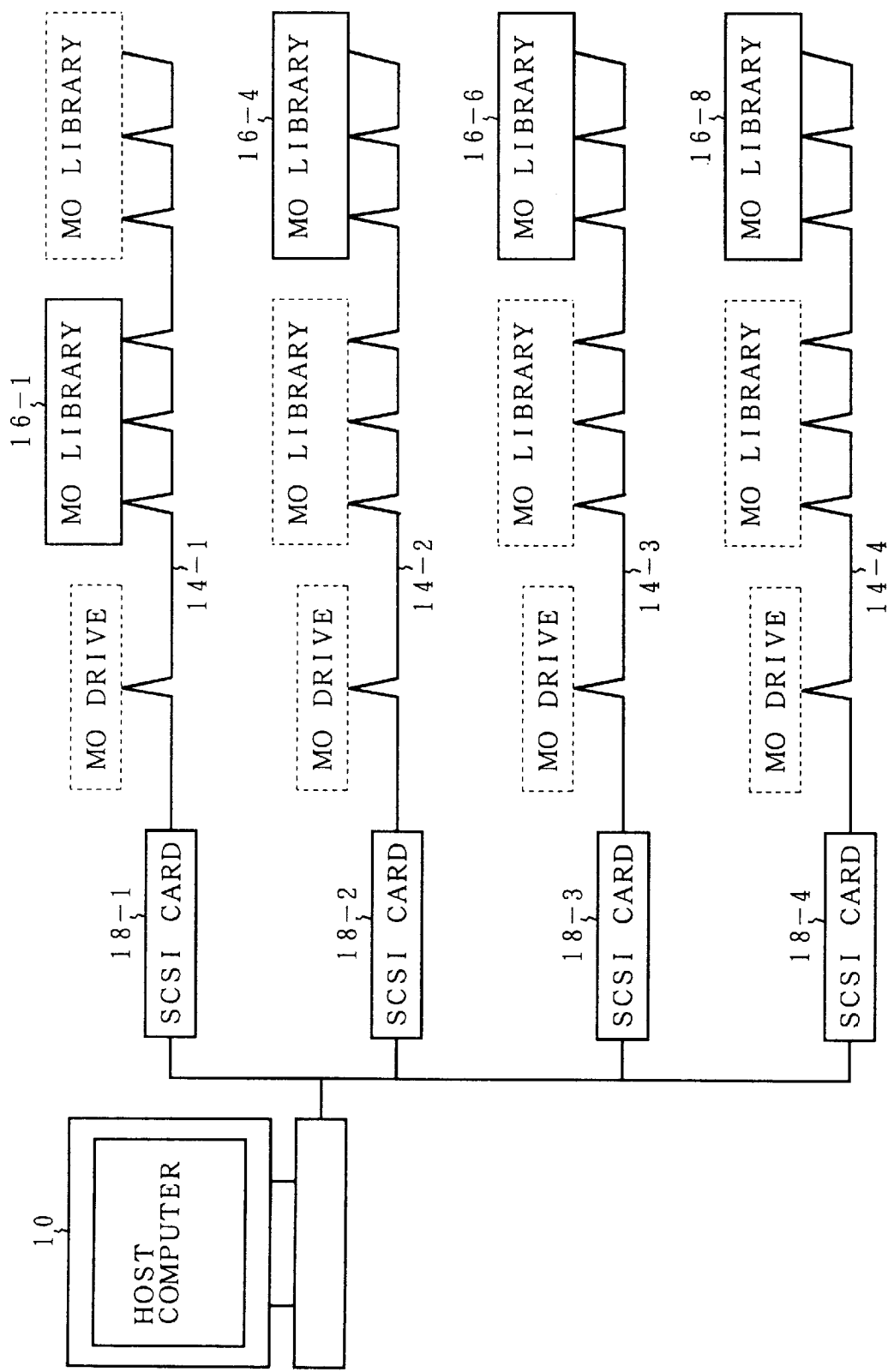

FIG. 30

BASIC SYSTEM CONSTRUCTION COPY INFORMATION SET PICTURE PLANE — 175

126 — SETTING OF COPY UNIT
- 128 ☐ SECTOR COPY  ☐ FILE COPY
- 130

132 — COPY GROUP
- 134 ☐ COPY IN GROUP  ☐ COPY IN/OUT OF GROUP
- 136

138 — SETTING OF COPY SOURCE
- G0 ☐ MO DRIVE #0   ☐ MO DRIVE #0   ☐ MO DRIVE #1
- G1 ☐ MO DRIVE #1   ☐ MO DRIVE #2   ☐ MO DRIVE #3
- G2 ☐ MO DRIVE #2   ☐ MO DRIVE #4   ☐ MO DRIVE #5
- G3 ☐ MO DRIVE #3   ☐ MO DRIVE #6   ☐ MO DRIVE #7

140 — SETTING OF COPY DESTINATION
- G0 ☐ MO DRIVE #0   ☐ MO DRIVE #1
- G1 ☐ MO DRIVE #2   ☐ MO DRIVE #3
- G2 ☐ MO DRIVE #4   ☐ MO DRIVE #5
- G3 ☐ MO DRIVE #6   ☐ MO DRIVE #7

142 — THE NUMBER OF COPY SOURCES
- ☐☐ COPIES   ☐ ALL
- 144         146

148 — THE NUMBER OF COPY DESTINATIONS
- ☐☐ COPIES   ☐ ALL
- 150         152

154 — ☐ CHECK CAPACITY OF MEDIUM

156 — ☐ COPY AND VERIFY

158 [ OK ]   [ CANCEL ] 160

FIG. 31

| | BASIC SYSTEM CONSTRUCTION COPY INFORMATION SET PICTURE PLANE | ▽ △ |

175

126 — SETTING OF COPY UNIT
128—■ SECTOR COPY     □ FILE COPY

132 — COPY GROUP
134—■ COPY IN GROUP     □ COPY IN/OUT OF GROUP

138 — SETTING OF COPY SOURCE
G0  ■ MO DRIVE #0    □ MO DRIVE #0    □ MO DRIVE #1
G1  □ MO DRIVE #1    □ MO DRIVE #2    □ MO DRIVE #3
G2  □ MO DRIVE #2    □ MO DRIVE #4    □ MO DRIVE #5
G3  □ MO DRIVE #3    □ MO DRIVE #6    □ MO DRIVE #7

140 — SETTING OF COPY DESTINATION
G0  ■ MO DRIVE #0    □ MO DRIVE #1
G1  □ MO DRIVE #2    □ MO DRIVE #3
G2  □ MO DRIVE #4    □ MO DRIVE #5
G3  □ MO DRIVE #6    □ MO DRIVE #7

142 — THE NUMBER OF COPY SOURCES
[□□] COPIES    □ ALL

148 — THE NUMBER OF COPY DESTINATIONS
[□□] COPIES    ■ ALL
                152

154 — □ CHECK CAPACITY OF MEDIUM

156 — □ COPY AND VERIFY

158—[ OK ]     [ CANCEL ]—160

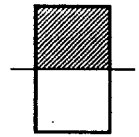
FIG. 33A
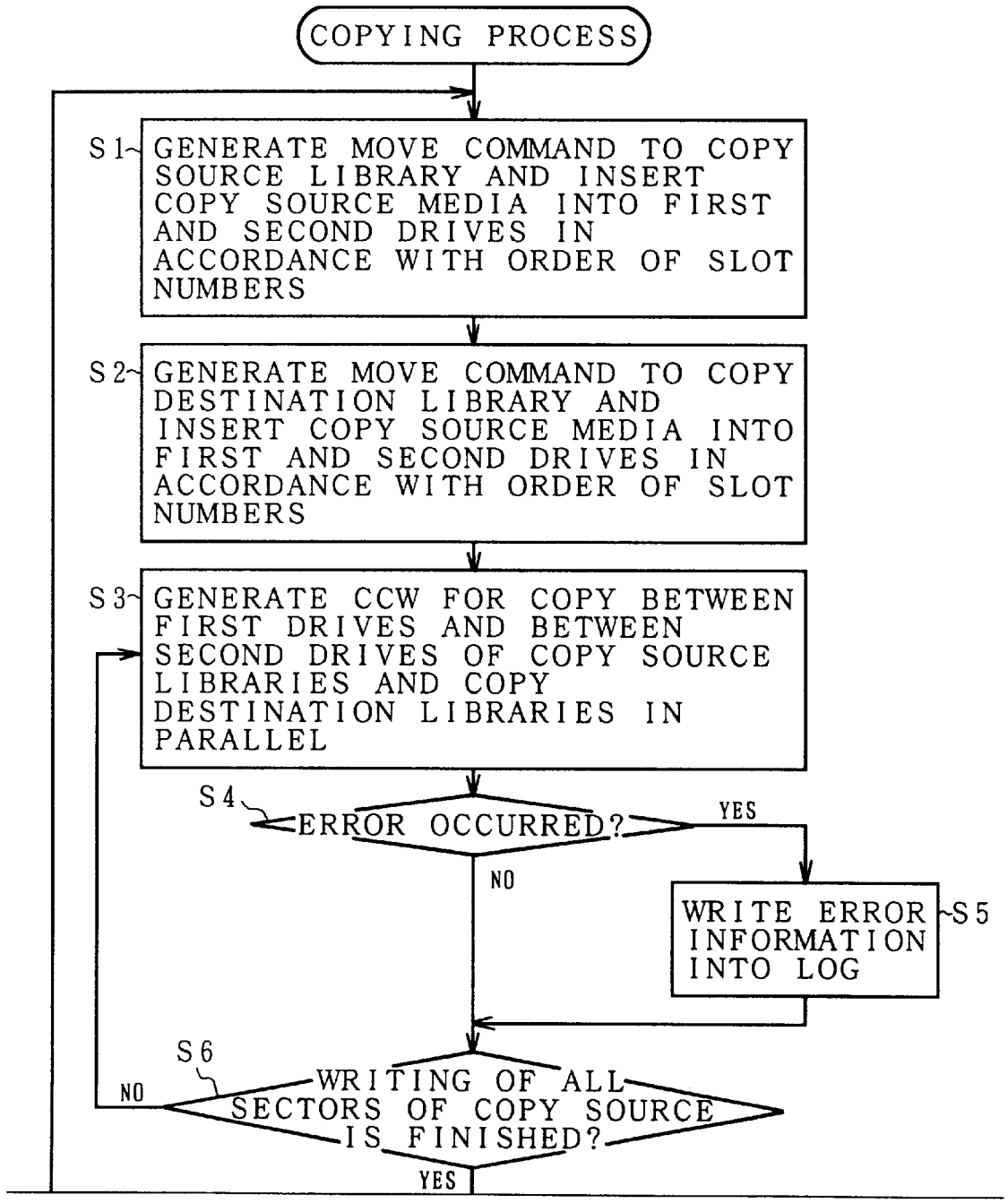

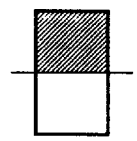
FIG. 34A
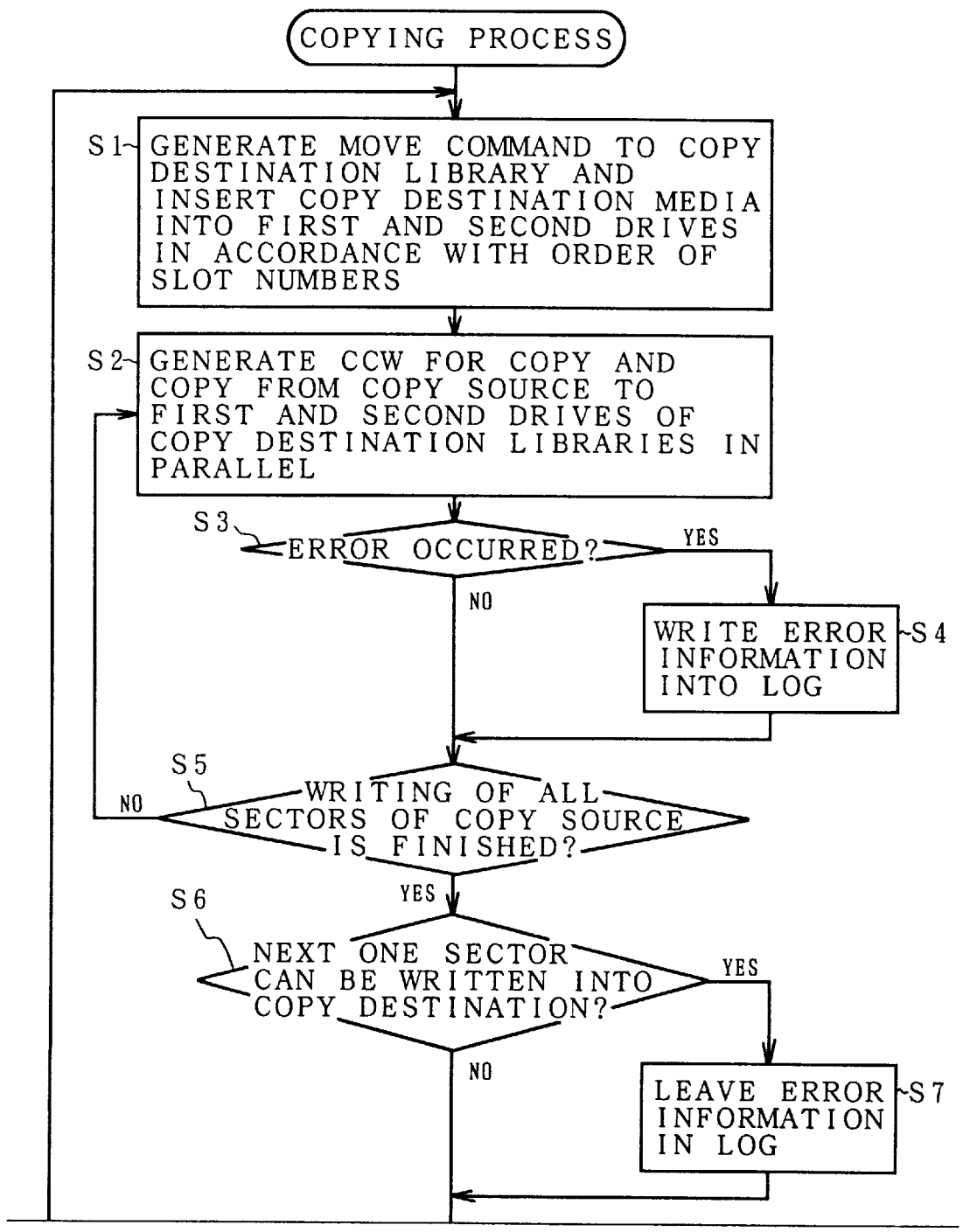

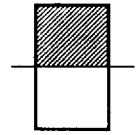
FIG. 38A
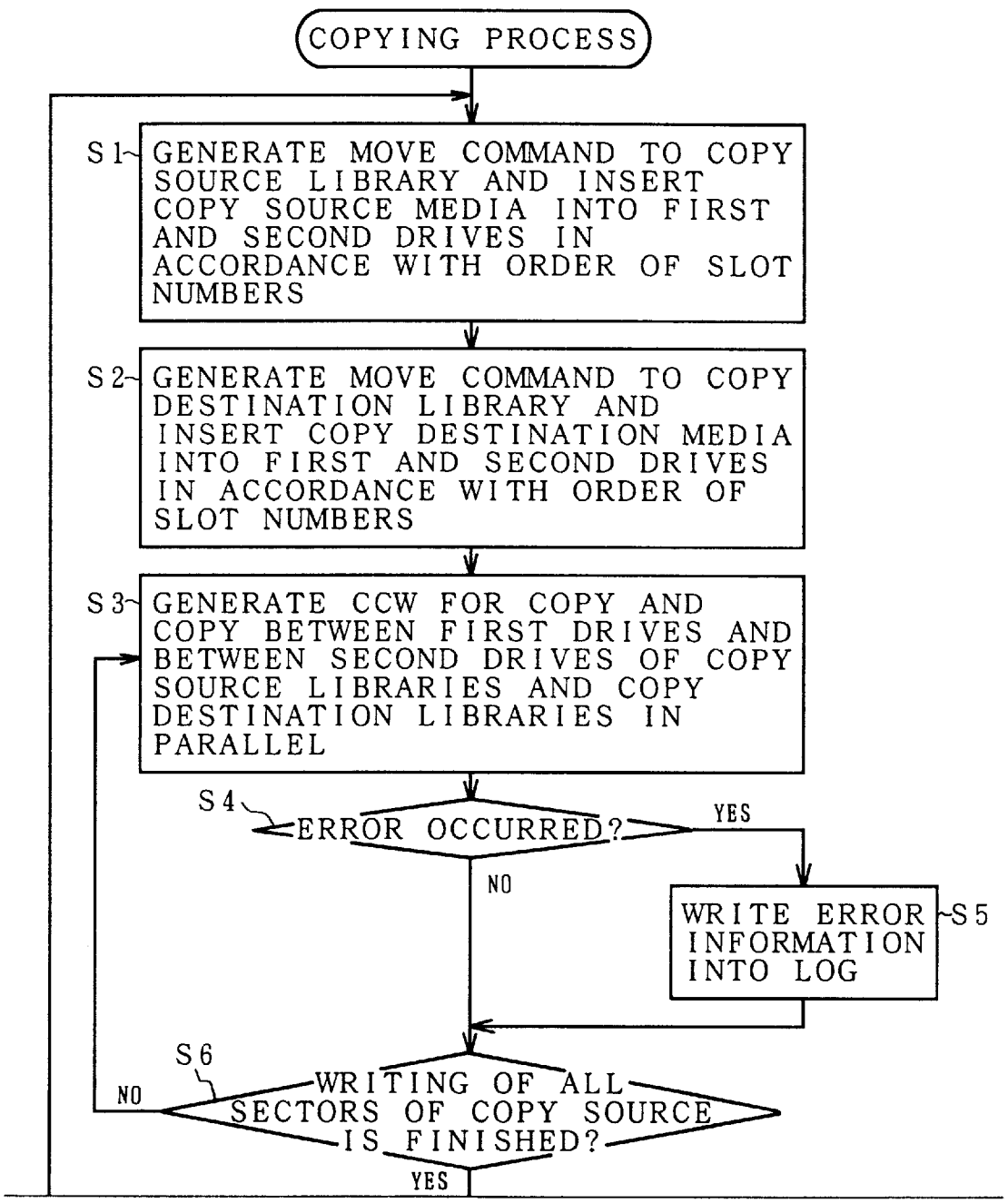

FIG. 41B
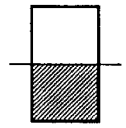
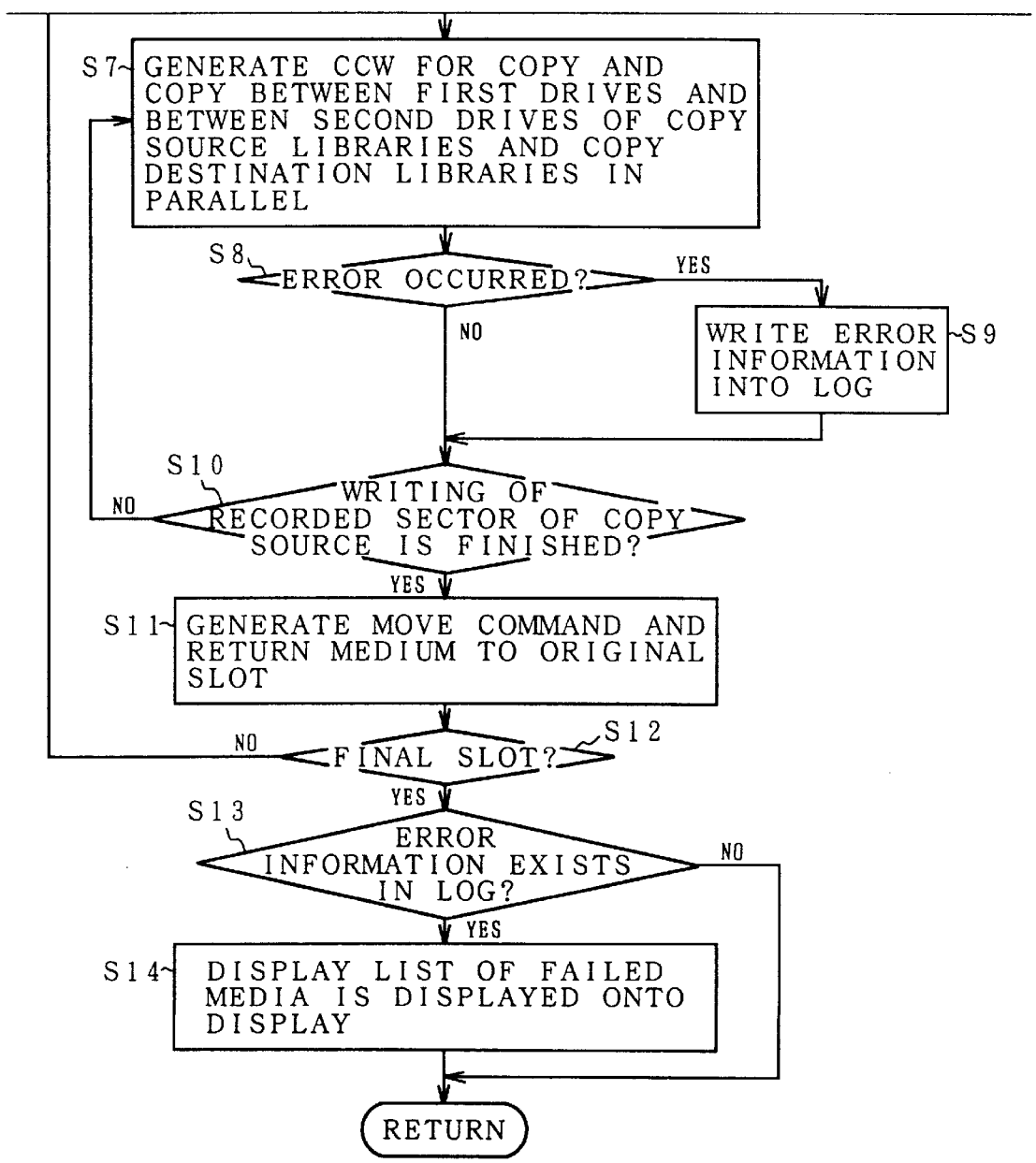

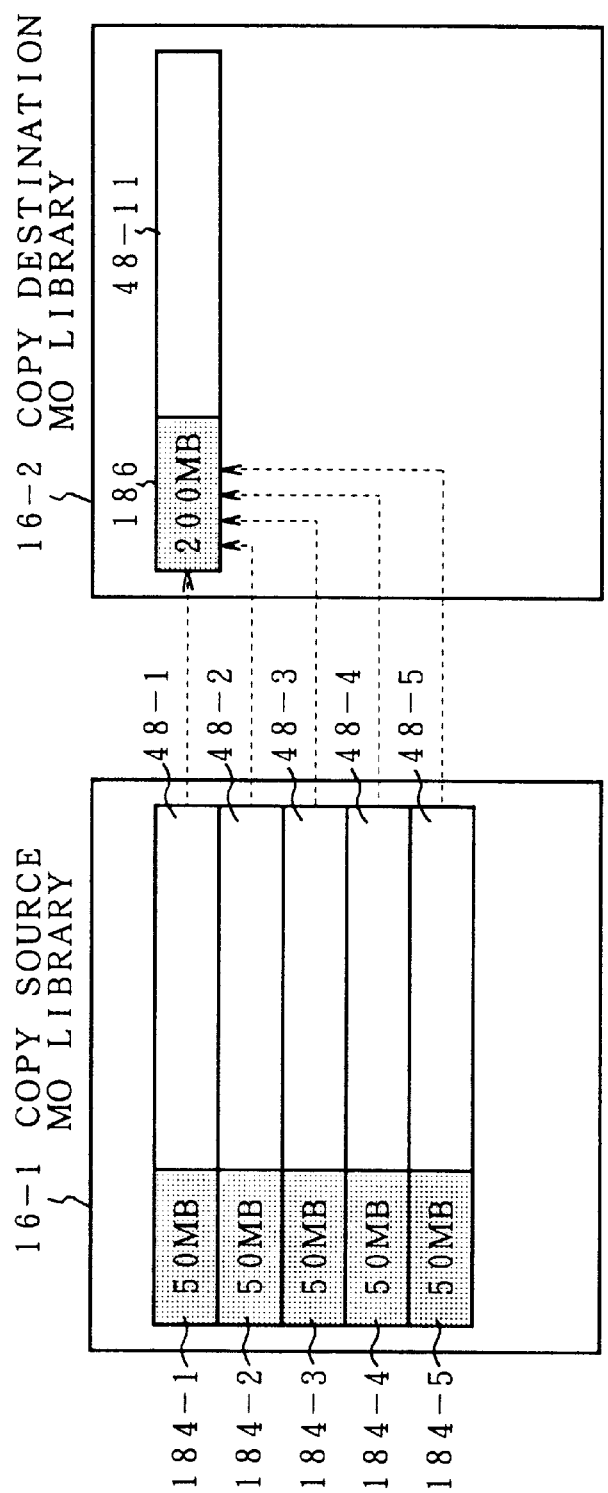

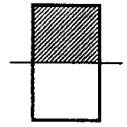
FIG. 44A
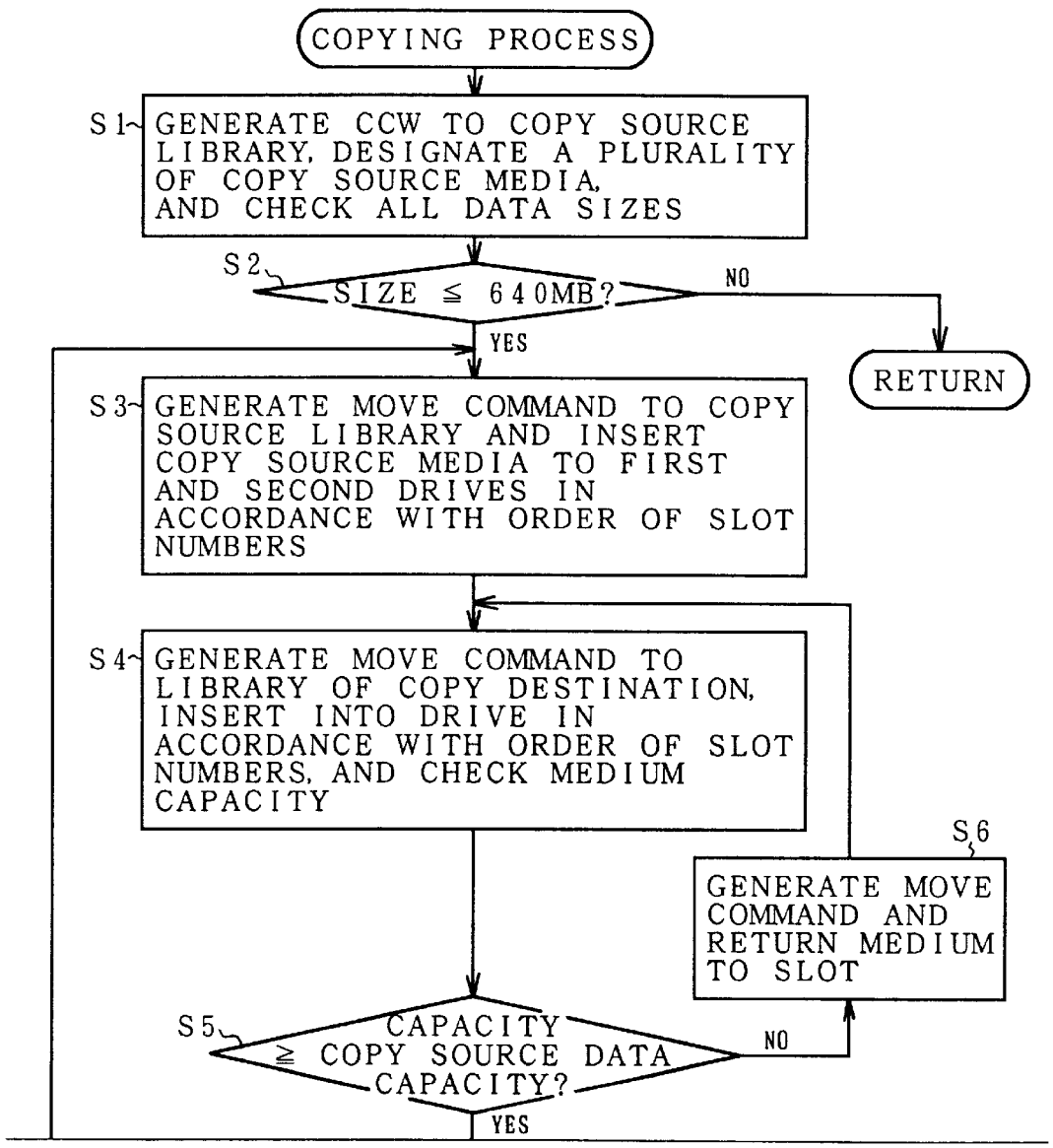

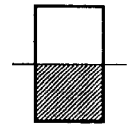
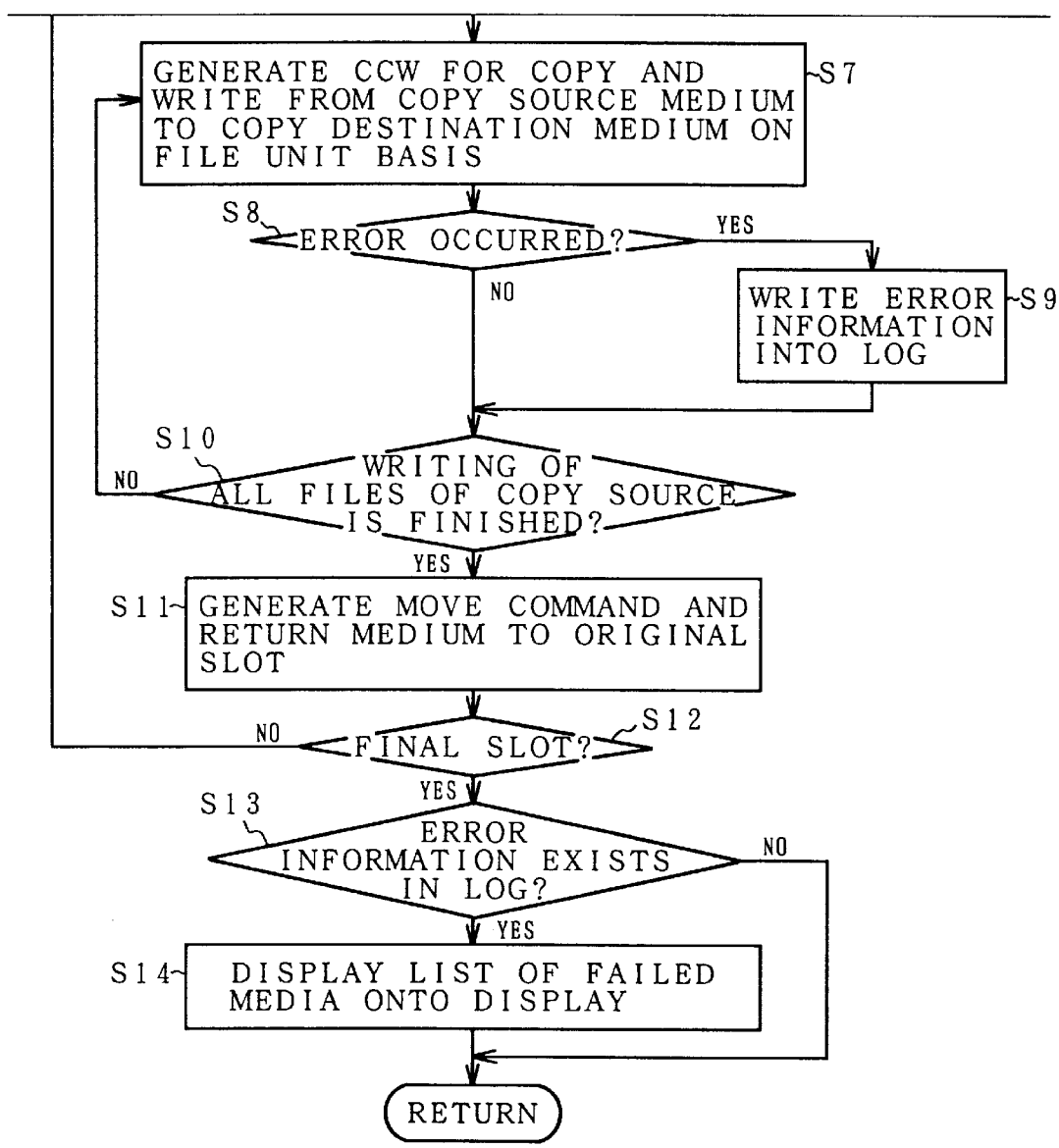
FIG. 44B

OPTICAL STORAGE SYSTEM AND STORAGE MEDIUM STORING COPY PROCESSING PROGRAM

BACKGROUND OF THE INVENTION

1. Technical Field of the Invention

The present invention relates to an optical disk storage system for storing information into an optical disk medium cartridge by using an optical disk drive and an optical disk library apparatus and to a storage medium in which a copy processing program of the optical disk storage system has been stored. More particularly, the invention relates to an optical storage system functioning as a duplicator for forming a large amount of copies of a copy source medium cartridge and to a storage medium in which a copy processing program has been stored.

2. Description of Related Art

Optical disks have the advantage of a large capacity exceeding 200 MB, and can be formed as a cartridge so as to enable a medium to be moved between different optical disk drive. The advantage have been recently exploited in the environment of Windows or an environment using software of a large scale. In recent years, in association with an appearance of an optical disk drive of 3.5 inches, costs are reduced and an accessing speed is improved, so that a performance equivalent to a standard hard disk drive (HDD) of one generation ago can be obtained. However, since a single optical disk cartridge has a limitation in a storage capacity, a desk-top type optical disk library apparatus in which a plurality of optical disk cartridges are enclosed in the apparatus, a necessary optical disk cartridge is picked up and loaded into an optical disk drive by a robot hand, and the recording and reproduction are executed has been proposed. In recent years, there is a copy work for forming a large quantity of copies of the optical disk cartridge by using such an optical disk library apparatus. For example, when secret data which is not adapted to be held in an on-line manner is distributed from a main office to a plurality of branches, a large quantity of copies of the secret data are formed by using the library apparatus. For such a copy work using the library apparatus, an optical disk drive apparatus (hereinbelow, called an "MO drive apparatus") and an optical disk library apparatus (hereinbelow, called an "MO library apparatus") are connected to a personal computer functioning as a host via a device bus such as an SCSI or the like. An optical disk cartridge (hereinbelow, referred to an "MO cartridge" which is an abbreviation of a magnetooptic cartridge) as a copy source is inserted into the MO drive apparatus, a plurality of MO cartridges as copy destinations are inserted into the MO library apparatus, and a continuous copy from the copy source cartridge to a copy destination cartridge is executed.

SUMMARY OF THE INVENTION

When a number of MO drive apparatuses and MO library apparatuses are controlled by one personal computer for a large quantity of copies, however, a relationship between apparatuses displayed on a picture plane and actual apparatuses is difficult to determine. Hence, even if the user recognizes a copy source apparatus and a copy destination apparatus on the picture plane, it is very difficult to determine into which apparatus the copy source MO cartridge and the copy destination MO cartridge should be inserted. The user, therefore, preliminarily confirms an ID of an SCSI bus connecting the apparatuses and recognizes the relationship between the apparatuses on the picture plane and the actual apparatuses by collating the ID with an environment setting file of copy software.

Conventional MO drive apparatus and MO library apparatus support three kinds of MO cartridges of 230 MB, 540 MB, and 640 MB. In the case of copying from an MO cartridge of the MO drive apparatus to an MO cartridge enclosed in the MO library apparatus by a conventional system, since an MO cartridge of the same capacity as that of the copy source MO cartridge has to be inserted into the copy destination MO library apparatus, there is an inconvenience such that the capacities have to be unified. As for the dissidence of the copy destination capacity, a copying process on a sector unit basis from the copy source MO cartridge to the copy destination MO cartridge is repeated and when it is found that the copy can be performed over a final sector, it is determined for the first time that the capacity doesn't coincide. Hence, it takes a very long time to find an error due to the difference between the cartridge capacities. Further, since the copy source capacity and the copy destination capacity have to be equal, for example, there is an inconvenience such that an error occurs even when the copy destination capacity is large. Further, the copying process is executed to all of the sectors in the conventional system irrespective of recording contents of the copy source MO cartridge. Since the copying process is executed with respect to even a vacant sector in which no data is recorded, there is a problem such that it takes time. Even when copy source data is small, a plurality of copy source cartridges cannot be copied to one copy destination cartridge. Further, in the conventional system, the copying process from an MO cartridge of the MO drive apparatus to a plurality of MO cartridges of the MO library apparatus is executed. When there are a plurality of copy sources, they have to be copied one by one, so that there is a problem such that it takes time to execute the process. Further, in the conventional system, a combination of the copy source and the copy destination is determined with respect to the MO drive apparatuses and MO library apparatuses which are actually connected to the personal computer. In order to change the combination of the copy source and the copy destination, the connecting construction of the apparatuses also has to be changed.

According to the invention, there are provided an optical storage system having a high degree of freedom which can efficiently execute a copying process in an optimum system format without being restricted by a difference between medium capacities and an installed state of apparatuses and a storage medium in which a copy processing program has been stored.

An optical storage system of the invention includes, for example one or a plurality of MO drive apparatuses (optical drive apparatuses) for processing a single mediums, and one or a plurality of MO library apparatuses (optical library apparatuses) each having a media enclosing unit in which a plurality of media have been enclosed. An optical drive unit for optically accessing the medium, and an accessor for conveying the medium between the media enclosing unit and the optical drive unit are also included. The MO drive apparatus and the MO library apparatus are connected to device buses of one or a plurality of systems such as an SCSI and the like which are led out from an upper apparatus. The upper apparatus has a copy processing module and storage contents of a medium of a preset copy source apparatus are copied to a medium of a preset copy destination apparatus. The upper apparatus also has a confirmation processing module. When apparatus graphics of a plurality of apparatuses serving as accessing targets of the copy processing module are arranged and displayed on a picture plane and a check region provided in each of the apparatus graphics is instructed on the picture plane, a check command is sent to a corresponding apparatus, thereby allowing an outputting operation for making the operator confirm the apparatus to be executed. The confirmation processing module drives a display lamp and an acoustic apparatus of the target apparatus, thereby allowing the operator to confirm the corresponding apparatus. With respect to the MO library apparatus, it is also possible to enable the operator to confirm the corresponding apparatus by driving the accessor. When the check region for confirming the apparatus provided for the apparatus graphics on the picture plane is clicked by a mouse, the actual MO library or MO drive apparatus responds by flickering the display lamp or the like. The user does not have to confirm the SCSI bus ID of the apparatus one by one and refer to the environment setting file or the like, so that the operability is improved.

In addition to the copy processing module, the upper apparatus further has a system construction control module and a copy information setting module. The system construction control module determines a system construction by a system connection and a system disconnection of an arbitrary storage apparatus according to necessity by operating a connection instructing region for connecting to a system provided in the apparatus graphics on the picture plane and a disconnection instructing region for disconnecting from the system. The copy information setting module sets copy information necessary to access the copy processing module for the system construction, as a target, determined by the system construction control module. The copy information setting module sets the copy information by automatically discriminating the copy source and the copy destination by the system construction determined by the system construction control module. An automatic setting method of the copy information is, for example, as follows.
Mode 1

In case of a system construction in which one MO drive apparatus and one or a plurality of MO library apparatuses are connected to one bus system, the MO drive apparatus is automatically set to a copy source and all of the MO library apparatuses are automatically set to copy destinations.
Mode 2

In case of a system construction in which one MO drive apparatus and one or a plurality of MO library apparatuses are connected to the same bus system, the MO drive apparatus is automatically set to a copy source and all of the MO library apparatuses are automatically set to copy destinations.
Mode 3

In case of a system construction in which one MO drive apparatus is connected to each of a plurality of bus systems and one or a plurality of MO library apparatuses are connected to each bus system, the MO drive apparatus is automatically set to a copy source every bus system and all of the MO library apparatuses are automatically set to copy destinations.
Mode 4

In case of a system construction in which only a plurality of MO library apparatuses are connected to different bus systems, MO library apparatuses of a predetermined specific bus are automatically set to a copy source and all of the other MO library apparatuses are automatically set to copy destinations.

When the MO library apparatus is set as a copy destination apparatus in the automatic setting of the copy source and copy destination, the copy information setting module sets all of the media enclosed in the MO library apparatus into copy destination media. By automatically determining the copy source and the copy destination according to the system construction format as mentioned above, an optimum system configuration of the copying process can be provided without needing the judgement of the user. On the other hand, in another configuration of the copy information setting module, the user can also arbitrarily set the copy source apparatus and the copy destination apparatus as necessary by using a copy information set picture plane for the system construction set by the system construction control module as a target. According to the setting by the user mode, when the copy source apparatus is not designated by using the copy information setting picture plane, the copy information setting module automatically sets a predetermined specific MO drive apparatus or MO library apparatus to a copy source apparatus. When the copy destination apparatus is not designated by using the copy information set picture plane, all of the MO library apparatuses except the copy source apparatus are automatically set into copy destination apparatuses. Further, the copy information setting module can arbitrarily set the number of copy source media, the number of copy destination media, and whether the copy is a copy in a group or a copy exceeding the group with respect to apparatus groups divided every bus system as necessary by using the copy information set picture plane. When the copy destination is the MO library apparatus and the number of copy destination media is not set, the copy information setting module automatically sets all of the media of the MO library apparatuses to the copy destination media. By such a setting of the copy information by using the picture plane by the user, an arbitrary copy form can be set as necessary and the copying process having an extremely high degree of freedom can be easily realized.

When a medium having a capacity different from that of the copy destination medium is included in the copy source media, the copy processing module copies to the copy destination medium having the same capacity. Specifically speaking, the copy processing module repeatedly executes the copying process on a sector unit basis from the copy source medium to the copy destination medium, and further executes a dummy copy of one sector after completion of the final sector of the copy source medium. When an error occurs in the dummy copy, it is decided that the capacities are the same, and the copying process is finished normally. When the dummy copy can normally be executed, it is determined that the capacities are different, error information is recorded, and the process is finished. Even when MO cartridges of different capacities mixedly exist in the copy destination MO library apparatus, if an MO cartridge having the same capacity as that of the copy source is inserted, the copying process can be executed. Since there is no need to unify the capacities of the cartridges, a good use efficiency is derived.

When the copying operation from the copy source apparatus to the copy destination apparatus is performed, the copy processing module reads the capacity of the copy destination medium and copies data to only a copy destination medium having the same capacity. By reading the capacity of the copy destination MO cartridge before the copying process is started as mentioned above, an error is immediately known without waiting for completion of the copying process, so that the processing time can be reduced. When a medium having a capacity different from that of the copy source medium is included in the copy destination media, the copy processing module copies to a copy destination medium having a capacity which is equal to or larger than that of the copy source. Specifically speaking, the copy processing module repeats the copying process on the sector unit basis from the copy source medium to the copy destination medium. When an error occurs for an interval up to the final sector of the copy source medium, it is determined that the capacity is insufficient, so that error information is recorded and the process is finished. When the copying operation is performed up to the final sector of the copy source medium, it is determined that the copy destination capacity is larger than the copy source capacity and the process is finished normally. Consequently, a copying process such that the copy destination medium capacity is uniformly matched to the medium having the capacity larger than the copy source medium capacity, or the like can be executed.

The copy processing module preliminarily reads and recognizes a data recording region of the copy source medium and copies only the recognized recording region to the copy destination medium. By copying only the recording region of the copy source as mentioned above, the processing time can be reduced. The copy processing module preliminarily reads the data recording regions of a plurality of copy source media and recognizes the total data amount of the copy sources, and also preliminarily reads the copy destination medium and recognizes the capacity. When the capacity of the copy destination medium is equal to or larger than the total data amount of the copy sources, the copy processing module merges the plurality of copy source media to one copy destination medium and copies. Therefore, the plurality of copy source media each having a small medium capacity can be merged to a copy destination medium having a large capacity, and can be copied, so that the number of copied media can be reduced.

With respect to the copying process between the library apparatuses, the copy processing module sets a plurality of copy source media into one group and copies to the copy destination media of a plurality of groups. In this case, in addition to the copying process between the different library apparatuses, for a plurality of media in the same MO library apparatus as targets, the plurality of copy source media can be set to one group and can be copied to the copy destination media of a plurality of groups. The MO library apparatus which is used in the invention has two MO drives. When an optical library apparatus is set to a copy destination, the copy processing module sequentially transfers copy data read out from the medium of the copy source MO drive apparatus to the two MO drives provided for the MO library apparatus and writes the copy data to the copy destination media in parallel. Further, the media which are used in the invention are, for example, MO cartridges of 230 MB, 540 MB and 640 MB.

Further, according to the invention, there is provided a storage medium in which a copy processing program which is used in an optical storage system has been stored, the optical storage system comprising: one or a plurality of MO drive apparatuses each for processing a single replaceable medium; one or a plurality of MO library apparatuses each having a medium enclosing unit for enclosing a plurality of replaceable media, an optical drive unit for optically accessing the medium, and an accessor for conveying the medium between the medium enclosing unit and the optical drive unit; and device buses of one or a plurality of systems which are led out from an upper apparatus and connect the MO drive apparatus and the MO library apparatus as storage apparatuses. The storage medium in which the copy processing program has been stored is characterized by comprising: a copy processing module which is installed in the upper apparatus and copies storage contents of a medium of a preset copy source storage apparatus to a medium of a preset copy destination storage apparatus; and a confirmation processing module which is similarity installed in the upper apparatus and is constructed in a manner such that apparatus graphics of the plurality of storage apparatuses serving as access targets of the copy processing module are arranged and displayed on a picture plane, and when a check region provided for each of the apparatus graphics is instructed on the picture plane, a check command is sent to the corresponding storage apparatus, thereby allowing an output operation for making the operator confirm the apparatus to be executed. A copy control program of the storage medium is installed as an OS or an application to the upper apparatus.

The above and other objects, features, and advantages of the present invention will become more apparent from the following detailed description with reference to the drawings.

BRIEF DESCRIPTION OF THE DRAWINGS

FIG. 5 is an explanatory diagram showing a state in which of a tray of the MO library apparatus is pulled out;

FIG. 6 is a block diagram of a hardware construction of the MO library apparatus;

FIGS. 7A and 7B are block diagrams of system functions of the invention;

FIGS. 10A and 10B are explanatory diagrams of a move command and element numbers of MO libraries;

FIG. 11 is an explanatory diagram of device addresses;

FIG. 12 is an explanatory diagram of the device addresses subsequent to FIG. 11;

FIGS. 13A and 13B are explanatory diagrams of formats of a read command and a write command;

FIG. 16 is an explanatory diagram of a copy information set picture plane of the invention in which a copy mode is used for an automatic setting;

FIG. 17 is an explanatory diagram of a shelf information picture plane by the operation of the graphics of a library apparatus in FIG. 1;

FIG. 27 is an explanatory diagram of a system construction in which the minimum constructions of two systems in FIG. 26 are provided;

FIG. 28 is an explanatory diagram of a system construction in which a copying process is executed among MO library apparatuses of different bus systems by a connection and a disconnection of the apparatuses using the apparatus constructing picture plane in FIG. 20;

FIG. 30 is an explanatory diagram of a copy information set picture plane of a user setting which is used for a system construction control of the invention;

FIG. 31 is an explanatory diagram of the operation of a copy information set picture plane of a user setting for the system construction in FIG. 29 as a target;

FIGS. 33A and 33B are flowcharts for the copying process in FIG. 32 which is executed among the library apparatuses;

FIGS. 34A and 34B are flowcharts for the copying process in FIG. 33 in which a copy source is set to the MO drive apparatus and a copy destination is set to the MO library apparatus;

FIGS. 38A and 38B are flowcharts for the copying process in FIG. 37 which is executed among the library apparatuses;

FIGS. 41A and 41B are flowcharts for the copying process in FIG. 40 which is executed among the library apparatuses;

FIG. 43 is an explanatory diagram of a copying process of the invention in which a plurality of media of the copy sources are merged to one medium of the copy destination;

FIGS. 44A and 44B are flowcharts for the copying process in FIG. 43 which is executed among the library apparatuses;

DETAILED DESCRIPTION OF THE PREFERRED EMBODIMENT

[System Construction and Library Apparatus]

Figure 1:
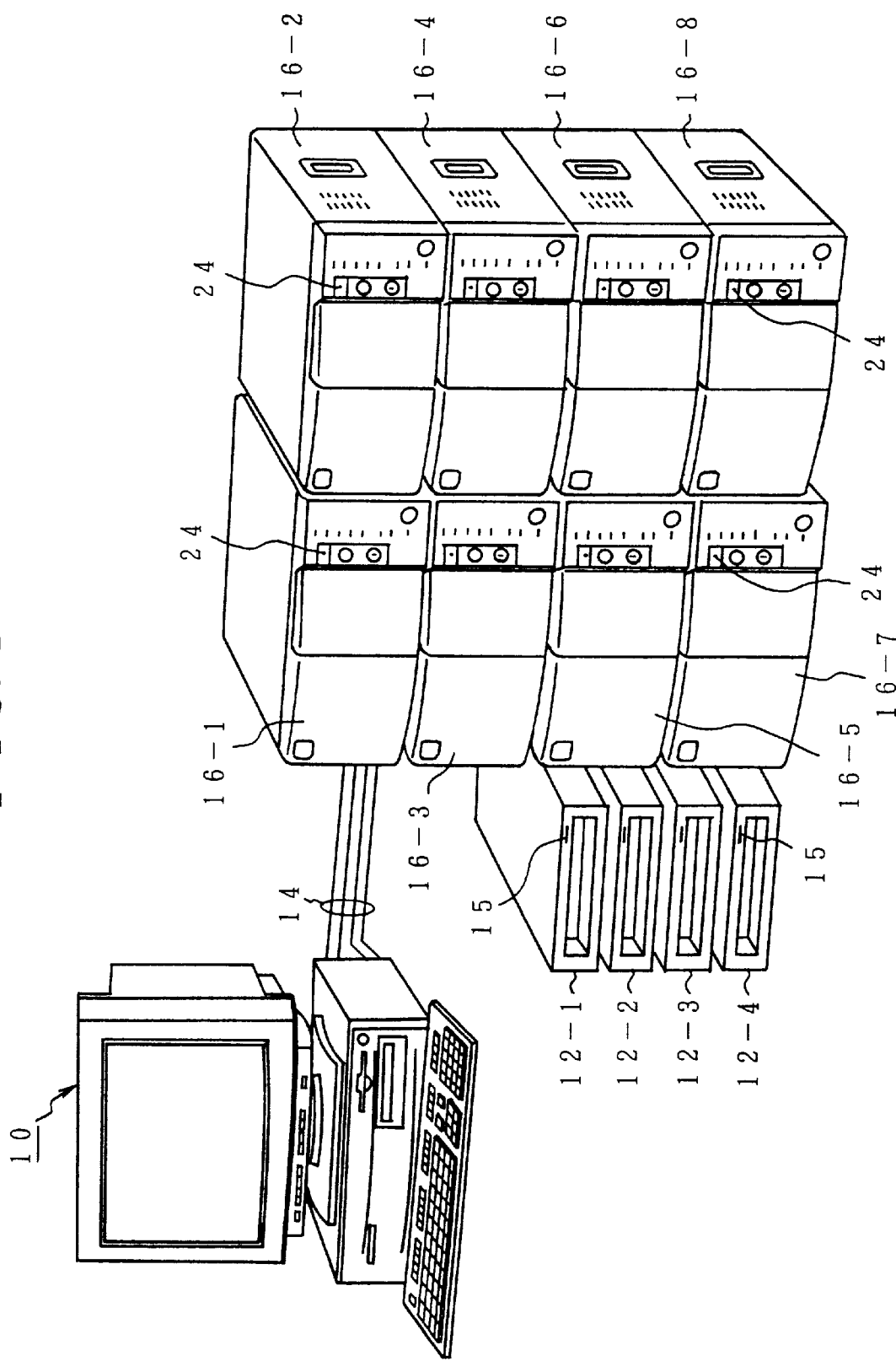
FIG. 1 is an explanatory diagram of a system construction of the invention.

FIG. 1 is an explanatory diagram of an optical storage system of the invention. As a host computer 10 as an upper apparatus, for example, a personal computer is used. As an external storage apparatus for the host computer 10, in the embodiment, four MO drive apparatuses (magnetooptic disk drive apparatuses) 12-1 to 12-4 and eight MO library apparatuses (magnetooptic disk library apparatuses) 16-1 to 16-8 are connected. That is, the MO drive apparatuses 12-1 to 12-4 and MO library apparatuses 16-1 to 16-8 are connected to the host computer 10 with respect to four systems by cables 14 constructing SCSI buses of four systems by using, for example, four SCSI cards. As for the four SCSI bus systems by the four cables 14, a state in which one MO drive apparatus and two MO library apparatuses are connected with respect to each system is a largest construction of the system. Magnetooptic disk apparatuses M2513A of 3.5 inches made by Fujitsu Limited can be used as MO drive apparatuses 12-1 to 12-4. Cartridge type optical disk media (hereinafter, referred to as "cartridges") of 3.5 inches can be used as MO drive apparatuses 12-1 to 12-4. A medium of 128 MB, a medium of 230 MB, a medium of 540 MB, and a medium of 640 MB can be used as cartridges in accordance with a medium capacity. Among them, with respect to the 128 MB medium, only the reading operation can be executed. As MO library apparatuses 16-1 to 16-8, for example, small type magnetooptic disk library apparatuses of 3.5 inches of M2532B made by Fujitsu Limited can be used. The MO library apparatuses 16-1 to 16-8 have therein two MO drive units in the apparatuses and can enclose 36 cartridges. One of the 36 cartridges is a cleaning disk and the remaining 35 cartridges can be used for storage. On-line display lamps 15 are provided on the front panels of the MO drive apparatuses 12-1 to 12-4. When a read access or a write access from the host computer 10 is received, the on-line display lamp 15 flickers. Similarly, on-line display lamps 24 are also provided on the front panels of the MO library apparatuses 16-1 to 16-8. When a move control for a built-in accessor is executed from the host computer 10, the on-line display lamp flickers.

Figure 2:
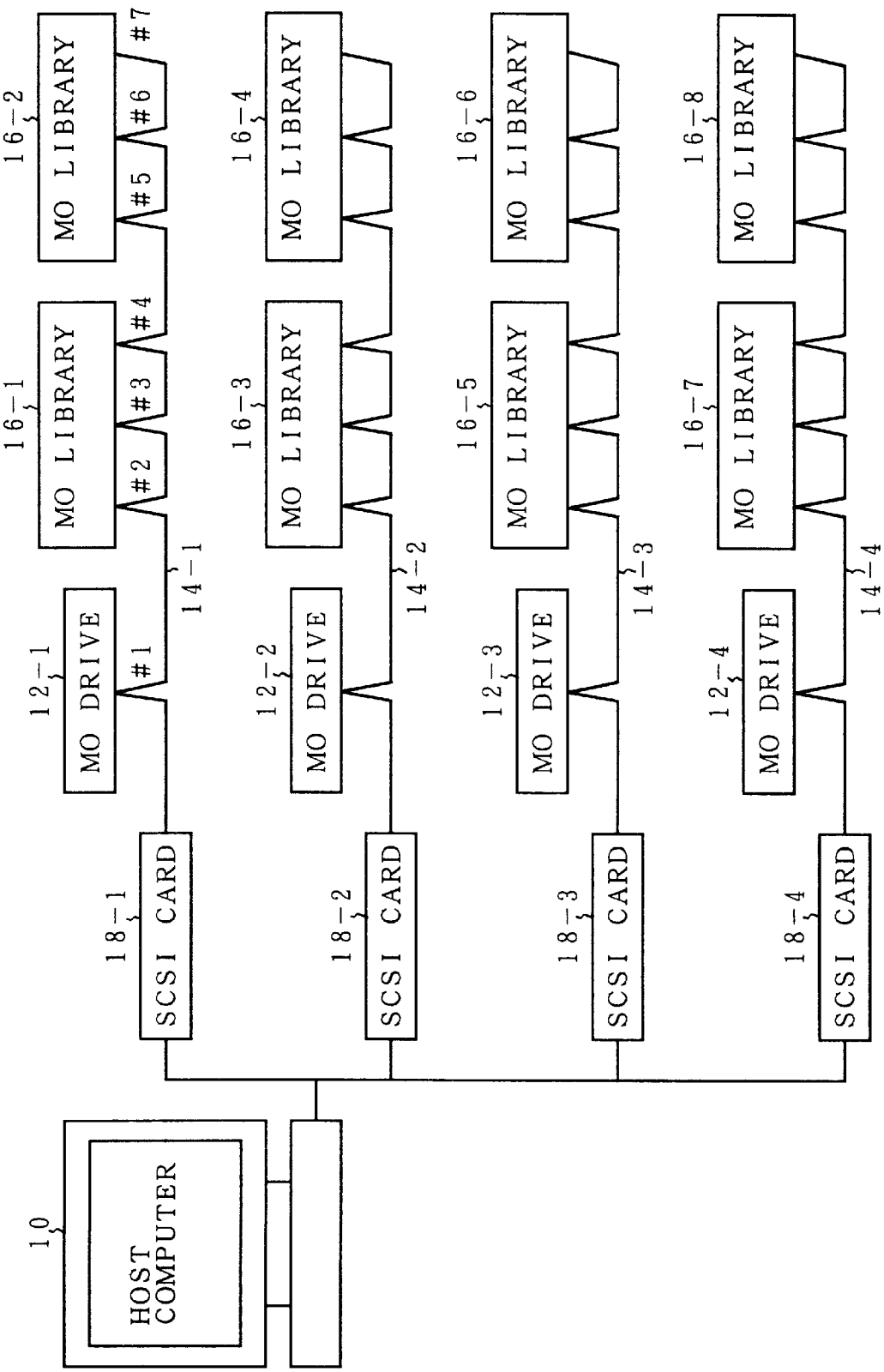
FIG. 2 is a system block diagram of the invention.

FIG. 2 is a block diagram of a system construction in FIG. 1. SCSI buses 14-1 to 14-4 of four systems are led out from the host computer 10 by SCSI cards 18-1 to 18-4 functioning as host adapters. Up to eight devices can be connected to the SCSI buses 14-1 to 14-4 and IDs=#0~#7 are allocated to device connecting ports, respectively. In the invention, the SCSI cards 18-1 to 18-8 as host adapters are connected as ID=#0 to the SCSI buses 14-1 to 14-4 of four systems and, further, the MO drive units 12-1 to 12-4 and, two sets of MO library apparatuses (16-1 and 16-2) to (16-7 and 16-8) are connected. Among them, since each of the MO library apparatuses 16-1 to 16-8 has therein an accessor and two MO drive units, three SCSI ports are allocated to each of the MO library apparatuses. For example, in case of the SCSI bus 14-1, the MO drive apparatus 12-1 is set to ID=#1, the accessor of the MO library apparatus 16-1 is set to ID=#2, the first MO drive unit is set to ID=#3, the second MO drive unit is set to ID=#4, the accessor of the MO library apparatus 16-2 is set to ID=#5, the first MO drive unit is set to ID=#6, and the second MO drive unit is set to ID=#7. This point shall also similarly apply to the other SCSI buses 14-2 to 14-4.

Figure 3:
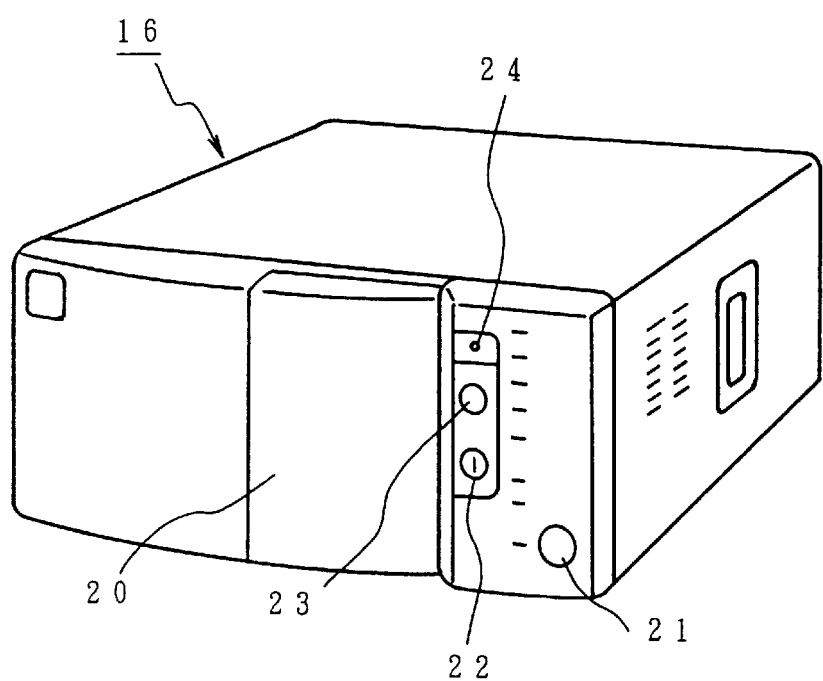
FIG. 3 is an explanatory diagram of an MO library apparatus.

FIG. 3 shows the MO library apparatus used in the system configuration of FIG. 1. The MO library apparatus 16 has a box shape whose height is limited to about 10 and a few cm and which has lengths in the lateral direction and the depth direction. For example, dimensions of the apparatus are set to a very compact size such that a height is set to 143 mm, a width is set to 345 mm, and a depth is set to 430 mm. The apparatus can be set on or beside the desk and can be used. Since an upper portion of the apparatus has an enough extent of 340 mm in width and 430 mm in depth, another unit such as a display or the like can be put on the apparatus in a state in which it is set on or beside the desk. A power switch 21, a key switch 22, and an ejection switch 23 are provided on an operation panel on the right side of the front surface of the apparatus. A tray 20 is provided beside the panel of the apparatus. As shown in FIG. 5, the tray 20 can be inserted and ejected into/from the apparatus main body and encloses three magazine racks in each of which a cartridge of an optical disk medium is enclosed. The power switch 21 turns on/off a power source of the apparatus. The ejection switch 23 is used to insert and eject the tray 20. When the ejection switch 23 is operated in a state in which the tray 20 is closed as shown in the diagram, the tray 20 is pulled out from the apparatus main body. When the ejection switch 23 is operated in a state in which the tray 20 is pulled out, the tray 20 is contrarily enclosed into the apparatus main body. The key switch 22 is used to validate or invalidate the function of the ejection switch 23. To pull out the tray 20 by the ejection switch 23, first, an exclusive-use key is inserted into the key switch 22 and rotated, thereby validating the function of the ejection switch 23. The key switch 22 is ordinarily in the OFF state. Even if the ejection switch 23 is operated, therefore, the inserting or ejecting operation of the tray 20 is not performed. The on-line display lamp 24 is provided in the upper portion of the ejection switch 23. The on-line display lamp 24 flickers when an access is performed to the built-in accessor by a move command from the host computer and the accessor operates.

Figure 4:
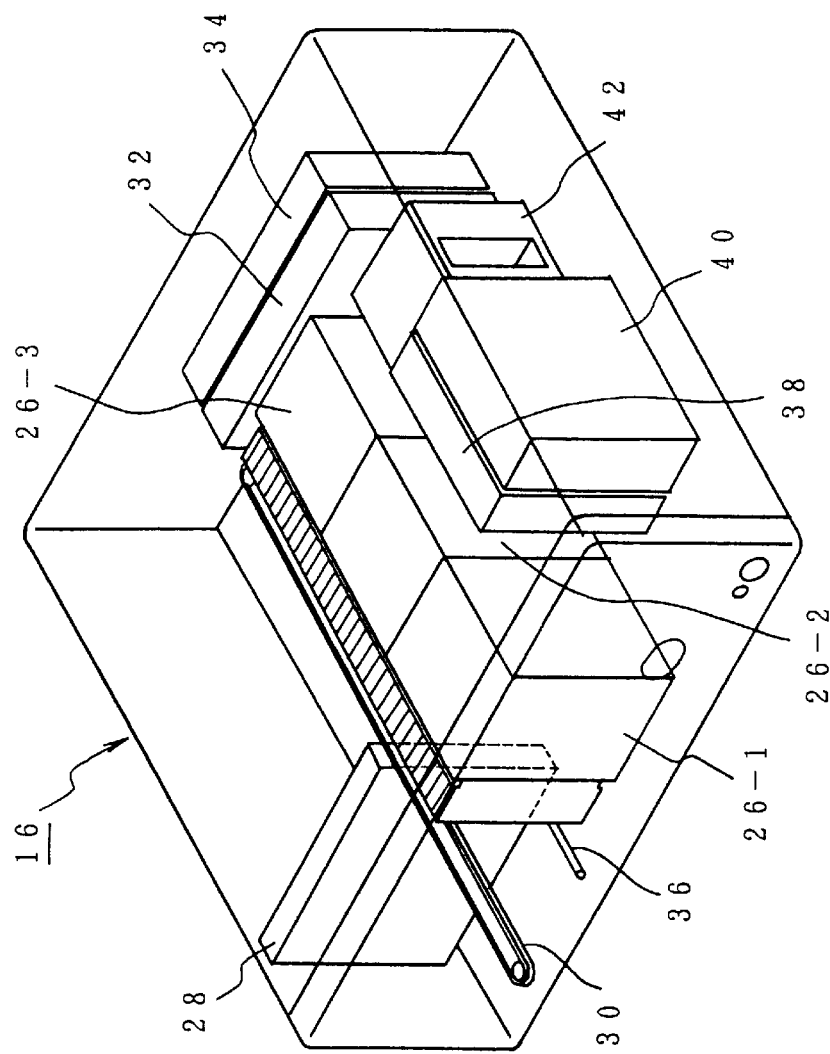
FIG. 4 is a transparent perspective explanatory diagram of an internal structure of the MO library apparatus.

FIG. 4 shows a transparent state of an internal structure of the apparatus of FIG. 3. First, for example, three magazine racks 26-1 to 26-3 are enclosed at a rear position of the tray which is opened to the front side. The magazine racks 26-1 to 26-3 are opened to the left side when they are seen from the front side. Twelve slots are formed in one magazine rack. For example, 12 optical disk cartridges of 3.5 inches are enclosed in the magazine rack. Therefore, the total number of cartridges which can be enclosed in the apparatus is equal to 36. However, since one of them is a cartridge for cleaning, total 35 cartridges can be actually used. An accessor 28 is installed on the left side of the magazine racks 26-1 to 26-3 so as to be movable in the depth direction. The accessor 28 is driven by a gear belt 30 and moves along a guide rail 36. The accessor 28 has a nail for pickup which functions as a robot hand to insert and eject the cartridges into/from the magazine racks 26-1 to 26-3. Two drives of a first MO drive 32 and a second MO drive 34 are installed on the rear side of the magazine racks 26-1 to 26-3. Each of the first and second MO drives 32 and 34 has a cartridge inserting/ejecting port on the left side where the accessor 28 is located. Therefore, the accessor 28 takes out the cartridge from any one of the magazine racks 26-1 to 26-3, conveys it to the position of the first MO drive 32 or second MO drive 34, and inserts. The accessor 28 conveys the cartridge ejected from the first MO drive 32 or second MO drive 34 to the original position among the magazine racks 26-1 to 26-3 and returns. A time that is required until the accessor 28 takes out the cartridge from the magazine rack and inserts into the MO drive is called a cartridge conveying time. The cartridge conveying time in the MO library apparatus 16 which is used in the invention is set to about five seconds as an average, so that a high speed process is realized. An accessor controller 38 and a power supply unit 40 are provided on the right side of the magazine racks 26-1 to 26-3. The accessor controller 38 performs a drive control of the accessor 28 and tray 20. The power supply unit 40 supplies a power source to the whole apparatus. A fan unit 42 with a filter is provided on the right side of the power supply unit 40. The fan unit 42 with the filter inhales the air from a suction port into the apparatus through the filter and forcedly cools the inside of the apparatus by blowing the air therein by a fan. After the cooling air inhaled by the fan unit 42 with the filter was circulated in the apparatus, it is finally ejected to the outside through the portion of the power supply unit 40.

FIG. 5 shows a state in which the tray is opened with respect to the MO library apparatus 16 which is used in the invention. In a state in which the tray 20 is pulled out to the front side from the apparatus, three magazine racks 26-1 to 26-3 are enclosed in the tray 20. In the tray 20, a side wall and a shelf plate shape having an L-shaped cross section having a side wall are formed. Pressing members 46-1 to 46-3 are formed in the front portion of the bottom plate. Each of the magazine racks 26-1 to 26-3 has a knob 44 in an upper portion and can be taken out from the tray 20 by grasping the knob 44. Each of the magazine racks 26-1 to 26-3 has twelve slots on the opening side. A cartridge 48 is enclosed in the slot.

FIG. 6 is a block diagram of a hardware construction of the MO library apparatus 16 which is used in the invention. The SCSI bus 14 from the host computer 10 is connected to the accessor controller 38, first MO drive 32, and second MO drive 34 through an SCSI card as a host adapter. The accessor controller 38 has an MPU 52 and executes an accessor control and a tray control by a program control of the MPU 52. The MPU 52 is connected to the SCSI bus 14 from the host computer through an SCSI unit 54. The MPU 52 also controls a motor driver 56-1 to drive a motor 64-1 provided for the accessor 28. A sensor driver 58-1 to output a detection signal from a sensor 66-1 which is provided for the accessor 28 and is used to detect the position of the cartridge, a motor driver 56-2 to drive a motor 64-2 provided for a tray driving unit 65, and a sensor driver 58-2 to output a detection signal of a sensor 66-2 to detect the position of the tray are connected to the MPU 52. Further, the ejection switch 23 provided for an operation panel 60 and a display unit 62 having various display lamps are connected to the MPU 52.

[System Function]

Figure 7A:
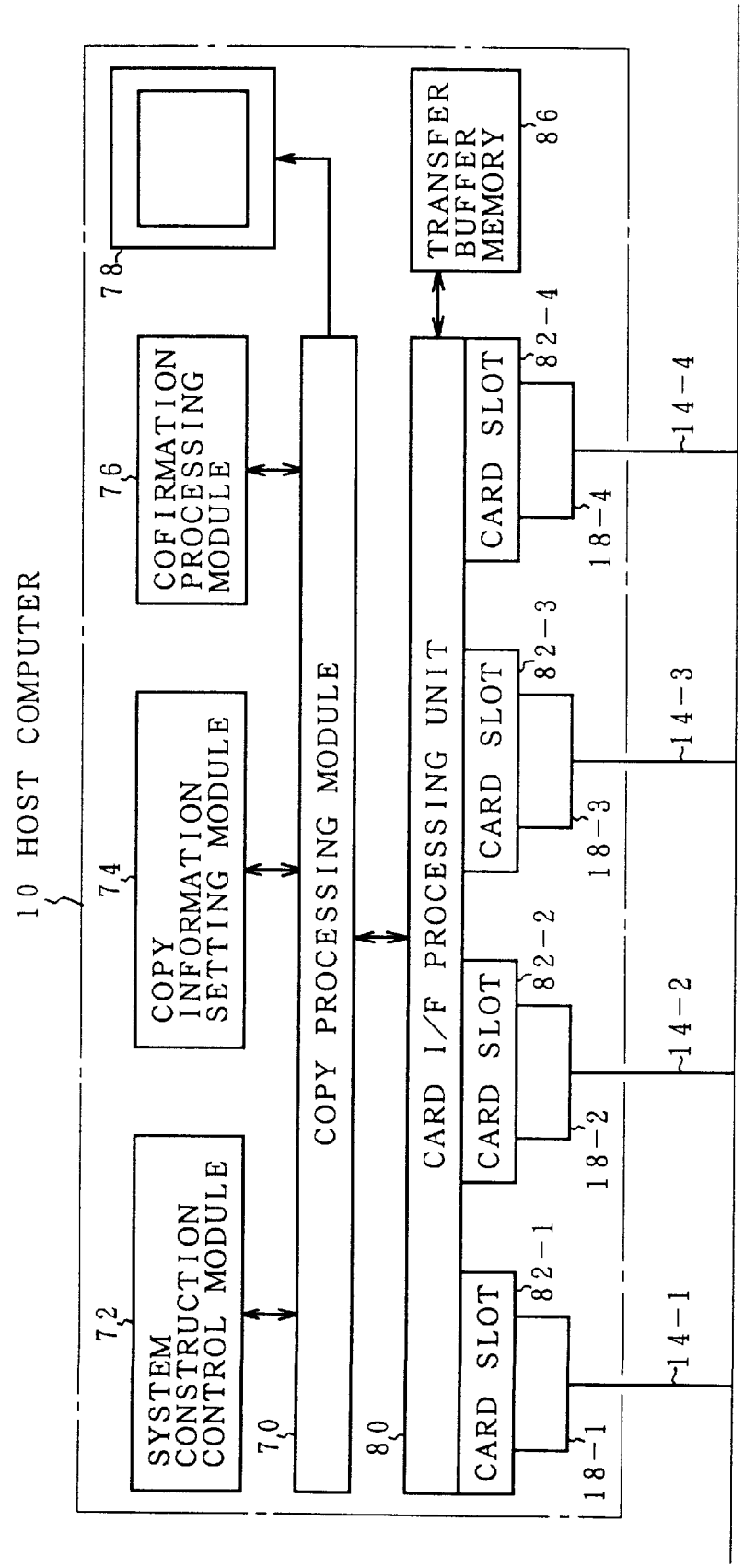

FIGS. 7A and 7B are functional block diagrams of the optical storage system of the invention. A copy processing module 70 to form copies of a number of cartridges from a copy source cartridge is provided for the host computer 10 as an upper apparatus. A system construction control module 72, a copy information setting module 74, a confirmation processing module 76, and further, a display 78 to display a display picture plane for various setting operations are provided for the copy processing module 70. The copy processing module 70, system construction control module 72, copy information setting module 74, and confirmation processing module 76 are realized by a copy processing program installed in the host computer 10. The copy processing program is provided for the user in a state in which it is stored in a proper storage medium such as floppy disk, CD-ROM, magnetic tape, or the like and is installed as an application program into the host computer 10. When the optical storage system of the invention is constructed, the copy processing program can be also installed as an OS of the host computer 10. Further, as a form to provide the copy processing program of the invention to the user, there is also a case where a copy control program is read out from the storage medium and is provided by an on-line transmission through a read-out network. The copy processing module 70 is connected to an external apparatus through a card interface processing unit 80. For example, four card slots 82-1 to 82-4 are provided for the card interface processing unit 80. The SCSI cards 18-1 to 18-4 as host adapters are inserted and connected to those card slots. The SCSI buses 14-1 to 14-4 of four systems are led out from the SCSI cards 18-1 to 18-4. The MO drive apparatuses 12-1 to 12-4 and MO library apparatuses (16-1 and 16-2) to (16-7 and 16-8) are connected to the SCSI buses in a rule such that one MO drive apparatus and two MO library apparatuses are connected with respect to each bus system. As representatively shown in the MO library apparatuses 16-1 and 16-2 connected to the system of the SCSI bus 14-1, the MO library apparatuses have therein accessors 28-1 and 28-2, first MO drives 32-1 and 32-2, and second MO drives 34-1 and 34-2. In order to hold data when copy data is transferred from an external copy source apparatus to a copy destination apparatus, a transfer buffer memory 86 is provided for the card interface processing unit 80 of the host computer 10. The system construction control module 72 provided for the host computer 10 can perform a construction control to set an arbitrary apparatus construction for a copying process in a software manner in a range of an installed state of an external apparatus. For the purpose of the system construction control, MO drive apparatuses that are externally connected and apparatus graphics showing a layout construction of the MO library apparatuses are prepared on the display 78. By using the apparatus graphics, the connection and disconnection of the system are performed by clicking a mouse, so that the user can perform the system construction control for an arbitrary copying process which is necessary for the user. The copy information setting module 74 sets fundamental copy information such as copy source, copy destination, and the like which are necessary for the copying process for the system construction decided by the system construction control module 72 as a target. As a setting process of the copy information, there are two processes comprising an automatic setting process for automatically discriminating the copy source and the copy destination on the basis of the system construction result determined by the system construction control module 72 and setting the copy information and a manual setting process for properly setting the copy information by the user by using a copy information set picture plane. The confirmation processing module 76 executes a process to confirm a correspondence relation between the apparatuses on the picture plane and the actual apparatuses connected externally by using the apparatus constructing picture plane of the apparatus graphics displayed on the display 78. That is, for example, when the apparatus graphics of the copy source is clicked with the mouse on the apparatus constructing picture plane on the display 78, the on-line display lamps 15 and 24 of the corresponding apparatuses among the external apparatuses corresponding to them, namely, among the MO drive apparatuses 12-1 to 12-4 and MO library apparatuses 16-1 to 16-8 arranged as shown in FIG. 2 flicker, thereby enabling the correspondence relation to be notified to the user. The copy processing module 70 executes the copying process from the cartridge of the copy source to the cartridge of the copy destination on the basis of the system construction determined by the system construction processing module 72 and the copy information set by the copy information setting module 74. In the copying process of the invention, fundamentally, the MO drive apparatuses 12-1 to 12-4 connected to the SCSI buses 14-1 to 14-4 are used as copy sources and the copying process for all of the cartridges enclosed in the MO library apparatuses 16-1, 16-2 to 16-7, and 16-8 provided every bus system is executed. In this case, the MO drive apparatuses 12-1 to 12-4 which have been predetermined as copy sources are called copy masters. On the other hand, as another form of the copying process, in the case where the MO drive apparatuses 12-1 to 12-4 are not connected but only the MO library apparatuses 16-1 to 16-8 are connected, the copying process is executed among the library apparatuses. The copying process among the MO library apparatuses is divided into a copying process exceeding the bus system and a copying process of every bus system. In this case as well, the MO library apparatus serving as a copy source is called a copy master. The MO drive apparatuses which are externally connected and the copy form by the MO library apparatuses depend on the system form which is set by the system construction control module 72 within a range of the installed state of the apparatus in a software manner and this point will be clarified in detail by an explanation hereinlater.

Figure 8:
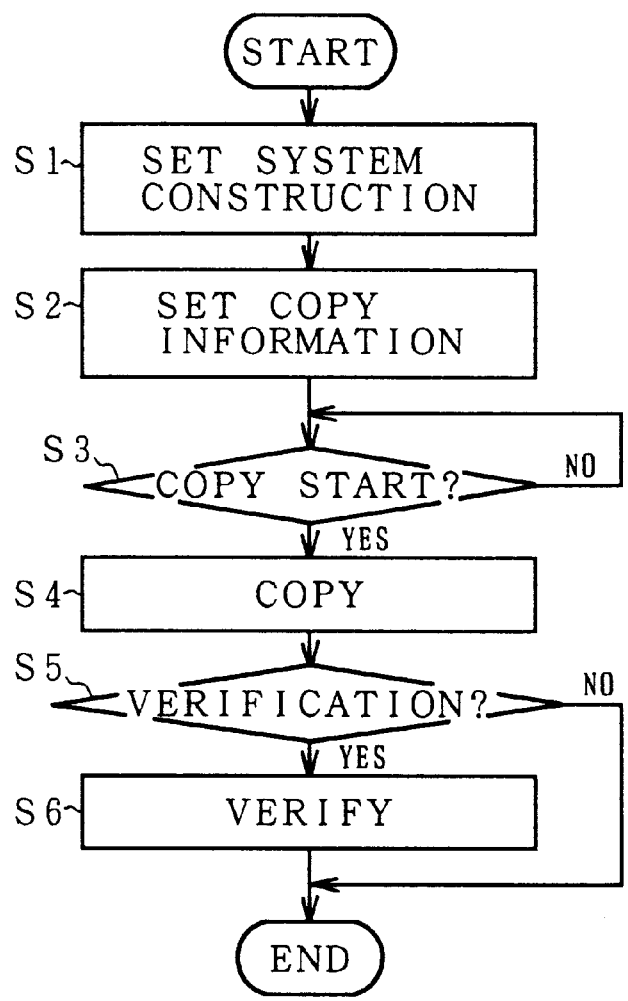
FIG. 8 is a generic flowchart for a copying process of the invention.

FIG. 8 is a generic flowchart of the copying process by the function on the host computer 10 side in FIG. 7A. At the time of the copying process, first in step S1, the setting process of the system construction is performed. In step S2, the copy information setting process is executed. By setting the system construction and copy information, a copy mode to decide which copying process is executed from which copy source to which copy destination is determined. When the copy mode is determined, the apparatus waits for a copy activating operation in step S3. When the copy activating operation is carried out, step S4 follows and the copying process from the copy source cartridge to the copy destination cartridge according to the copy mode which has already been determined is executed. In step S5, a check is made to see if the verification has been set or not. When the verification has been set in the copy information setting process in step S2, a verifying process by a data collation between the copy destination medium and the copy source medium is performed with respect to all of the copy destination media in step S6. A series of copying process is finished. If the verification is not set, the copying process is immediately finished.

Figure 9:
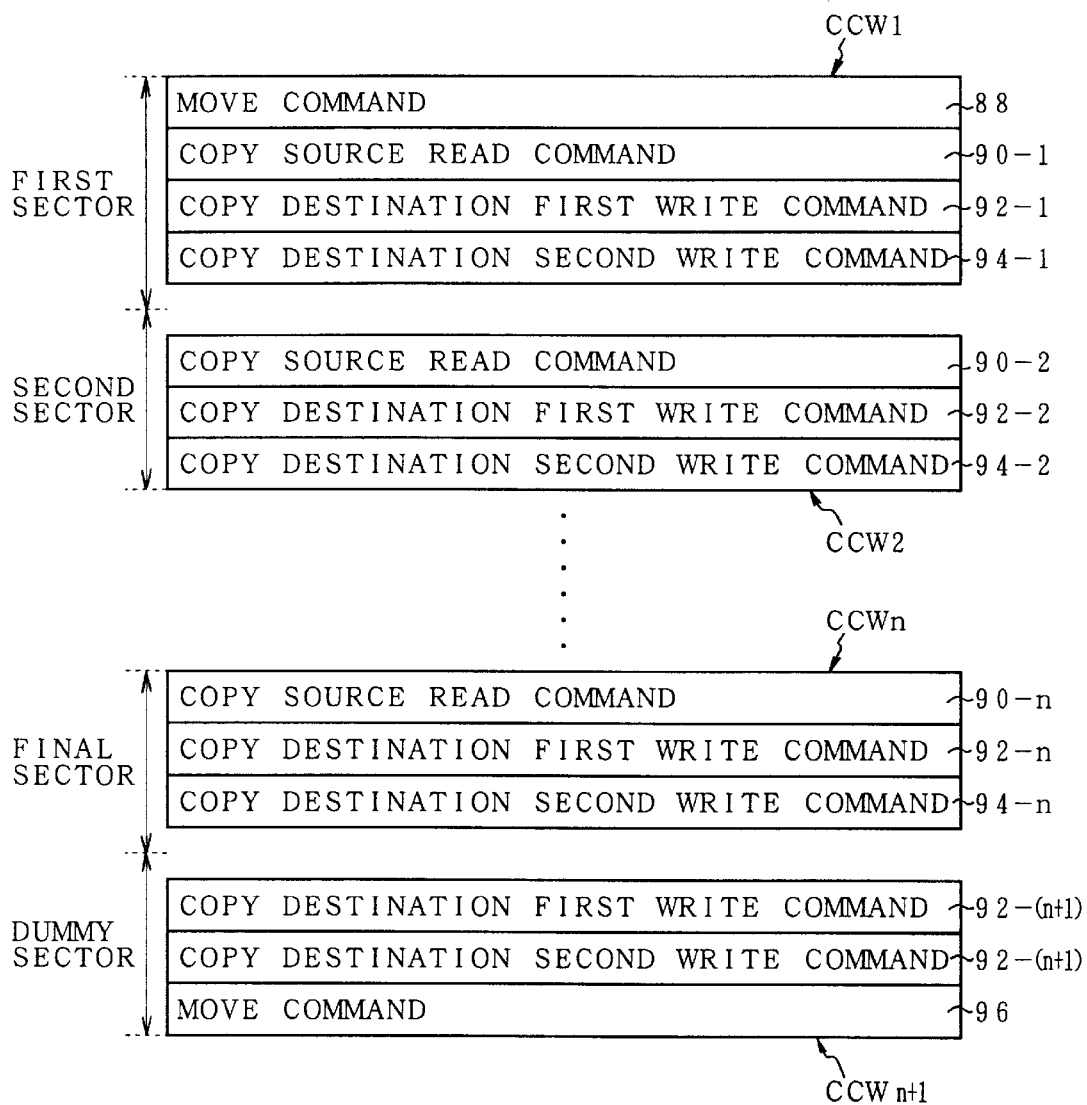
FIG. 9 is an explanatory diagram of a series of command chain words CCW in the copying process of the invention.

FIG. 9 is an explanatory diagram of a series of channel command words CCW which are issued from the host computer to the external system constructing apparatus in the copying process in step S4 in FIG. 8. First, the copying process from the copy source medium to the copy destination medium is fundamentally carried out on a unit basis of the sector which was formatted to the medium cartridge. The numbers of sectors of the cartridge medium of 230 MB, a cartridge medium of 540 MB, and a cartridge medium of 640 MB which are supported by the system of the invention are set to 6CF75 sectors as a hexadecimal number in case of 230 MB, to FE45C sectors as a hexadecimal number in case of 540 MB, and to 4BC50 sectors as a hexadecimal number in case of 640 MB, respectively. A sector capacity is set to 512 bytes in case of 230 MB and 540 MB and to 2048 bytes in case of 640 MB. Therefore, the copying process from the copy source cartridge to the copy destination cartridge is performed by issuing channel command words CCW1 to CCWn on a sector unit basis from the first sector to the final sector of the copy source medium. First, the channel command word CCW1 of the first sector is constructed by a command chain comprising: a move command 88; a copy source read command 90-1; a copy destination first write command 92-1; and a copy destination second write command 94-1. The move command 88 is a command for conveying the cartridges enclosed in the slots of the MO library apparatus serving as a copy destination and inserting into the built-in first and second MO drives.

The move command 88 has a command format as shown in FIG. 10A. The command format is constructed by: a command code 98 of MOVE; HHDD serving as a device address 100; FROM-ADDR serving as a movement source address 102; and TO-ADDR serving as a movement destination address 104. HHDD serving as a device address 100 is defined by a combination of: an SCSI host adapter device number HH allocated to the card slots 82-1 to 82-4 provided for the card interface unit 80 in FIG. 7A; and an SCSI device adapter device number DD which is defined by a bus ID allocated to each of the SCSI buses 14-1 to 14-4. In case of the system construction of FIGS. 7A and 7B, the device address HHDD is as shown in FIGS. 11 and 12. First, group numbers G0 to G3 are allocated to the bus systems of the four SCSI buses 14-1 to 14-4. When considering the group number G0 of the SCSI bus 14-1 in FIG. 10 as an example, as shown in a device name, the MO drive apparatus having the device number #0 and two MO library apparatuses having device numbers #0 and #1 are included in the group number G0. Each of the MO library apparatuses has the accessor, first MO drive, and second MO drive. Therefore, the device address HHDD of the MO drive apparatus of the group number G0 is set to "0001". With respect to the MO library apparatus of the device number #0, the accessor is set to "0002", the first MO drive is set to "0003", and the second MO drive is set to "0004". As for the MO library apparatus of the device number #1, the accessor is set to "0005", the first MO drive is set to "0006", and the second MO drive is set to "0007".

Referring again to the command format of the move command in FIG. 10A, the element numbers which were physically allocated to the slots of the MO library apparatus and the two MO drives are used as a movement source address 102 and a movement destination address 104 provided subsequent to the device address 100. FIG. 10B shows a correspondence relation between the MO drive in the library apparatus to set the movement source address 102 and movement destination address 104 and the element numbers for the slot numbers. That is, the element number "00" is allocated to the first MO drive, the element number "01" is allocated to the second MO drive, and the element numbers "02" to "37" are allocated to 35 slots 01 to 35 which can enclose the remaining cartridges.

Referring again to FIG. 9, the copy source read command 90-1 is issued subsequent to the move command 88 of the first sector. As shown in a command format of FIG. 13A, the read command is constructed by "READ" as a command code 106, "HHDD" as a device address 108, and further, a sector number 110. By issuing the read command to the apparatus of the copy source, a reading process of the sector data corresponding to the sector number 110 is executed and the read data is transferred to the host computer. Referring again to FIG. 9, subsequent to the copy source read command 90-1 of the first sector, the copy destination first write command 92-1 and copy destination second write command 94-1 are arranged. As will be obviously understood from the system construction of FIGS. 7A and 7B, since the MO library apparatus serving as a copy destination of the invention has the first and second MO drives therein, the sector data of the copy source obtained by issuing the copy source read command 90-1 is once held in the transfer buffer memory 86. After that, the sector data is sent to the first MO drive of the MO library apparatus of the copy destination together with the copy destination first write command 92-1, thereby performing the writing operation of the sector data. Subsequently, the same read data is sent to the second MO drive of the MO library apparatus of the copy destination by the copy destination second write command 94-1, thereby executing a parallel writing process to write the sector data. FIG. 13B shows a command format of the write command which is used in FIG. 9. Subsequent to "WRITE" as a command format 112, "HHDD" as a device address 114, and a sector number 116, sector data 118 obtained by the read command in FIG. 13A is added.

The channel command words CCW2 to CCWn from the second sector to the final sector in FIG. 9 are a repetition of copy source read commands 90-2 to 90-n, copy destination first write commands 92-2 to 92-n, and copy destination second write commands 94-2 to 94-n. When the copying process of the final sector of the copy source by the generation of the channel command word CCWn of the final sector is finished, a channel command word CCWn+1 to write a dummy sector is finally issued. The channel command word CCWn+1 to write the dummy sector is a processing command to confirm that a medium capacity of the copy destination is larger than a medium capacity of the copy source. That is, the writing of the dummy sector is instructed to the first MO drive of the MO library apparatus by issuing a copy destination first write command 90-(n+1). When the writing of the dummy sector is successful, it will be understood that the medium capacity of the copy destination medium is larger than that of the copy source. If the writing of the dummy sector fails, it will be also understood that the medium capacity of the copy destination is the same as that of the copy source. In a next copy destination second write command 92-(n+1), a confirming process of the medium capacity by the writing of the dummy sector is similarly executed to the second MO drive of the MO library apparatus. Finally, a move command 96 is issued and the cartridges after completion of the copying process are taken out from the first and second MO drives of the MO library apparatus and are sequentially returned to the original slots. The writing operation of the dummy sector which is executed subsequent to the final sector is used when the medium capacity is not checked prior to the copying process. If the medium capacity has already been examined prior to the copying process, it is unnecessary to write the dummy sector and it is sufficient to arrange the move command 96 to the end of the final sector.

[Apparatus Construction Control]

Figure 14A:
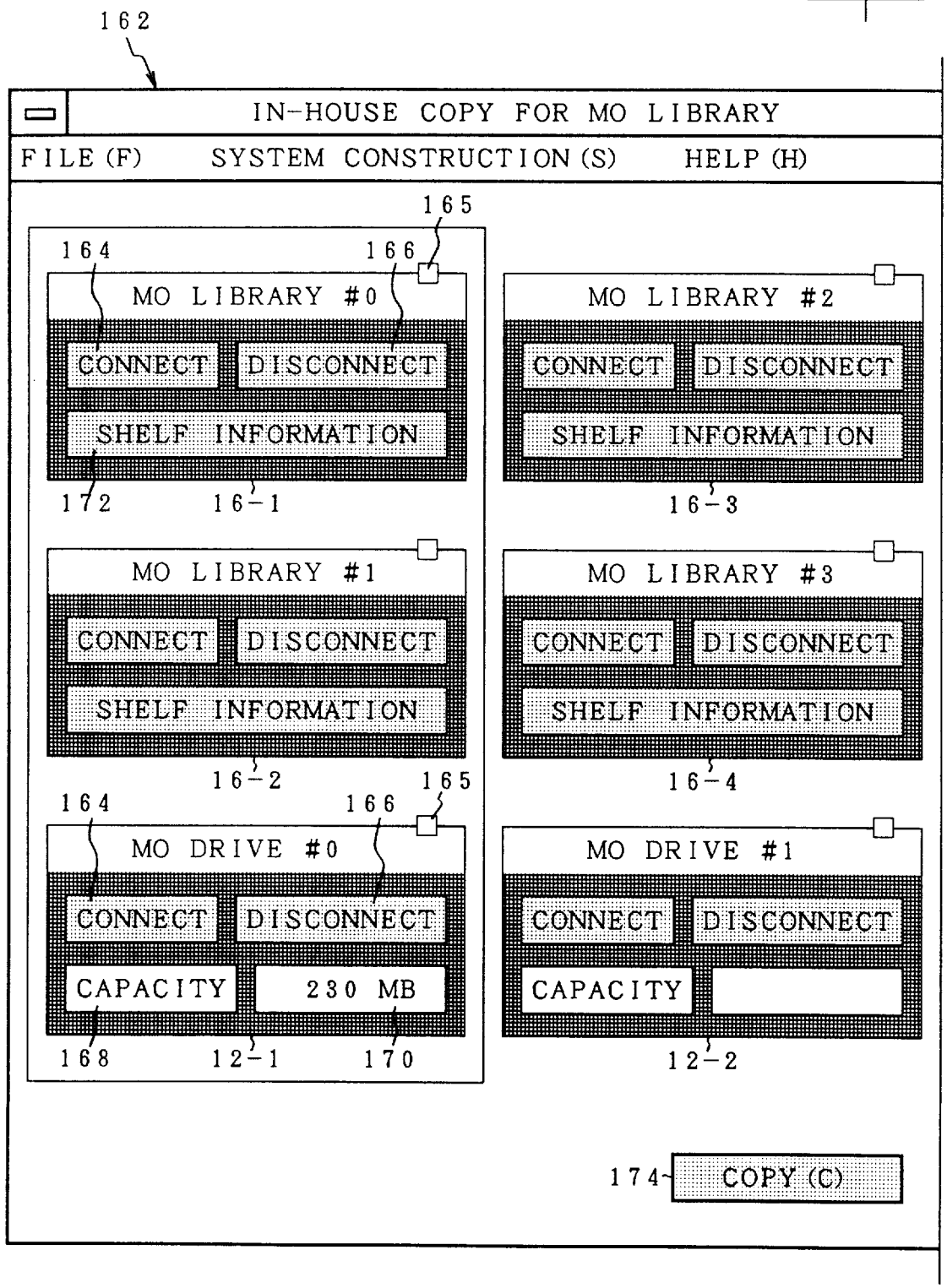
FIGS. 14A and 14B are explanatory diagrams of an apparatus constructing picture plane which are used in the invention.
Figure 14B:
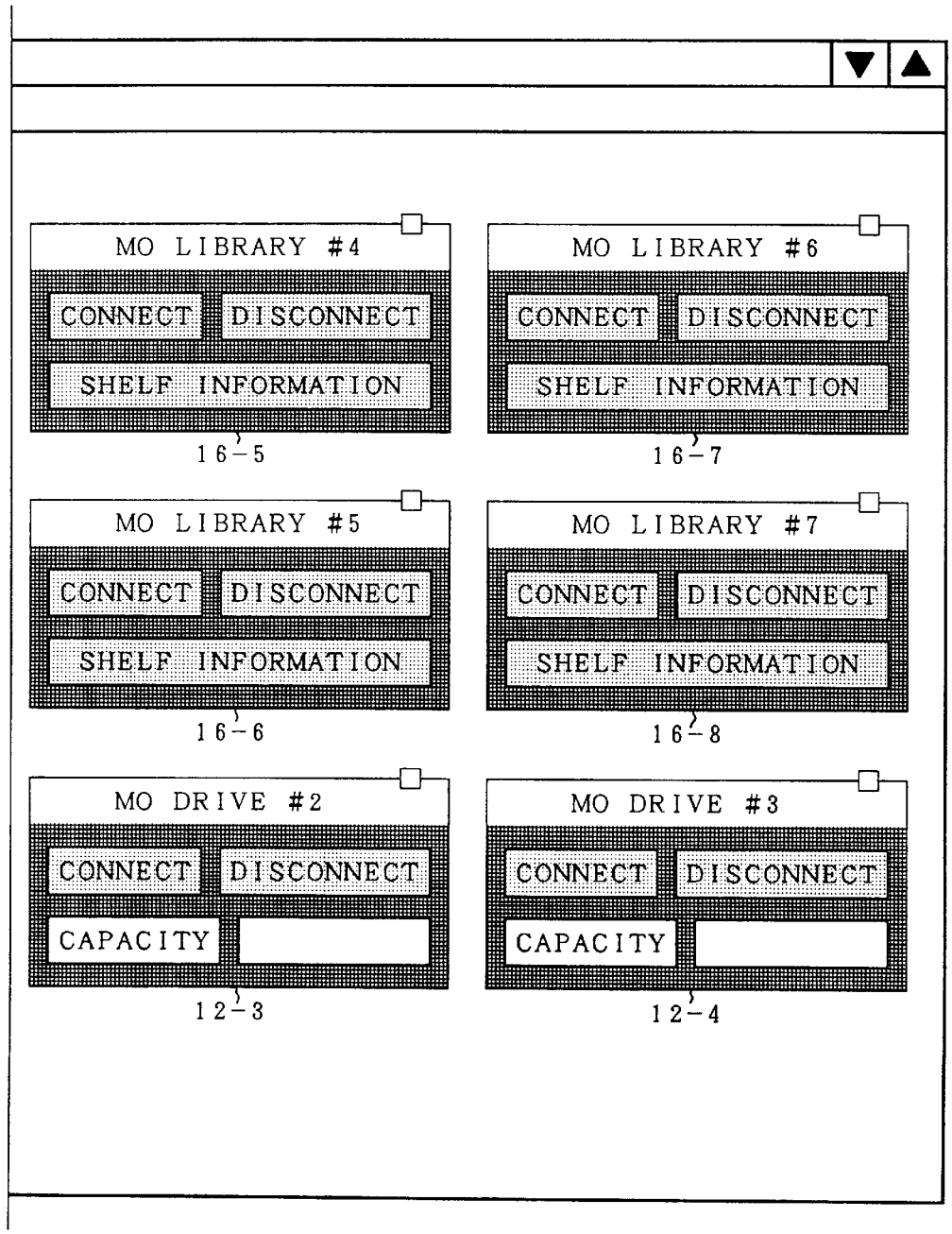

FIGS. 14A and 14B show a picture plane of an apparatus construction which is displayed on the display 78 which is used for a construction control of the system construction control module 72 provided for the host computer 10 in FIGS. 7A and 7B. In an apparatus constructing picture plane 162, apparatus graphics is arranged in correspondence to the maximum construction of the external MO drive apparatuses 12-1 to 12-4 and MO library apparatuses 16-1 to 16-7 for the host computer 10 in FIG. 7A. For simplicity of explanation, the same reference numerals 12-1 to 12-4 and 16-1 to 16-7 as those of the actual apparatuses are used as apparatus graphics on the picture plane. First, when considering the apparatus graphics 12-1 to 12-4 of the MO drive apparatus as an example, device numbers "#0" to "#3" are displayed in each apparatus graphics together with the device name "M0 drive". Among the apparatus graphics 12-1 to 12-4, for example, when considering the apparatus graphics 12-1, a connecting box 164 which is used for a system connecting operation, a disconnecting box 166 which is used for a system disconnecting operation, a capacity check box 168 which is used for a checking operation of the medium capacity, and a capacity display box 170 to display a check result of the capacity are provided. Further, a check box 165 to activate the confirming process of the correspondence relation between the apparatuses on the picture plane and the actual apparatuses is arranged at the right upper corner of the apparatus graphics. With respect to the apparatus graphics 16-1 to 16-7 of the MO library apparatus arranged in two columns in the lateral direction in the upper portion of the picture plane, as representatively shown in the apparatus graphics 16-1, the connecting box 164 to instruct the system connection, disconnecting box 166 to instruct the disconnection of the system, and further, a shelf information box 172 to display states of the cartridges enclosed in the MO library apparatus are provided. The check box 165 to activate the confirming process of the correspondence relation between the apparatuses on the picture plane and the actual apparatuses is provided at the right upper position of the upper portion of the apparatus graphics 16-1. Further, a copy execution key 174 to execute the copying process according to the invention is arranged at the center on the lower side of the picture plane.

Figure 15:
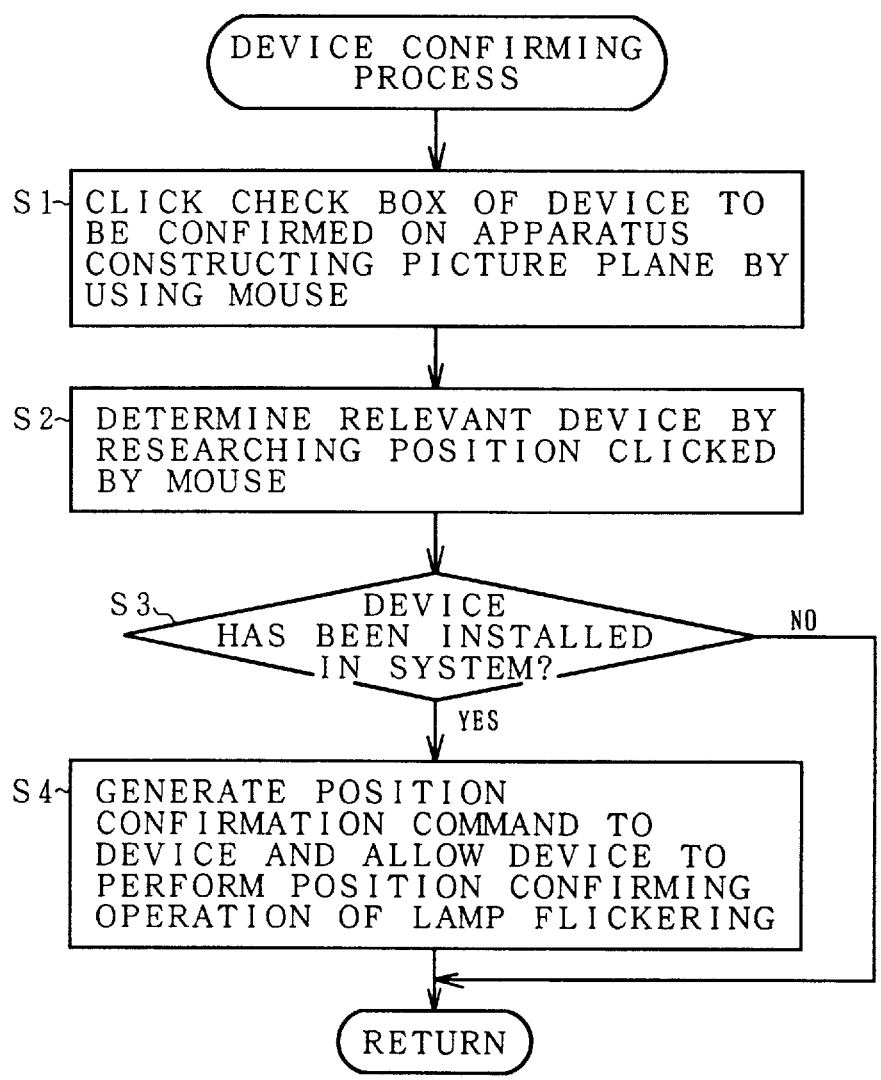
FIG. 15 is a flowchart for a device confirming process by the operation of apparatus graphics in FIG. 1.

FIG. 15 is a flowchart for an apparatus confirming process, what is called a device confirming process, which is activated by a mouse click in the check box 165 provided in each apparatus graphics of the picture plane of the apparatus construction in FIGS. 14A and 14B. First in step S1, the check box 165 of the device to be confirmed in the apparatus constructing picture plane 162 in FIG. 14 is clicked by a mouse cursor. In response to the mouse click, in step S2, the position clicked on the picture plane is examined and the relevant device is determined. Specifically speaking, the relevant device address HHDD is decided. In step S3, a check is made to see if the device in which a confirmation is requested has been installed in the system. In the apparatus constructing picture plane 162 in FIG. 14, since all of the apparatus graphics are displayed by black painted frames, it relates to a case where all of the apparatuses are installed in the maximum construction as shown in FIGS. 7A and 7B. If they are not installed, the black frame of each apparatus graphics is deleted and it will be understood that no apparatus is in an installed state. In step S3, when it is confirmed that the device as a confirmation target has been installed in the system, in step S4, a position confirm command is issued to such a device, thereby allowing a position confirming operation by, for example, flickering of the on-line display lamps 15 and 24 or the like as shown in FIG. 1 to be executed. As a position confirm command that is issued in step S4, when the target apparatus is the MO library apparatus, the move command in FIG. 10A is issued and a pseudo operation of the accessor is carried out, thereby flickering the on-line display lamp 24. When the target apparatus is the MO drive apparatus, it is sufficient that the read command in FIG. 13A is issued and the on-line display lamp 15 shown in FIG. 1 is flickered. Therefore, when the copy source cartridge and copy destination cartridge are set prior to the copying process on the apparatus constructing picture plane 162 in FIG. 14, by mouse-clicking the check box 165 provided for the apparatus graphics of each apparatus of the copy source and copy destination, the user can easily recognize which apparatus among the MO drives 12-1 to 12-4 and MO library apparatuses 16-1 to 16-8 in FIG. 1 is the apparatus of the copy source and which apparatuses are the apparatuses of the copy destinations. As means other than the flickering of the on-line display lamps 15 and 24, it is also possible to generate a sound by providing an acoustic output device such as a buzzer or the like for each apparatus. With respect to the MO library apparatus, it is also possible to drive the accessor so as to be understood from its operation sound or the like.

FIG. 16 is an explanatory diagram of a copy information set picture plane 125 which is used for the setting process of the copy information setting module 74 provided on the host computer 10 side in FIGS. 7A and 7B. Check boxes 135, 145, 154, and 156 to instruct the following four items are provided in the copy information set picture plane 125.

Set master apparatus to MO drive.
Set master apparatus to MO library.
Check media capacity.
Copy and verify.

First, like device address information in FIG. 11A, the check box 135 is a check box for instructing to set the MO drive apparatus of the device number #0 of the group number G1, namely, the MO drive apparatus 12-1 connected to the SCSI bus 14-1 in FIG. 7 to the master apparatus as a copy source. The next check box 145 is a check box for setting the first MO drive and second MO drive of the device number #0 of the group G0 in FIG. 11A, namely, the first MO drive 32-1 and second MO drive 34-1 of the MO library apparatus 16-1 of the SCSI bus 14-1 in FIG. 7 to the master apparatuses of the copy source. On the basis of the operation by the mouse click of the check boxes 135 and 145 regarding whether the master apparatus of the copy source is set to the MO drive or MO library, the copy information setting module 74 in FIG. 7A executes an automatic setting control to automatically set the relation between the copy source and the copy destination for the system construction, as a target, by the system construction control module 72 which has been determined at that time. By mouse-clicking the check box 154 of the copy information set picture plane 125 in FIG. 16, with respect to all of the cartridges in the MO library apparatus serving as a copy destination, a check about whether the medium capacity coincides with that of the cartridge of the master apparatus serving as a copy source or not, a check about whether a write protection is not set in the cartridge of the copy destination or not, and a check about whether the copy destination medium is a cleaning medium or not can be executed before the start of the copying operation. As a result of the checking process of the medium capacity, when the cartridge whose medium capacity is different from that of the copy source cartridge exists on the copy destination side, when the cartridge in which the writing operation is protected exists on the copy destination side, and when the cleaning cartridge exists on the copy destination side, a shelf information window 176 as shown in FIG. 17 indicative of those check information is displayed.

A table of 35 slot numbers 01 to 35 to enclose the cartridges of the MO library apparatus is displayed in the shelf information window 176 in FIG. 17. It will be understood that the cartridges are inserted in the slots of the slot numbers 01, 02, 03, 17, and 20 shown by black dots. Among them, error information E is shown in the slot number 02 and indicates a size error showing that the medium capacity is different from the capacity of the cartridge of the copy source. With respect to the cartridge of the slot number 03, it is shown that it is the cartridge of the capacity of 128 MB. In case of the cartridge of 128 MB, only the reading operation can be performed by the MO library apparatus which is used in the invention and such a cartridge cannot be used as a copy destination cartridge, so that such a state becomes a kind of error information. "*" of the slot number 17 indicates that the write protection is applied to the cartridge. "CLN" of the slot number 20 indicates the cleaning cartridge. Further "D1" and "D2" of the slot numbers 26 and 27 indicate that the cartridges inserted in the slots of those slot numbers have been set in the first MO drive D1 and second MO drive D2 built in the MO library apparatus, respectively. By seeing the shelf information picture plane 176 of the MO library apparatus, an inconvenience such that the cartridge which causes an error is selected as a copy destination can be certainly prevented prior to the copying process.

Figure 18:
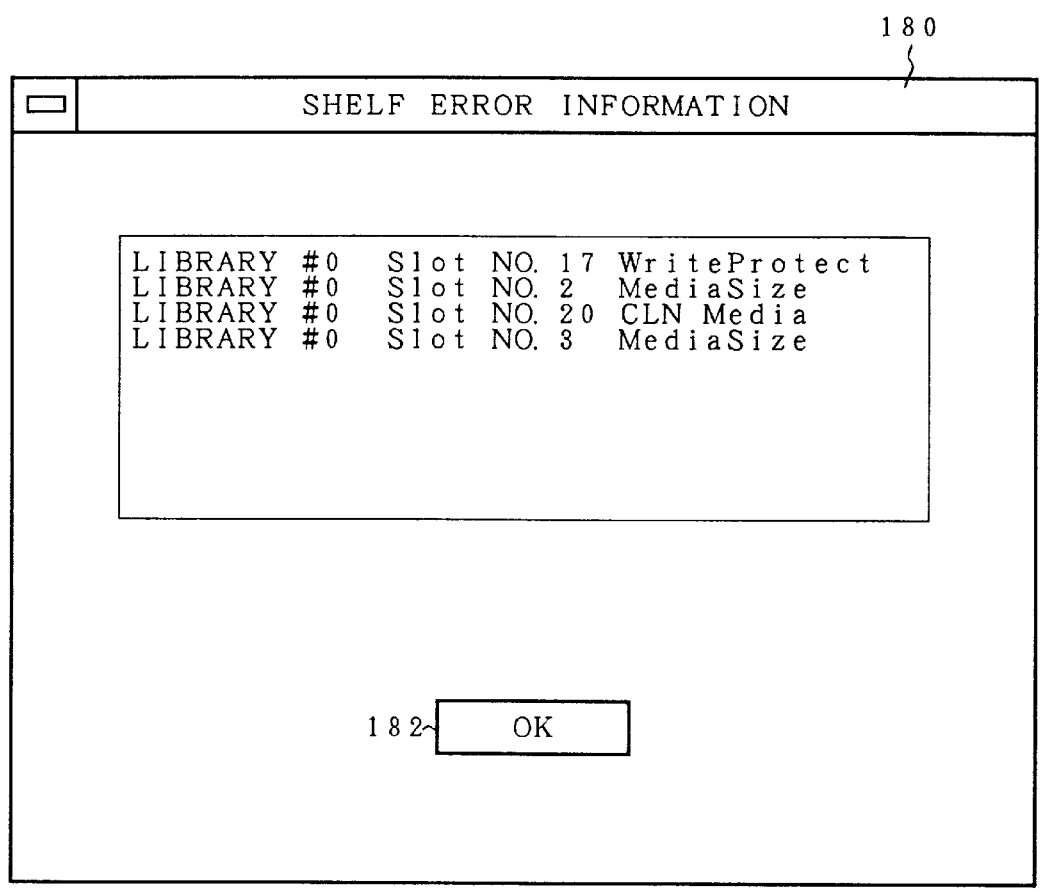
FIG. 18 is an explanatory diagram of an error information picture plane which is displayed at the end of the copying process.

FIG. 18 shows an example of a shelf error information window 180 which is displayed when a specified error is detected during the copying process. The shelf error information is constructed by a library device number, a slot number, and error contents. The error information has the following items.
I. MediaSize: The medium whose capacity differs from that of the copy source is used on the copy destination side.
II. WriteProtect: The medium of the copy destination is write-protected.
III. CLN Media: The cleaning medium is used.
IV. ReadError: Read error
V. WriteError: Write error
VI. VerifyError: Verify error An OK key 182 provided in the lower portion of the shelf error information print 180 is mouse-clicked in case of continuing the copying process even if an error occurred.
[Automatic Setting of Copy Information]

Figure 19A:
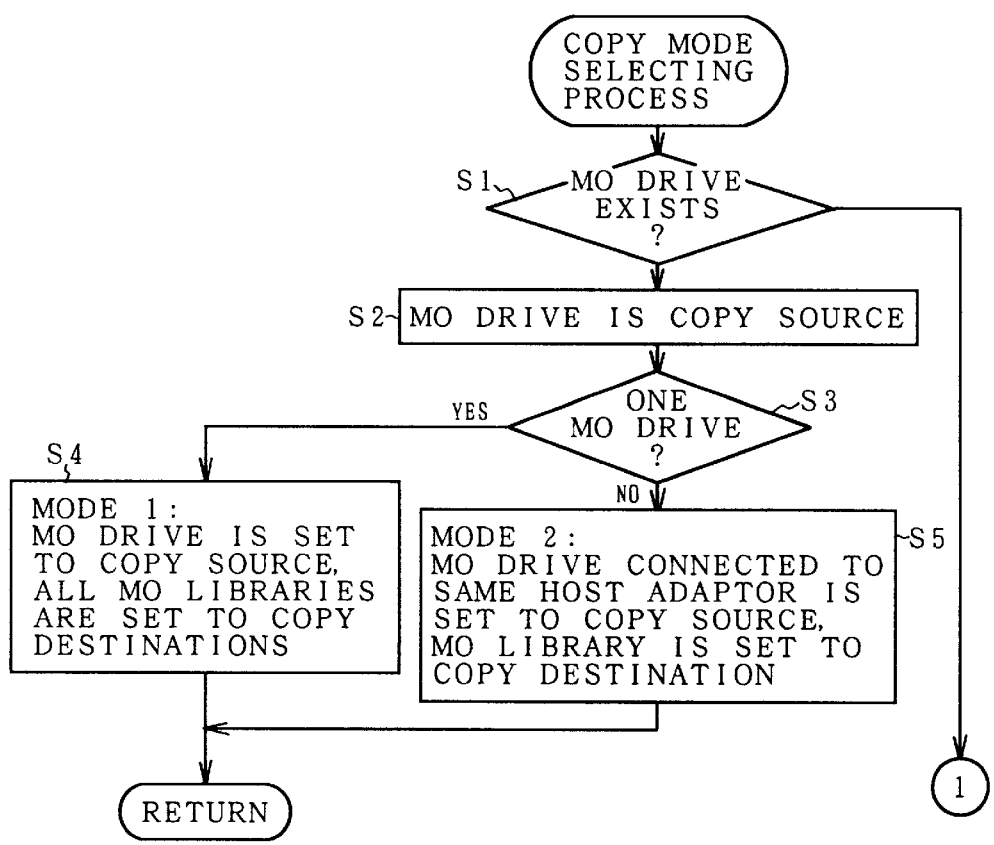
FIGS. 19A and 19B are flowcharts for a copy mode selecting process which is executed in accordance with the operation of the copy information set picture plane in FIG. 16.
Figure 19B:
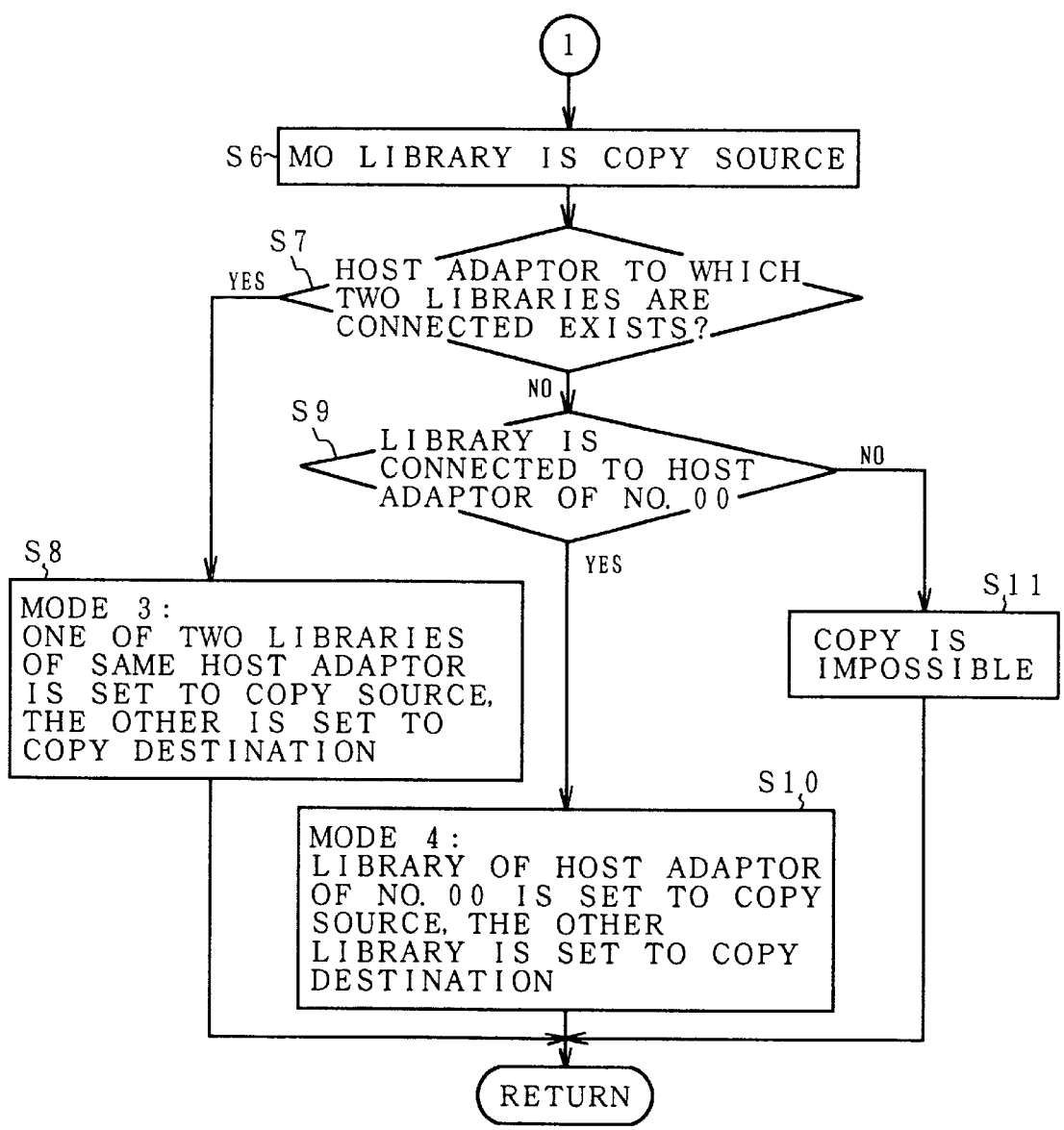
Figure 20:
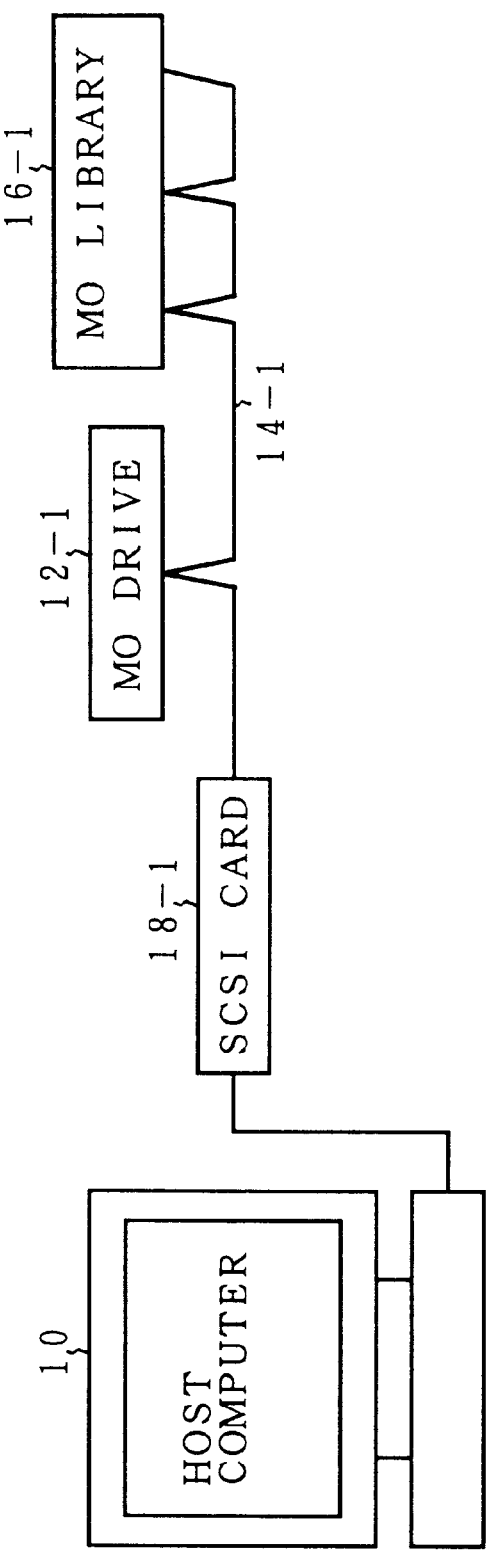
FIG. 20 is an explanatory diagram of a minimum system construction of the invention in which an MO drive apparatus is set to a copy source.

When the master apparatus serving as a copy source apparatus is set by mouse-clicking the check box 135 or 145 of the copy information set picture plane 125 in FIG. 16, a copy mode selecting process according to the flowchart of FIGS. 19A and 19B is automatically performed. First in step S1, a check is made to see if the MO drive apparatus exists in the system construction determined by the construction control. When there is the MO drive apparatus, step S2 follows and the MO drive apparatus is set to the copy source (master apparatus). In step S3, a check is made to see if the number of MO drive apparatuses is equal to 1. When one MO drive apparatus exists, step S4 follows and a copy mode to set the MO drive apparatus into the copy source and to set all of the MO library apparatuses into the copy destinations is set as a copy mode 1. A fundamental form of the copy mode 1 which is set in step S4 relates to a case where one MO drive apparatus 12-1 and one MO library apparatus 16-1 are connected to the SCSI bus 14-1 from the SCSI card 18-1 connected as a host adapter to the host computer 10 as shown in FIG. 20. A case where the second MO library apparatus 16-2 is further connected subsequent to the MO library apparatus 16-1 is also included in the copy mode 1.

Figure 21A:
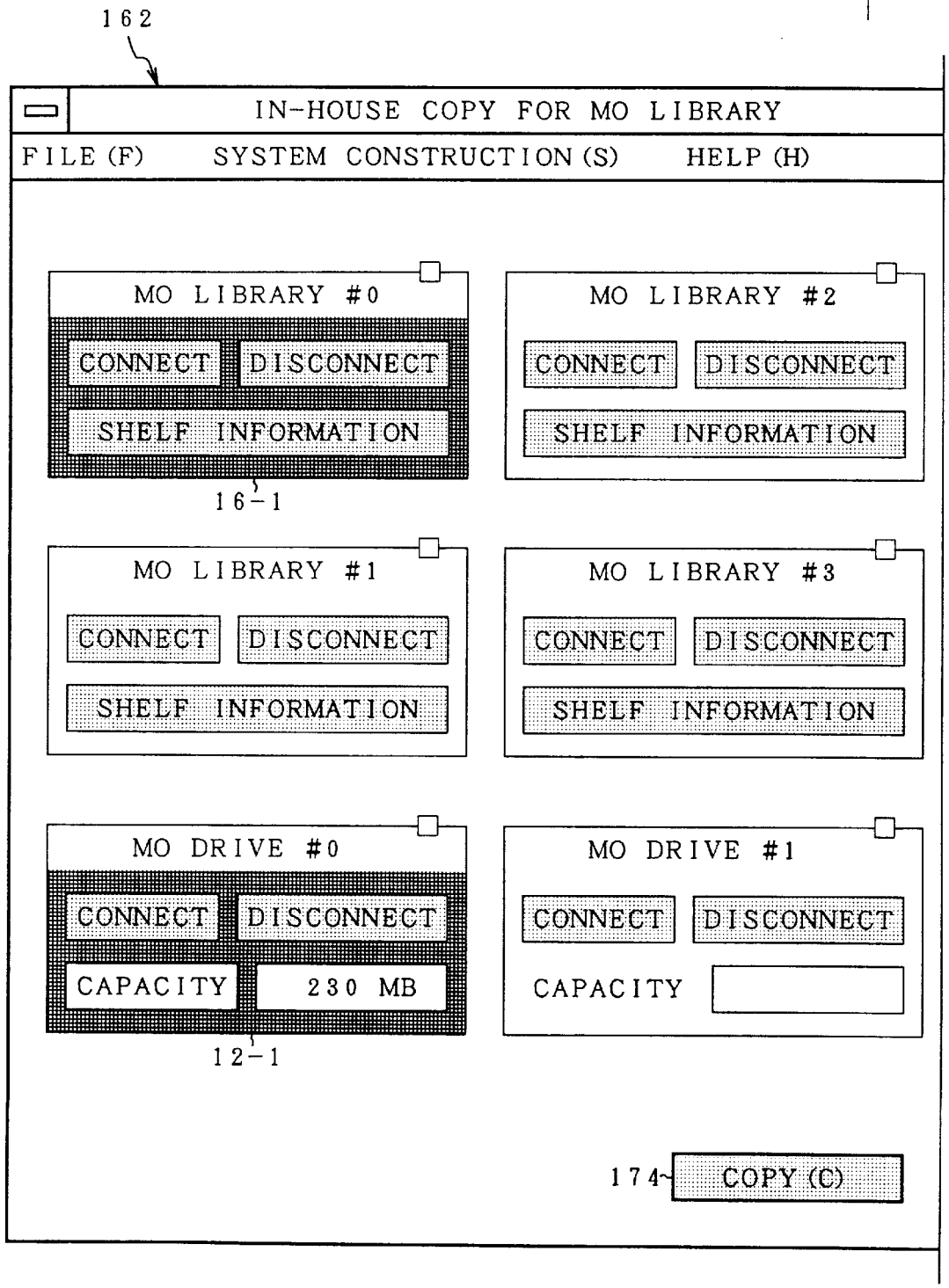
FIGS. 21A and 21B are explanatory diagrams of an apparatus constructing picture plane in a final system construction in FIG. 20.
Figure 21B:
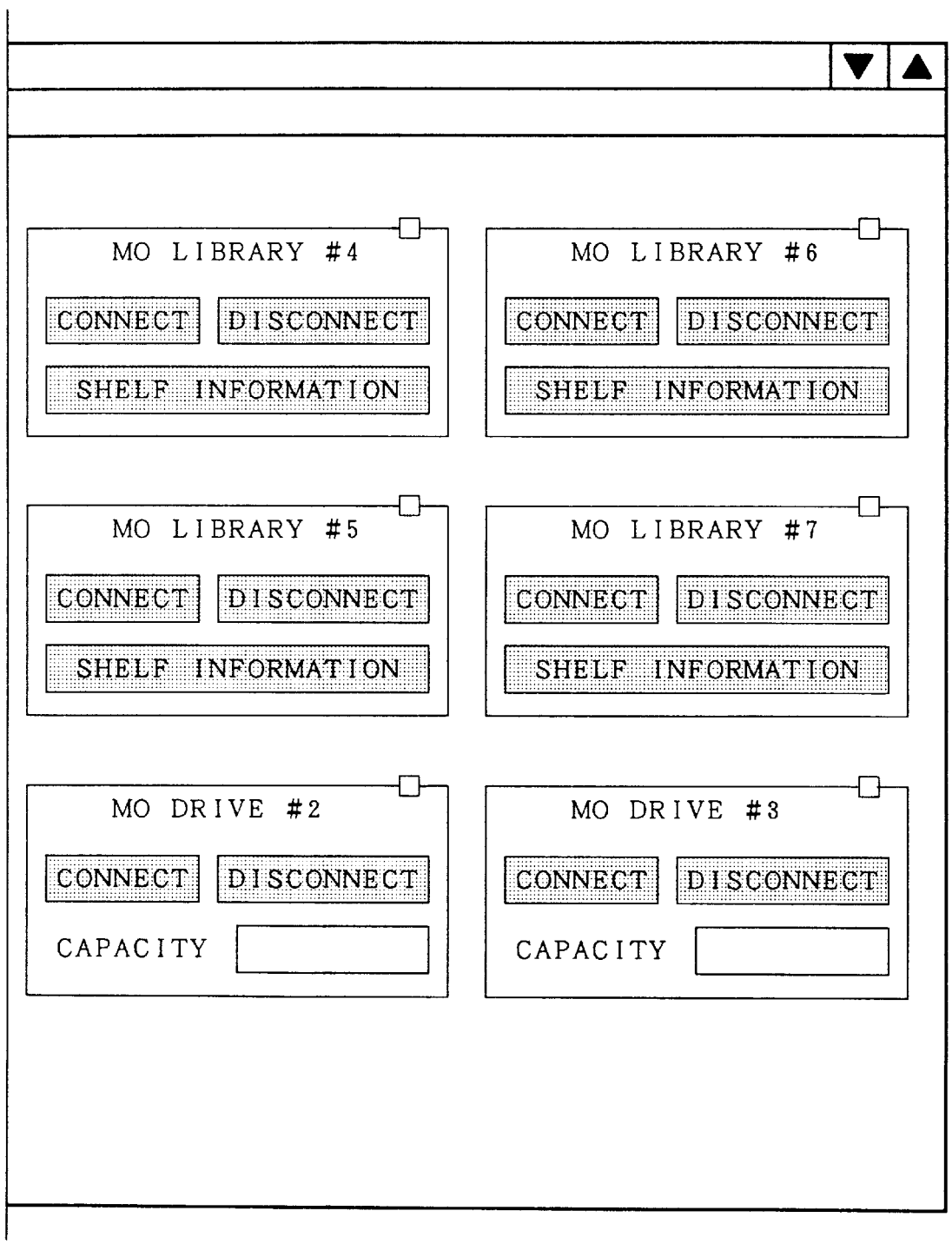

FIGS. 21A and 21B show an example of the apparatus constructing picture plane 162 in case of the system construction in the copy mode 1 in FIG. 20. In the apparatus constructing picture plane 162, it will be understood that the apparatus graphics of the MO drive apparatus 12-1 and MO library apparatus 16-1 in FIG. 20 are displayed as black frames and those apparatuses are in the installed state and that since the remaining apparatuses are displayed as white frames, they are in the un-installed state. That is, the system construction of the minimum construction in the invention in FIG. 20 can also cope with the installed state like an apparatus constructing picture plane 162 as shown in FIGS. 21A and 21B. Or, in the apparatus constructing picture plane 162 of the maximum installation shown in FIGS. 14A and 14B, by mouse-clicking the disconnecting box 166 with respect to the apparatus graphics other than the apparatus graphics 12-1 and 16-1, it is also possible to set the system construction into a state in which they are disconnected from the system construction in a software manner.

Figure 22:
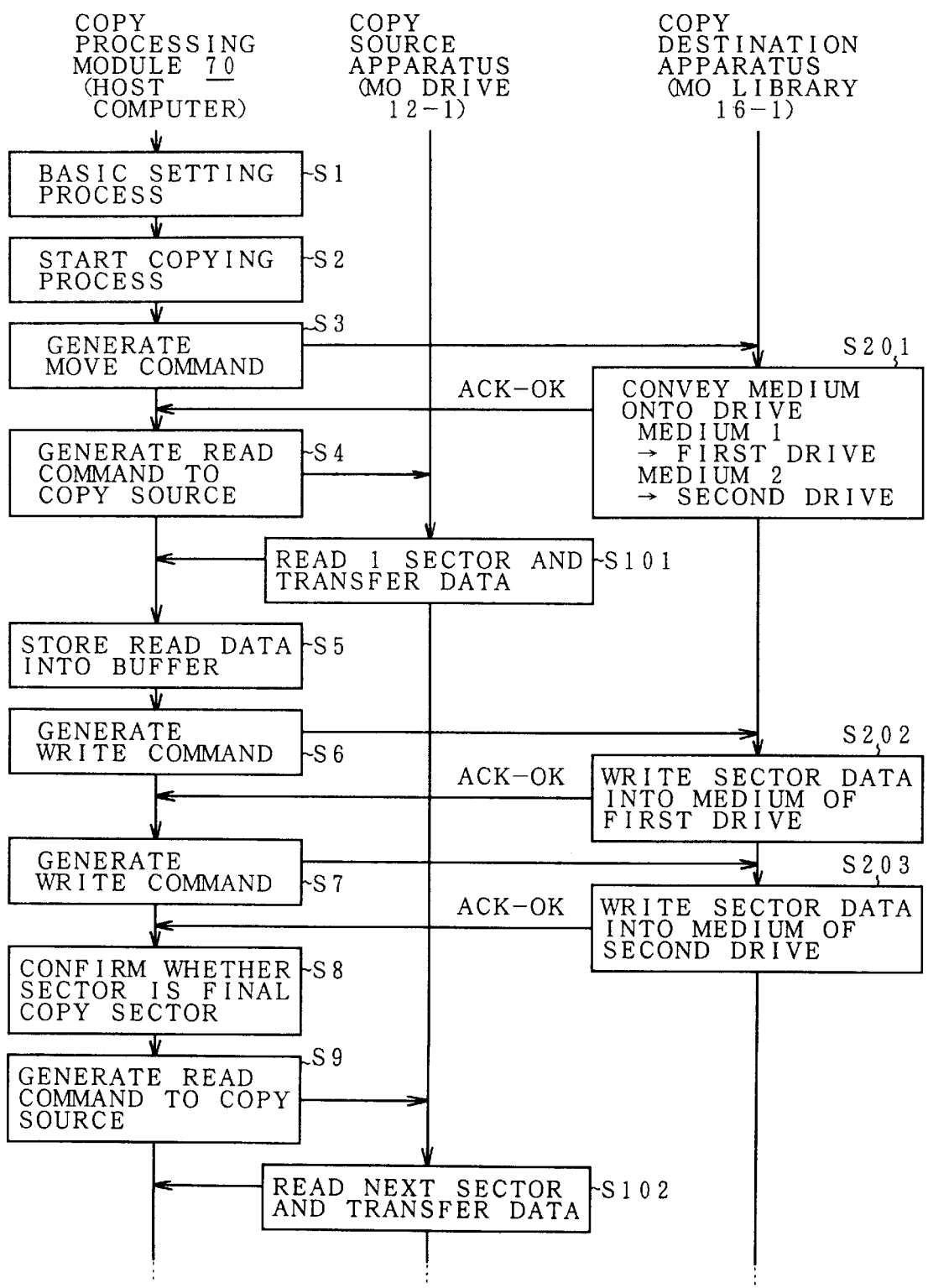
FIG. 22 is a time chart for a copying process in FIG. 20.
Figure 23:
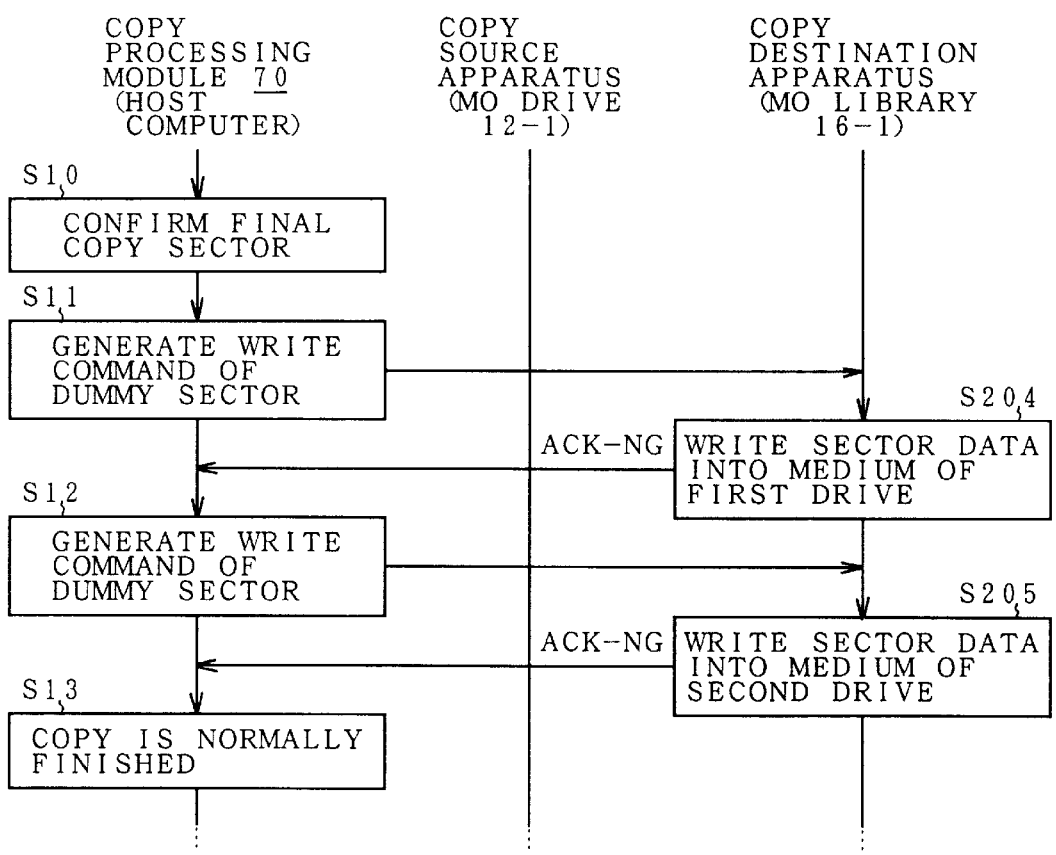
FIG. 23 is a time chart for the copying process in FIG. 20 subsequent to FIG. 23.

FIGS. 22 and 23 are time charts for the copying process which is executed among the copy processing module 70 of the host computer in the set state of the copy mode 1 in FIG. 20, the MO drive apparatus 12-1 as a copy source apparatus, and the MO library apparatus 16-1 as a copy destination apparatus. First, in the copy processing module 70, the system construction control and the setting process of the copy information are executed as a fundamental setting process in step S1. After completion of the fundamental setting, the copying process in step S2 can be activated by mouse-clicking the copy execution key 174 provided in the lower portion of the apparatus constructing picture plane 162 in FIG. 21. Obviously, prior to activating the copying process, the cartridge serving as a copy source is inserted into the MO drive apparatus 12-1 of the copy source and a plurality of cartridges serving as copy destinations are inserted in the MO library apparatus 16-1. In association with the activation of the copying process, the copy processing module 70 issues a move command to the MO library apparatus 16-1 in step S3. In response to the move command, the MO library apparatus 16-1 conveys the designated cartridge medium to the MO drive. Since two drives of the first and second MO drives are built in the MO library apparatus 16-1, two cartridges are conveyed as a medium 1 and a medium 2 to the respective drives. The copy processing module 70 subsequently generates a copy source read command to the MO drive apparatus 12-1 in step S4. In response to the read command, the MO drive apparatus 12-1 reads one head sector and the read data is transferred to the copy processing module 70 in step S101. The read data is stored into the buffer in step S5. Subsequently, the copy processing module 70 issues a write command to the first MO drive of the MO library apparatus 16-1 in step S6. In response to the write command, the transferred sector data is written into the medium of the first MO drive by the write command. The copy processing module 70 issues the write command to the second MO drive of the MO library apparatus 16-1 in step S7. In step S203, the same read data stored in the buffer is written as sector data. When the writing operation of the same sector data for the first and second MO drives are normally finished on the MO library apparatus 16-1 side by the generation of the write command of two times in steps S6 and S7, upon receipt of a confirmation response, the copy processing module 70 checks to see if the sector is the last copy sector in step S8. Since it is not the last copy sector in this case, the read command is again issued to the copy source in step S9. In response to the read command, the MO drive apparatus 12-1 reads the own sector and transfers the data in step S102. The above processes are repeated until the final sector. When the copy processing module 70 confirms the final sector in step S10 in FIG. 23, a write command of the dummy sector is issued to the MO library apparatus 16-1 in step S11. Upon receipt of the write command of the dummy sector, in the MO library apparatus 16-1, the dummy sector data is written into the medium of the first MO drive. In this instance, when the capacity of the medium is the same as that of the copy source, an error occurs in the writing operation of the dummy sector, so that an error response is returned. Subsequently, in step S12 in FIG. 22, the write command of the dummy sector is again issued to the second MO drive of the MO library apparatus 16-2, thereby allowing the second MO drive to write the dummy sector. If the capacity is the same as that of the copy source, an error also occurs in this case. In response to the error response, the copy processing module 70 normally finishes the copying process in step S13. The above processes are repeated with respect to all of the cartridges enclosed in the library apparatus 16-1 and serving as copy destinations.

Figure 24:
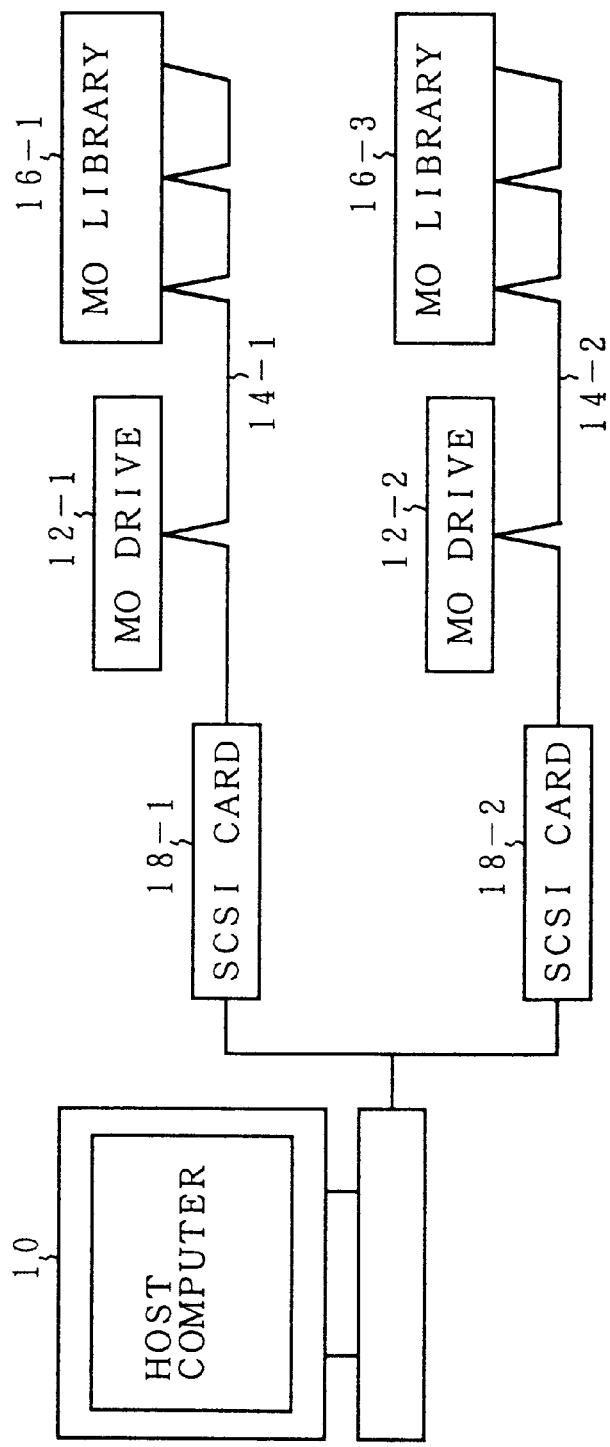
FIG. 24 is an explanatory diagram of a system construction in which the minimum constructions of two systems in FIG. 20 are provided.
Figure 25:
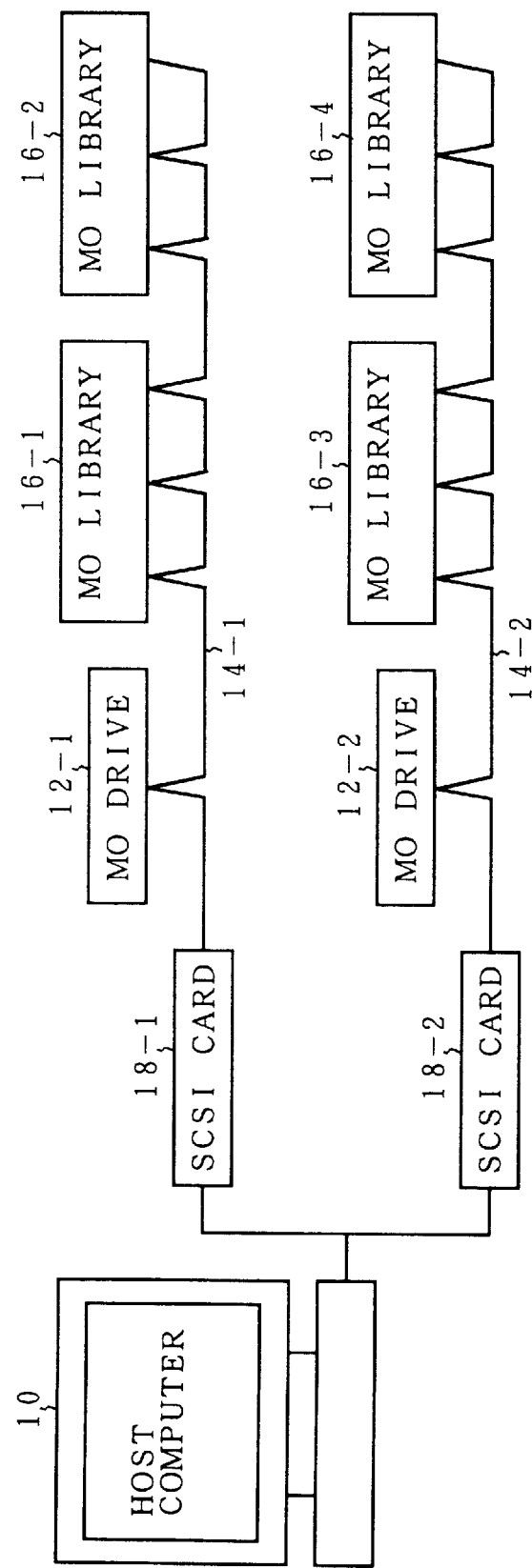
FIG. 25 is an explanatory diagram of a system construction in which MO library apparatuses are further added to FIG. 24.
Figure 26:
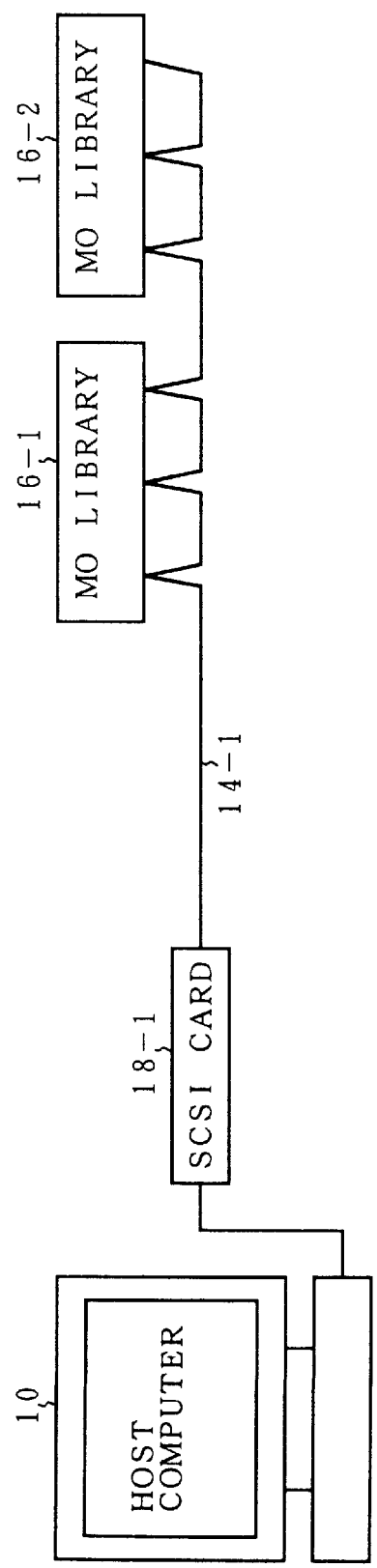
FIG. 26 is an explanatory diagram of a minimum system construction of the invention in which the MO library apparatus is set to a copy source.

Referring again to FIG. 19, when the number of MO drive apparatuses is not equal to 1 in step S3, namely, when there are a plurality of MO drive apparatuses, step S5 follows. A copy mode in which the MO drive apparatus connected to the same host adapter, namely, the SCSI card is set to the copy source and the MO library apparatus is set to the copy destination is set as a copy mode 2. For example, the copy mode 2 is used for a system form as shown in FIG. 24 as a target. In FIG. 24, the MO drive apparatuses 12-1 and 12-2 and MO library apparatuses 16-1 and 16-3 are connected to the SCSI buses 14-1 and 14-2 from the SCSI cards 18-1 and 18-2 in a rule such that one MO drive apparatus and one MO library apparatus are connected to one SCSI bus. The MO drive apparatuses 12-1 and 12-2 of the respective bus systems are set to the copy sources and the MO library apparatuses 16-1 and 16-3 are set to the copy destinations. As shown in FIG. 26, the copy mode 2 is also similarly applied to a system construction in which the second library apparatuses 16-2 and 16-4 are connected to each bus system.

Referring again to FIG. 19, when there is no MO drive apparatus in the system construction in step S1, step S6 follows and the MO library apparatus becomes the copy source. Further in step S7, a check is made to see if there is a host adapter, namely, SCSI bus to which two MO library apparatuses are connected. When there are two MO library apparatuses, step S8 follows and a copy mode 3 is automatically set. A fundamental system form of the copy mode 3 relates to a case where two MO library apparatuses 16-1 and 16-2 are connected to the SCSI bus 14-1 connected to the host computer 10 through the SCSI bus 18-1 as shown in FIG. 26. In the copy mode 3, a copy mode in which one of the two MO library apparatuses 16-1 and 16-2 connected to the bus of the same host adapter, namely, the same SCSI card 18-1 is set to the copy source and the other library apparatus is set to the copy destination is automatically set. In the invention, since the MO library apparatus 16-1 is defined as a master apparatus serving as a copy source with respect to the SCSI bus 14-1, the MO library apparatus 16-1 becomes the copy source and the MO library apparatus 16-2 becomes the copy destination.

As shown in FIG. 27, in addition to the fundamental construction of FIG. 26, a case where a bus system having two MO library apparatuses 16-3 and 16-4 through the SCSI bus 14-2 of the SCSI card 18-2 is added is also included in the copy mode 3. In those two bus systems, the MO library apparatuses 16-1 and 16-3 become the copy sources and the MO library apparatuses 16-2 and 16-4 become the copy destinations every bus system. As will be obviously understood from FIG. 2, the number of bus systems can be expanded to up to four systems.

Figure 29A:
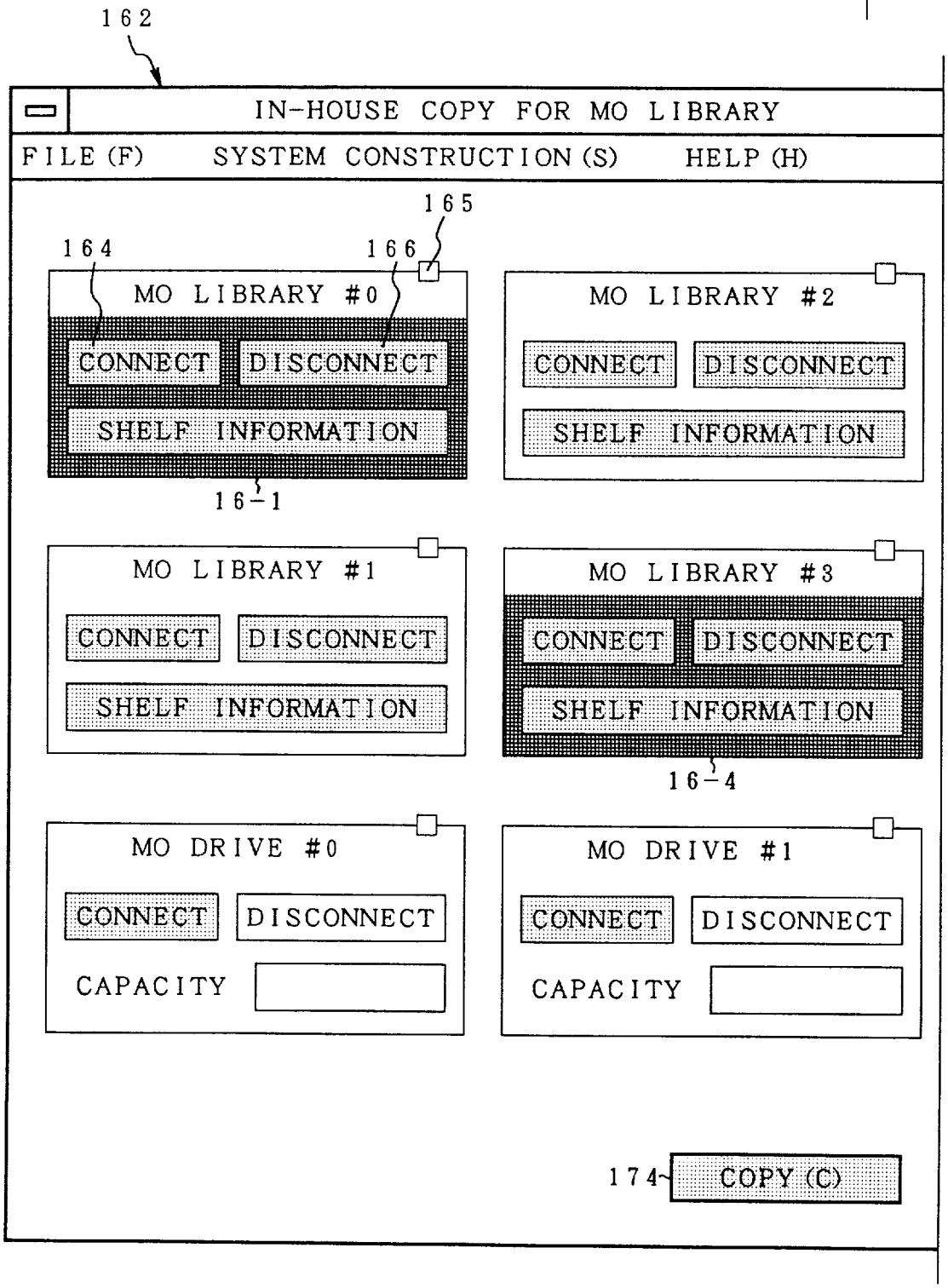
FIGS. 29A and 29B are explanatory diagrams of an apparatus constructing picture plane in which the system construction in FIG. 28 is realized.
Figure 29B:
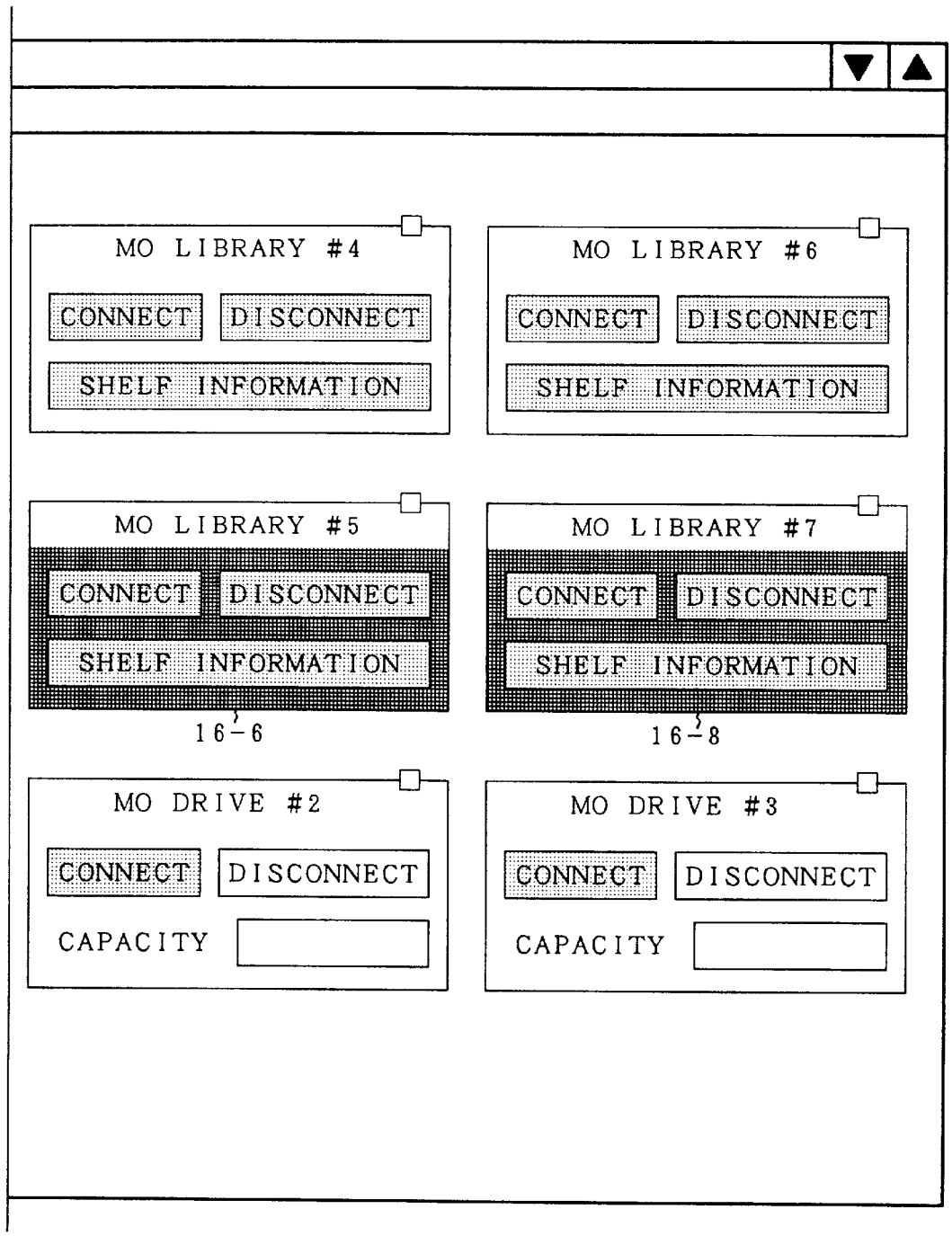

Referring again to FIG. 19, when the host adapter, namely, the bus system to which two MO library apparatuses are connected doesn't exist in step S7, step S9 follows. A check is made to see if the MO library apparatus is connected to the host adapter of No. 00, namely, the SCSI bus 14-1 of the SCSI card 18-1 in FIG. 2. When the MO library apparatus is connected to the SCSI bus 14-1 from the SCSI card 18-1 corresponding to the host adapter number 00, step S10 follows. A copy mode 4 is automatically set. FIG. 28 shows an example of the copy mode 4 which is set in step S10 in FIG. 19 and relates to a case where the MO library apparatuses 16-1, 16-4, 16-6, and 16-8 are respectively connected to the SCSI buses 14-1 to 14-4 of four systems in a rule such that one MO library apparatus is connected to one SCSI bus by the mouse-clicking operation of the connecting box 164 or disconnecting box 166 of the apparatus graphics in the apparatus constructing picture plane 162 as shown in FIGS. 29A and 29B. In such a copy mode 4 in which one MO library apparatus is connected to each bus system, since the MO library apparatus 16-1 has been defined as a master apparatus, it becomes the copy source and each of the MO library apparatuses 16-4, 16-6, and 16-8 of the other bus systems becomes the copy destination.

As mentioned above, in the setting of the copy information by the mouse-click of check box 135 or 146 of the copy information set picture plane 125 in FIG. 16, the setting process by the automatic selection of the copy modes 1 to 4 according to the flowchart of FIG. 20 is executed and by merely deciding which apparatus is set to the copy source by the user, the copy source and copy destination for the optimum copying process corresponding to the system form whose construction is controlled at that time are automatically set.

[User Setting of Copy Information]

FIG. 30 shows a copy information set picture plane 175 which is used in another embodiment of the copy information setting process according to the invention. Set contents of the copy information set picture plane 175 are divided into a copy unit setting 126, a copy group 132, a copy source setting 138, a copy destination setting 140, the number of copy sources 142, and the number of copy destinations 148. Further, the check box 154 to check the media capacity and the check box 156 to copy and verify (collation) are provided in a manner similar to FIG. 16. First, in the head copy unit setting 126, the copy of a sector unit can be designated by mouse-clicking a check box 128 and the copy of a file unit can be set by mouse-clicking a check box 130. In the next copy group 132, when the bus systems from the host computer are set to a group, the copy in the group is set by mouse-clicking a check box 134. The copy over the group is set by mouse-clicking a check box 136. In the copy source setting 136, the MO drive apparatuses 12-1 to 12-4 and MO library apparatuses 16-1 to 16-8 corresponding to the maximum construction of FIG. 2 are displayed together with the device numbers and names, check boxes are respectively provided for them, and an arbitrary apparatus can be set as a copy source by mouse-clicking the corresponding check box. In the copy source setting 138, when the copy source is not particularly set, the copy source is set by the modes 1 to 4 in accordance with the flowcharts of FIGS. 19A and 19B. In the copy destination setting 140, the eight MO library apparatuses 16-1 to 16-8 in the maximum construction in FIG. 2 are displayed together with the names and device numbers, check boxes are respectively provided for them, and an arbitrary MO library apparatus can be set as a copy destination as necessary. The number of copy sources 142 is used when the MO library apparatuses #0 to #7 are set by the mouse-click in the copy source setting 138. Upon setting of the number of copy sources 142, either one of a method of inputting the number of cartridges of the copy sources into a number setting box 144 and a method of selecting all of the cartridges of the copy sources in the check box 146 is selected. With respect to the number of copy destinations 148, the setting of all cartridges by a number setting box 150 and a check box 152 can be selected in a manner similar to the above.

FIG. 31 shows a specific set example of the copy information set picture plane 175 by the user setting and relates to a case where the copy mode of the system construction in FIG. 20 is set as an example. That is, the sector copy is set by mouse-clicking the check box 128 with respect to the copy unit 126. The copy in the group is set by mouse-clicking the check box 134 with respect to the copy group 132. The MO drive apparatus 12-1 of the device number #0 is set with respect to the copy source setting 138. Further, the MO library apparatus 16-1 of the device number #0 is set by mouse-clicking with respect to the copy destination 140. In addition, all of the cartridges enclosed in the MO library apparatus 16-1 are set to the copy destinations by mouse-clicking the check box 152 with respect to the number of copy destinations 148. As for the setting of the copy mode by the user setting using the copy information set picture plane 175 as mentioned above, with respect to each of the system constructions of FIGS. 24, 25, 26, 27, and 28 as well, the copy mode can be also freely decided by mouse-clicking a proper copy information setting as necessary.

[Copying Process in Which the Medium Capacity is Made Coincide]

Various copying processes of the invention by the copy processing module 70 provided for the host computer 10 in FIG. 7 will now be described in detail.

Figure 32A:
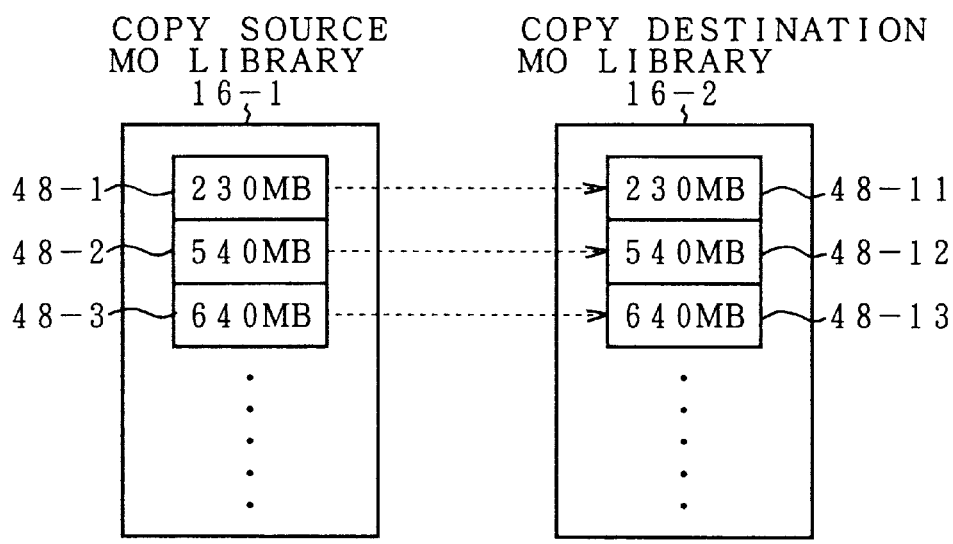
FIGS. 32A and 32B are explanatory diagrams of a copying process of the invention which is executed among media of the same capacity.

FIG. 32A shows a copying process in the case where the copy source is set to the MO library apparatus 16-1 and the copy destination is set to the MO library apparatus 16-2. In the copying process, a cartridge 48-1 of 230 MB, a cartridge 48-2 of 540 MB, and a cartridge 48-3 of 640 MB are enclosed in the copy source. On the other hand, a cartridge 48-11 of 230 MB, a cartridge 48-12 of 540 MB, and a cartridge 48-13 of 640 MB are also enclosed in the MO library apparatus 16-2 of the copy destination. As mentioned above, when the cartridges of the different capacities are enclosed in the copy source and copy destination, the copy processing module 70 of the invention controls in a manner such as to perform the copying process between the cartridges of the same capacity.

Figure 32B:
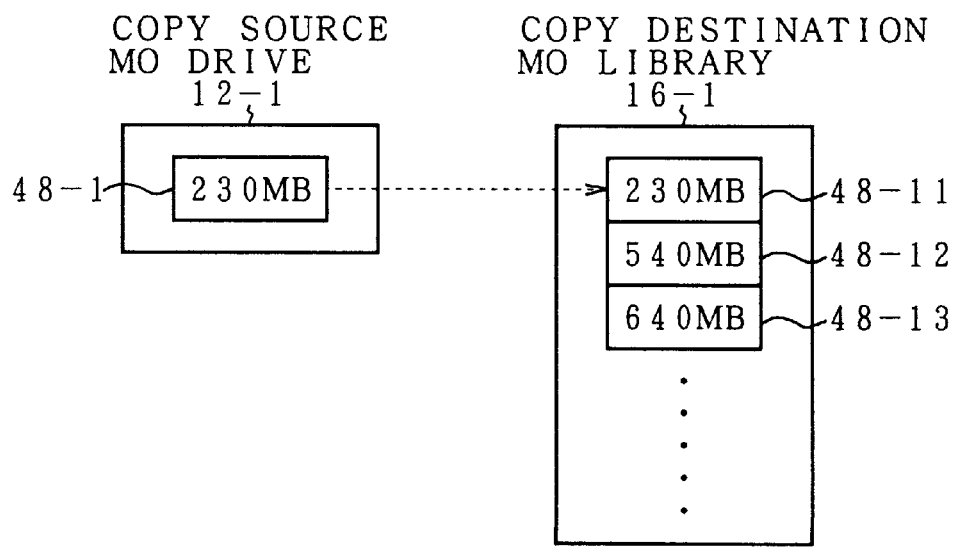

FIG. 32B shows a case where the copy source is set to the MO drive apparatus 12-1 and the copy destination is set to the MO library apparatus 16-1 and the copying process is executed to the copy destination cartridge 48-11 of the same capacity as the capacity 230 MB of the cartridge 48-1 of the copy source.

Figure 33B:
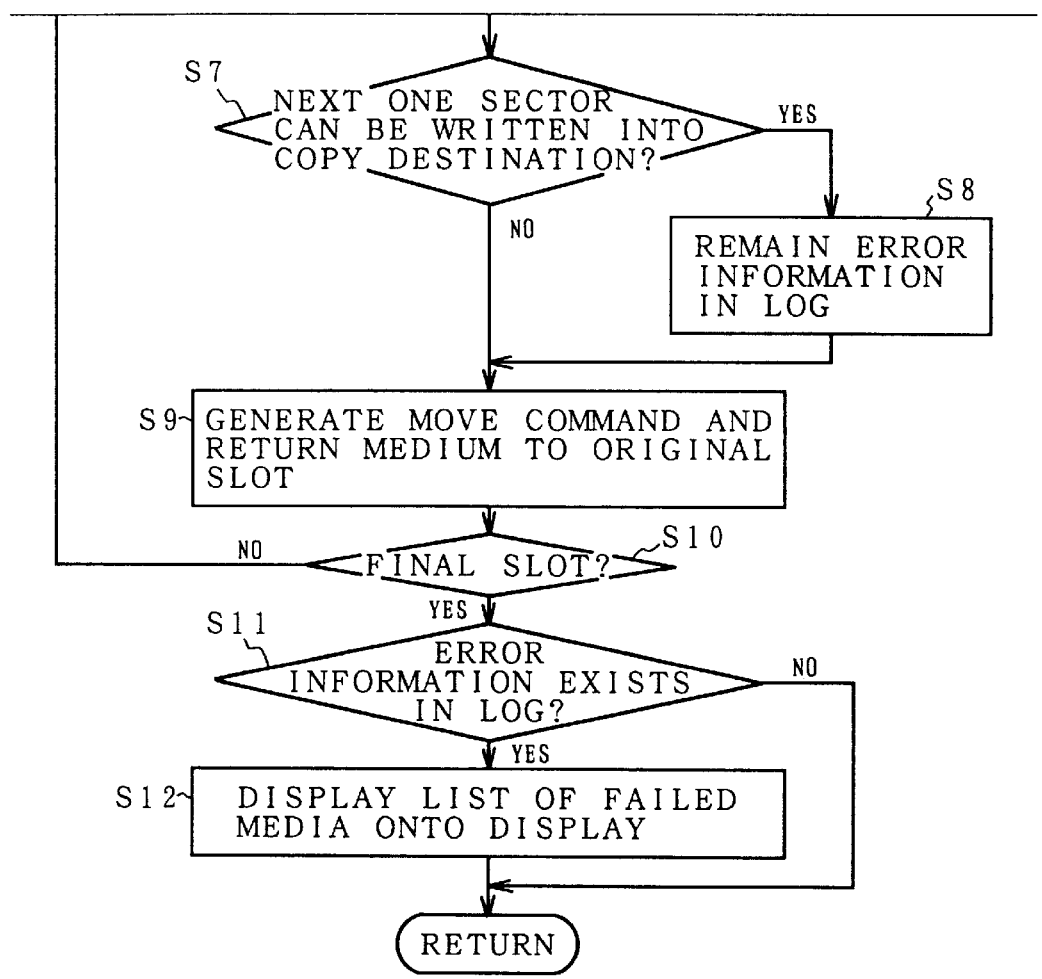

FIGS. 33A and 33B are flowcharts for the copying process in which the cartridge capacities are equalized among the MO library apparatuses in FIG. 32A. First in step S1, the move command is issued to the copy source MO library apparatus 16-1 and the copy source cartridges are sequentially inserted into the first and second MO drives in accordance with the order of the slot numbers. Specifically speaking, the cartridge 481 of 230 MB of the copy source is conveyed and inserted a into the first MO drive and the cartridge 48-2 of 540 MB is conveyed and inserted into the second MO drive. In step S2, the move command is issued to the copy destination MO library apparatus 16-2 and the copy source cartridges are sequentially inserted into the first and second MO drives in accordance with the order of the slot numbers. That is, the cartridge 48-11 of 230 MB enclosed in the slot of the MO library apparatus 16-2 of the copy destination is conveyed and inserted into the first MO drive and the cartridge 48-12 of 540 MB is conveyed and inserted into the second MO drive. In step S3, the channel command word CCW for copying is issued and copying processes are executed in parallel between the first MO drive of the copy source and the first MO drive of the copy destination and between the second MO drive of the copy source and the second MO drive of the copy destination, respectively. The copying process is a process for extracting the sector data from the copy source cartridge on a sector unit basis and writing into the copy destination. With respect to the copying process of the sector unit in step S3, a check is made to see if an error has occurred in step S4. For example, when the capacity of the copy source cartridge is larger than that of the copy destination cartridge, since a write error occurs during the copying operation of the sector unit, error information is written into a log in step S5 at that time. When no error occurs in step S4, the copying process in step S3 is repeated until the writing operation of the data of all sectors of the copy source cartridge into the copy destination is finished in step S6. After completion of the writing of the final sector of the copy source cartridge, step S7 follows and a check is made to see if next one sector can be written into the copy destination cartridge. For example, when considering the copying process from the cartridge 48-1 of 230 MB of the copy source in FIG. 32A to the cartridge 48-11 of 230 MB of the copy destination, next one sector after the end of the writing of the final sector cannot be written in step S7, so that a write error occurs. In this case, it is determined that the cartridge capacity of the copy source and that of the copy destination are equal, so that the move command is issued in step S9 as a normal end of the copying process and the copy source cartridge and copy destination cartridge after completion of the copying operation are returned to the original slots in the library apparatuses 16-1 and 16-2, respectively. On the other hand, when next one sector after the end of the writing of the final sector of the copy source could be written into the copy destination in step S7, for example, in case of the 230 MB cartridge 48-1 of the copy source in FIG. 32A, the cartridge capacity of the copy destination corresponds to the capacity of the 540 MB cartridge 48-12 or 640 MB cartridge 48-13 larger than 230 MB. In this case, it is decided that the cartridge capacities of the copy source and copy destination don't coincide. In step S8, error information indicative of the dissidence of the capacities, for example, a size error E is left in the log. The processes in steps S1 to S9 mentioned above are repeated until it is discriminated in step S10 that the final slot of the copy destination MO library apparatus 16-2 has been processed. When the copying process of the cartridge of the final slot is finished, step S11 follows. If there is error information in the log, in step S12, a list of failed cartridges is displayed on the display as shown in, for example, the shelf information window 176 in FIG. 17. By checking the shelf information window 176, the user can know that the copying process has normally been finished with respect to the cartridges of the slots excluding the slot in which the error information is displayed. The user opens the tray and takes out the cartridge which was normally copied from the slot.

Figure 34B:
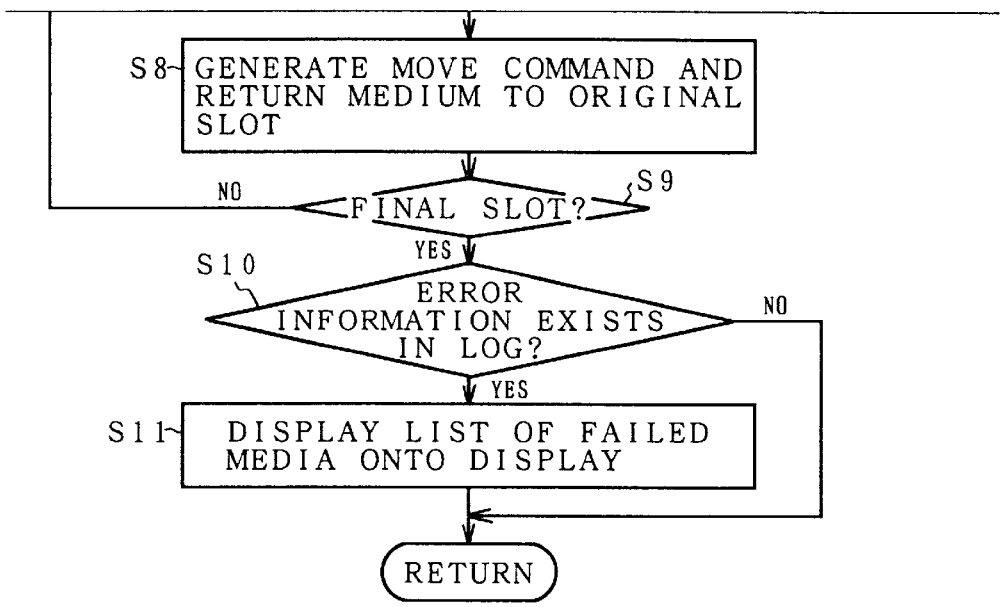

FIGS. 34A and 34B are flowcharts for the copying process in which the cartridge capacities are made coincident in the case where the copy source in FIG. 32B is set to the MO drive apparatus 12-1 and the copy destination is set to the MO library apparatus 16-1. First in step S1, the move command is issued to the MO library apparatus 16-1 of the copy destination and the copy destination cartridges are sequentially conveyed and inserted into the first and second MO drives in accordance with the order of the slot numbers. The channel command word CCW for copying is issued in step S2 and the parallel copying processes of the sector unit are executed from the 230 MB cartridge 48-1 of the copy source to the 230 MB cartridge 48-11 and 540 MB cartridge 48-12 inserted in the first and second MO drives of the copy destinations. In this case, since the capacities of the two cartridges 48-11 and 48-12 serving as copy destinations are equal to 230 MB and 540 MB and are larger than the capacity of 230 MB of the copy source cartridge 48-1, the error generation in step S3 doesn't occur during the copying operation. In step S5, the writing operation until the final sector of the copy source is normally carried out. In step S6, next one sector is written into the copy destination. With regard to the cartridge 48-11 of 230 MB of the copy destination, it is determined that the capacity is equal to that of the copy source by the write error. However, as for the 540 MB cartridge 48-12 of the copy destination, next one sector is normally written and it is decided that the capacity doesn't coincide with that of the copy source. In step S7, a logging to leave the error information in the shelf information of the cartridge 48-12 is performed. In step S8, the move command is issued to the MO library apparatus 16-1 of the copy destination. The cartridges 48-11 and 48-12 are returned to the original slots. In step S9, the processes in steps S1 to S8 are repeated up to the final slot of the MO library apparatus 16-1. After completion of the copying process of up to the final slot, a check is made in step S10 to see if log-in error information exists. In this case, since the log-in error information exists, it is displayed as shelf information onto the display in step S1. By seeing the display contents, a fact that the capacities of the 540 MB cartridge 48-12 and 640 MB cartridge 48-13 shown in FIG. 32B don't coincide with the capacity of the copy source cartridge 48-1 is known from the error information. Only the cartridge 48-11 can be taken out from the MO library apparatus 16-1 as a copy cartridge after completion of the copying process. In the copying process in FIGS. 32A and 32B as mentioned above, even in the case where the cartridge whose capacity differs from that of the copy source mixedly exists in the MO library apparatus of the copy destination, the normal result of the copying process can be obtained with respect to the cartridge of the copy destination having the same capacity as that of the copy source. There is no need to unify the capacities of the cartridges of the copy destinations. Therefore, the copying work of a number of cartridges in which the library apparatus is used as a copy destination can be easily performed and an excellent use efficiency is derived.

[Copying Process in Association with Capacity Check]

Figure 35A:
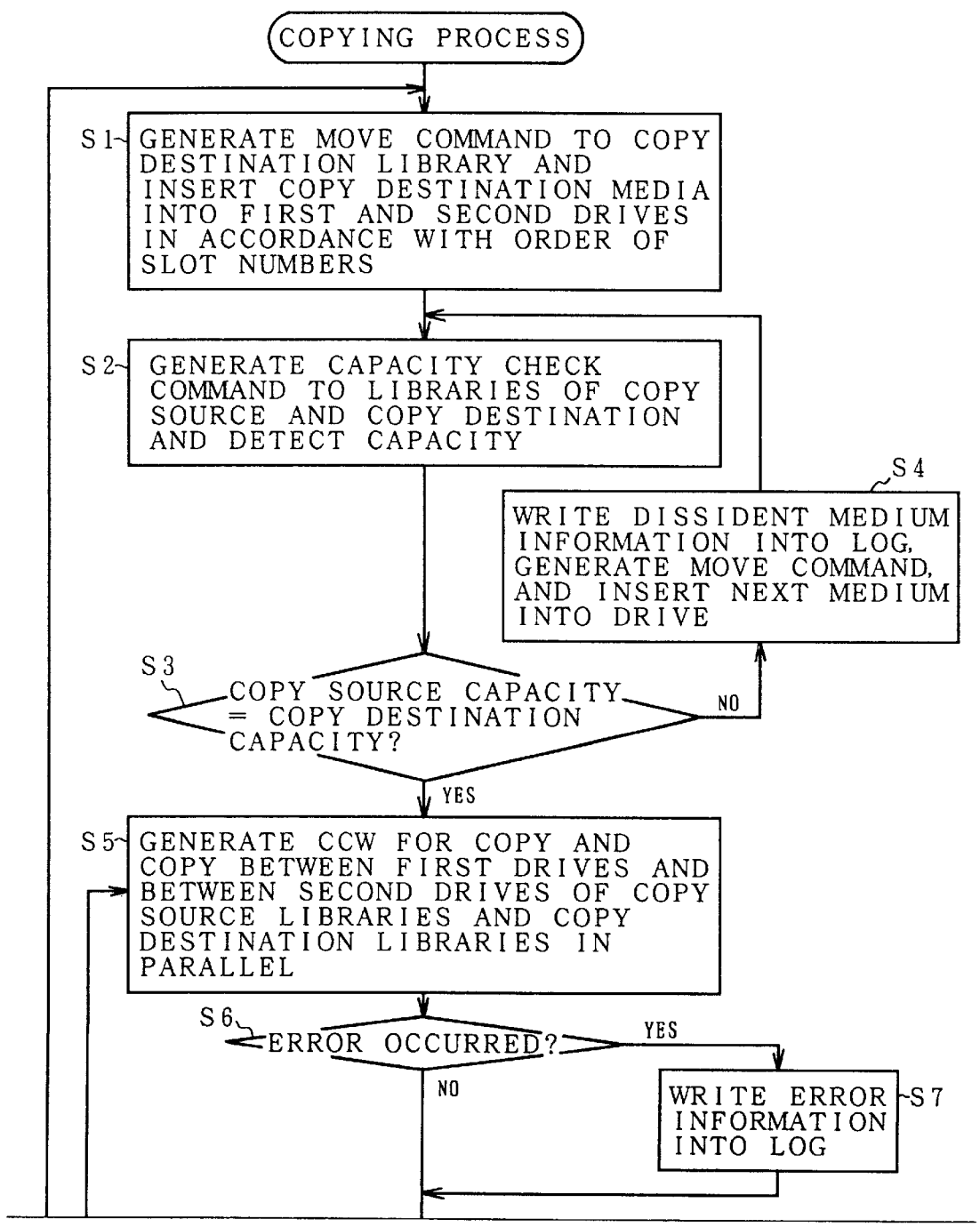
FIGS. 35A and 35B are flowcharts for a copying process in which a copy source is set to the MO drive apparatus and a copy destination is set to the MO library apparatus by checking a copy destination medium capacity.
Figure 35B:
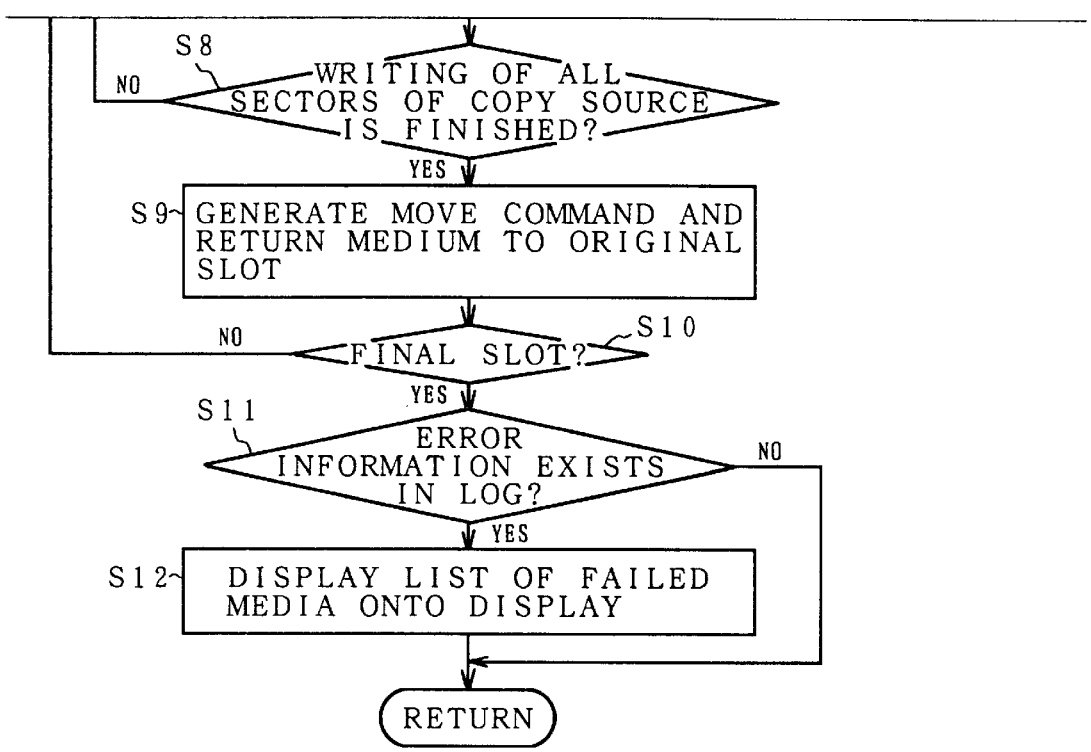

FIGS. 35A and 35B are flowcharts for the copying process constructed in a manner such that in the case where the copy source is set to the MO drive apparatus 12-1 and the copy destination is set to the MO library apparatus 16-1, the capacity of the cartridge of the copy destination is detected prior to the copying process and the copying process is executed with respect to only the copy destination cartridge with the same capacity as that of the copy source as shown in FIG. 32B. In the above copying process, subsequent to the same step S1 as that in FIG. 34A, in step S2, a capacity check command is issued to each of the MO drive apparatus 12-1 of the copy source and the MO library apparatus 16-1 of the copy destination and the capacities are detected. In step S3, a check is made to see if the copy source capacity and the copy destination capacity are equal. When the capacities of the copy source and copy destination are equal, step S5 follows. A channel command word for copying is issued, thereby performing the parallel copying processes from the MO drive apparatus 12-1 of the copy source to the cartridges of the first and second MO drives of the MO library apparatus 16-1 of the copy destination. On the other hand, when the copy source capacity and the copy destination capacity don't coincide in step S3, step S4 follows and medium information indicative of the dissidence is written into the log. The move command is generated. The cartridge of the copy destination in which the capacity doesn't coincide is returned to the slot. The next cartridge is conveyed and inserted into the MO drive. The processing routine is returned to step S2 and the capacity check command for the copy destination cartridge which was newly inserted is issued and the capacity is detected. Thus, the cartridges as targets of the copying process in step S5 and subsequent steps become only the cartridges in which the capacity is the same as that of the copy source. During the copying operation, a check is made in step S6 to see if an error has occurred. If an error occurs, error information is written into the log in step S7. The copying process of the sector unit in step S5 is repeated until the end of the writing of all sectors into the copy destination in step S8. When the writing operation is finished, the move command is issued and the cartridge of the copy destination is returned to the original slot in step S9. In this instance, in the copying process in FIGS. 34A and 34B, after the writing of the final sector was finished, whether the capacities coincide or differ is discriminated by writing next one sector into the copy destination as shown in steps S6 and S7. In the copying process of FIGS. 35A and 35B, however, since the coincidence of the capacities of the copy source and the copy destination has already been discriminated in the processes in steps S2 and S3 before the start of the copying operation, such a process is unnecessary. In step S10, the processes in steps S1 to S9 are repeated up to the final slot of the copy destination MO library apparatus 16-1. When the copying process of the final slot is finished, a check is made in step S11 to see if error information exists in the log. If there is error information, a list of error information is displayed as shelf information window onto the display in step S12. The copy destination cartridges excluding the cartridge in which the error occurred are taken out as normal end.

Figure 36A:
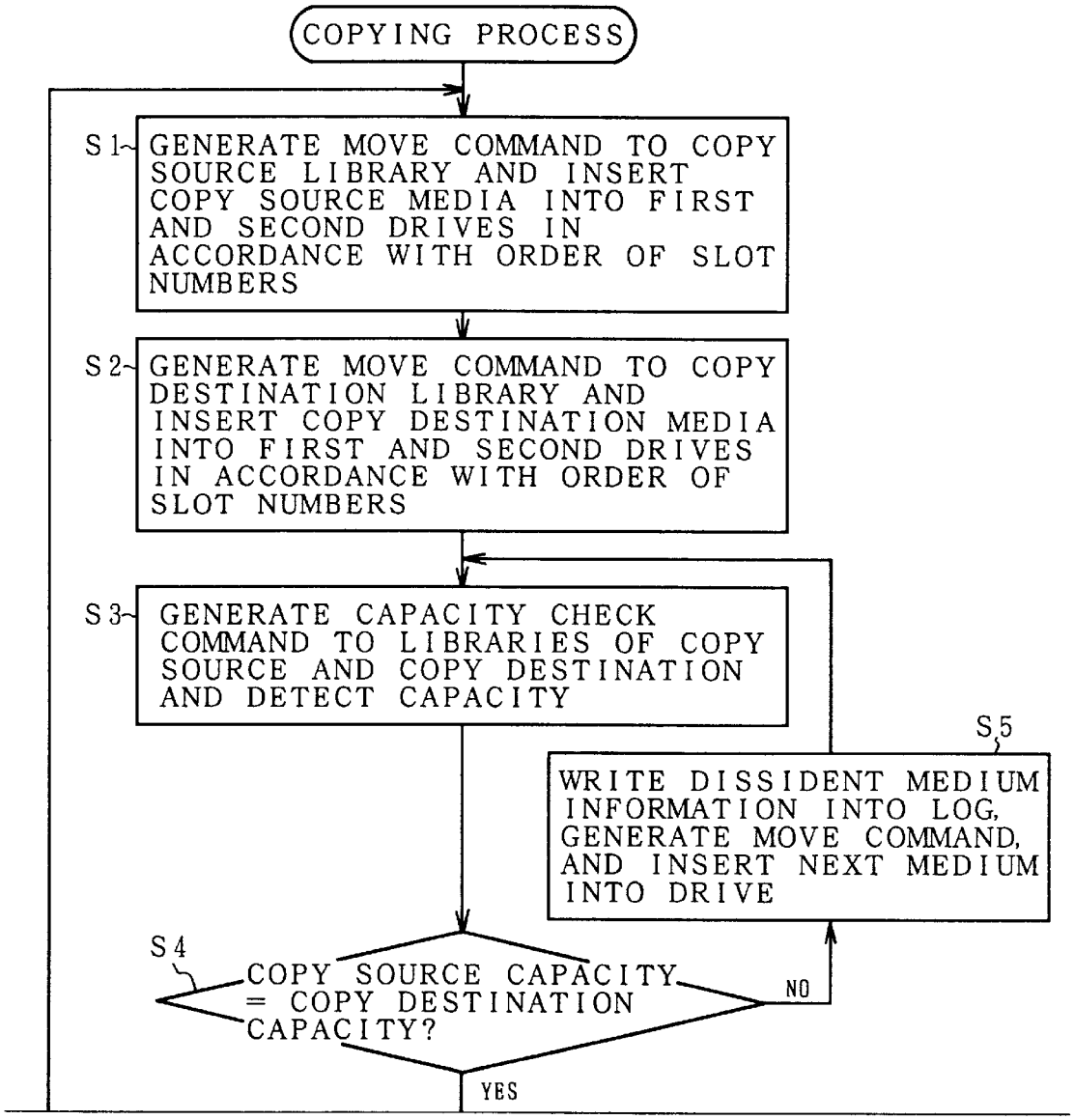
FIGS. 36A and 36B are flowcharts for the copying process which is executed among the library apparatuses by checking the copy destination medium capacity.
Figure 36B:
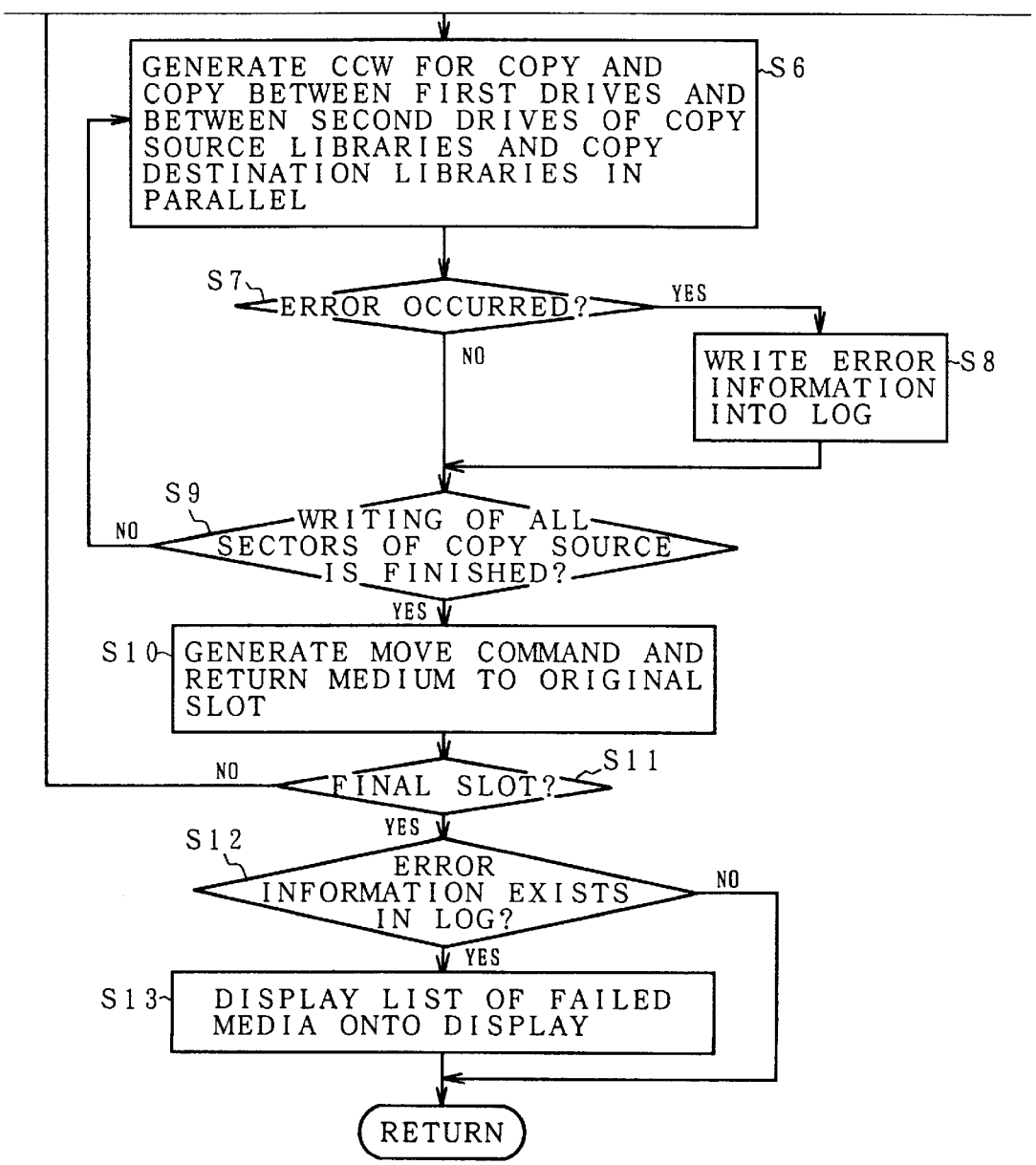

FIGS. 36A and 36B are flowcharts in the case where the copying process of the invention in which the capacities of the copy source and the copy destination are discriminated before the copying process is started is applied with respect to the copying process between the copy source MO library apparatus 16-1 and the copy destination MO library apparatus 16-2 in FIG. 32A. Even in the flowchart of FIGS. 36A and 36B, the capacity check command is issued to the MO library apparatuses 16-1 and 16-2 of the copy source and copy destination and the capacities are detected in steps S3 and S4. Only when the coincidence of the capacities is derived, the processing routine advances to the copying process from step S6. According to the copying processes in FIGS. 35A and 35B and FIGS. 36A and 36B as mentioned above, since the cartridge capacities are read and checked before the copying process, the time for the copying process can be remarkably reduced as compared with the case where the coincidence or dissidence of the capacities is discriminated at the time point when the copying processes of all of the sectors of the copy source are finished like copying process in FIGS. 33A and 33B.

[Copying Process in Which a Difference Between Medium Capacities is Allowed]

Figure 37A:
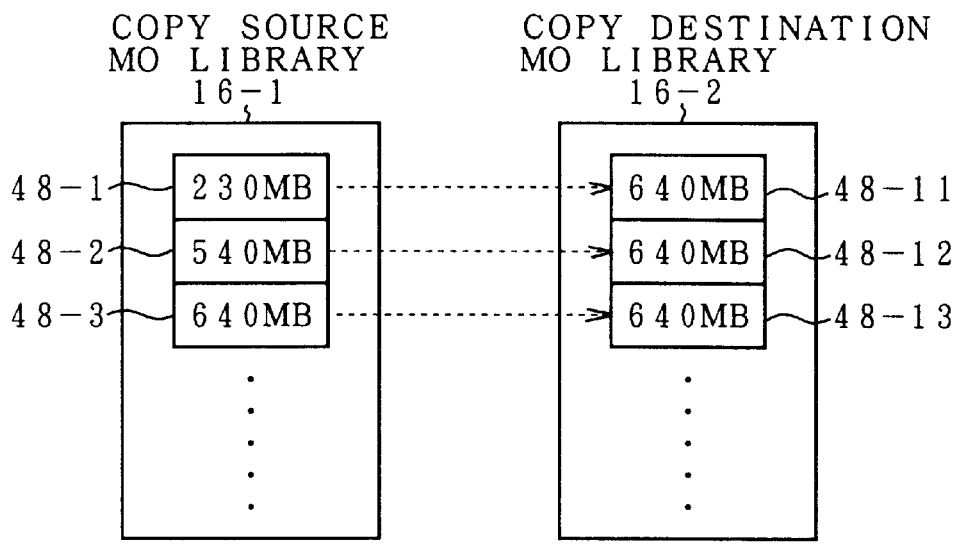
FIGS. 37A and 37B are explanatory diagrams of a copying process of the invention which is executed among media of different capacities.

FIG. 37A is an explanatory diagram of the copying process of the invention in the case where a difference between the cartridge capacities is permitted between the copy source MO library apparatus 16-1 and copy destination MO library apparatus 16-2. In this example, the cartridges of different capacities such as 230 MB cartridge 48-1, 540 MB cartridge 48-2, and 640 MB cartridge 48-3 are enclosed in the copy source. On the other hand, the 640 MB cartridges 48-11, 48-12, and 48-13 of the capacity larger than the copy source capacity are enclosed in the copy destination MO library apparatus 16-2. As mentioned above, when the cartridge capacities of the copy source and copy destination are different, in the embodiments of FIGS. 33A to 36B, the copying process can be performed only between the cartridges of the same capacity. However, in the embodiment, so long as the copy destination capacity is larger than the copy source capacity, the copying process is enabled.

Figure 37B:
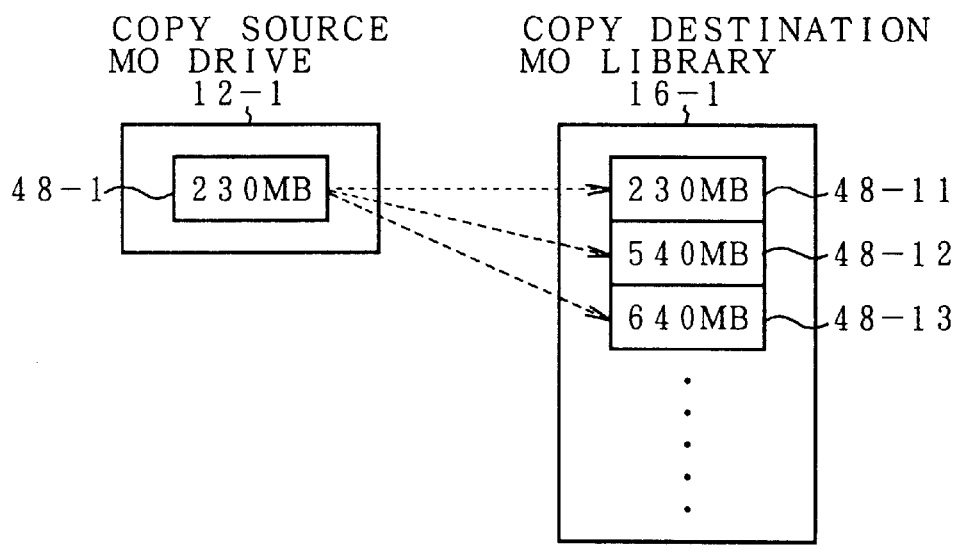

FIG. 37B shows a copying process constructed in a manner such that the difference of the cartridge capacities is permitted in the case where the copy source is set to the MO drive apparatus 12-1 and the copy destination is set to the MO library apparatus 16-1. The copying process can be performed without being restricted by the difference of the medium capacities from the 230 MB cartridge 48-1 of the copy source to the 230 MB cartridge 48-11, 540 MB cartridge 48-12, and 640 MB cartridge 48-13 of the copy destination having the capacities which are equal or larger than 230 MB.

Figure 38B:
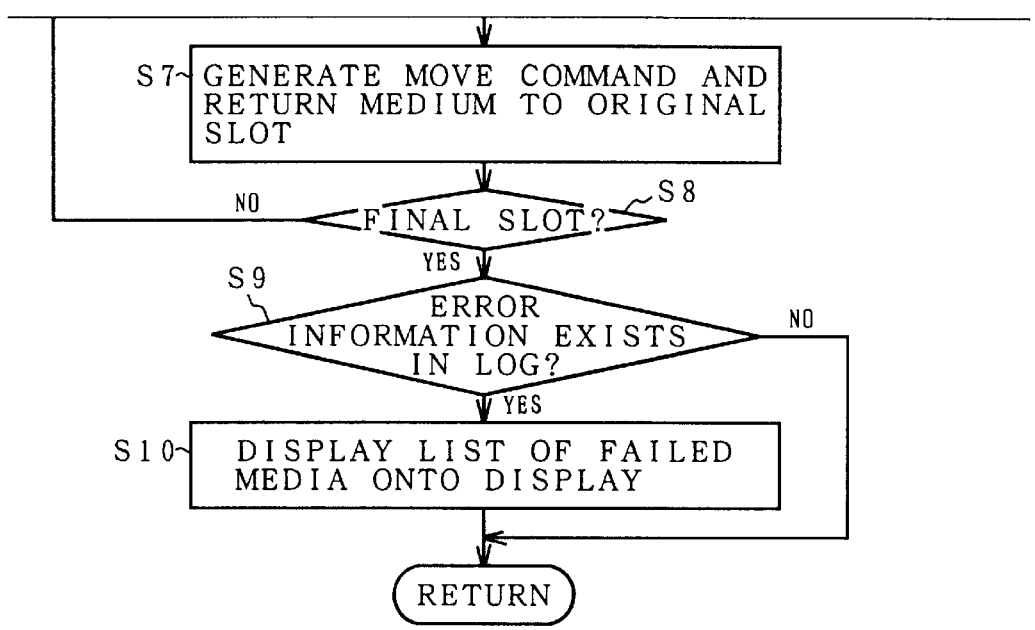

FIGS. 38A and 38B are flowcharts for the copying process in which a difference of the cartridge capacities between the MO library apparatuses in FIG. 37A is permitted. In the copying process, after the copy source cartridge and copy destination cartridge were conveyed and inserted to the first and second drives of the MO library apparatuses of the copy source and copy destination in steps S1 and S2, respectively, the channel command word CCW for copying is issued and the parallel copying processes are started on a sector unit basis in step S3. When an error occurs during the copying operation in step S4, the error information is written into the log in step S5. By the detection of the error generation during the copying operation in step S4 and the writing of the error information into the log in step S5, a failure of the copying process in the case where the capacity of the cartridge of the copy destination is smaller than the capacity of the copy source cartridge can be recognized after all of the copying processes were finished by the writing of the error information into the log information. The copying process of the sector unit in step S3 is repeated until the end of the writing of all sectors of the copy source to the copy destination in step S6. When the end of the writing is discriminated, the move command is issued in step S7 and the media of the copy source and copy destination are returned to the original slots. The processes in steps S1 to S7 are repeated up to the cartridge of the final slot of the copy destination in step S8. When the copying process of the cartridge of the final slot is finished, a check is made to see if the error information exists in the log in step S9. When there is the error information, a list of failed media is displayed as library shelf information onto the display in step S10. In the shelf information, if there is a cartridge of a capacity less than that of the cartridge of the copy source, a write error occurs during the copying process of the sector unit and is written as error information into the log and the result is displayed in the shelf information. Therefore, it is sufficient to remove the cartridge in which the error information is displayed as an error cartridge.

Figure 39:
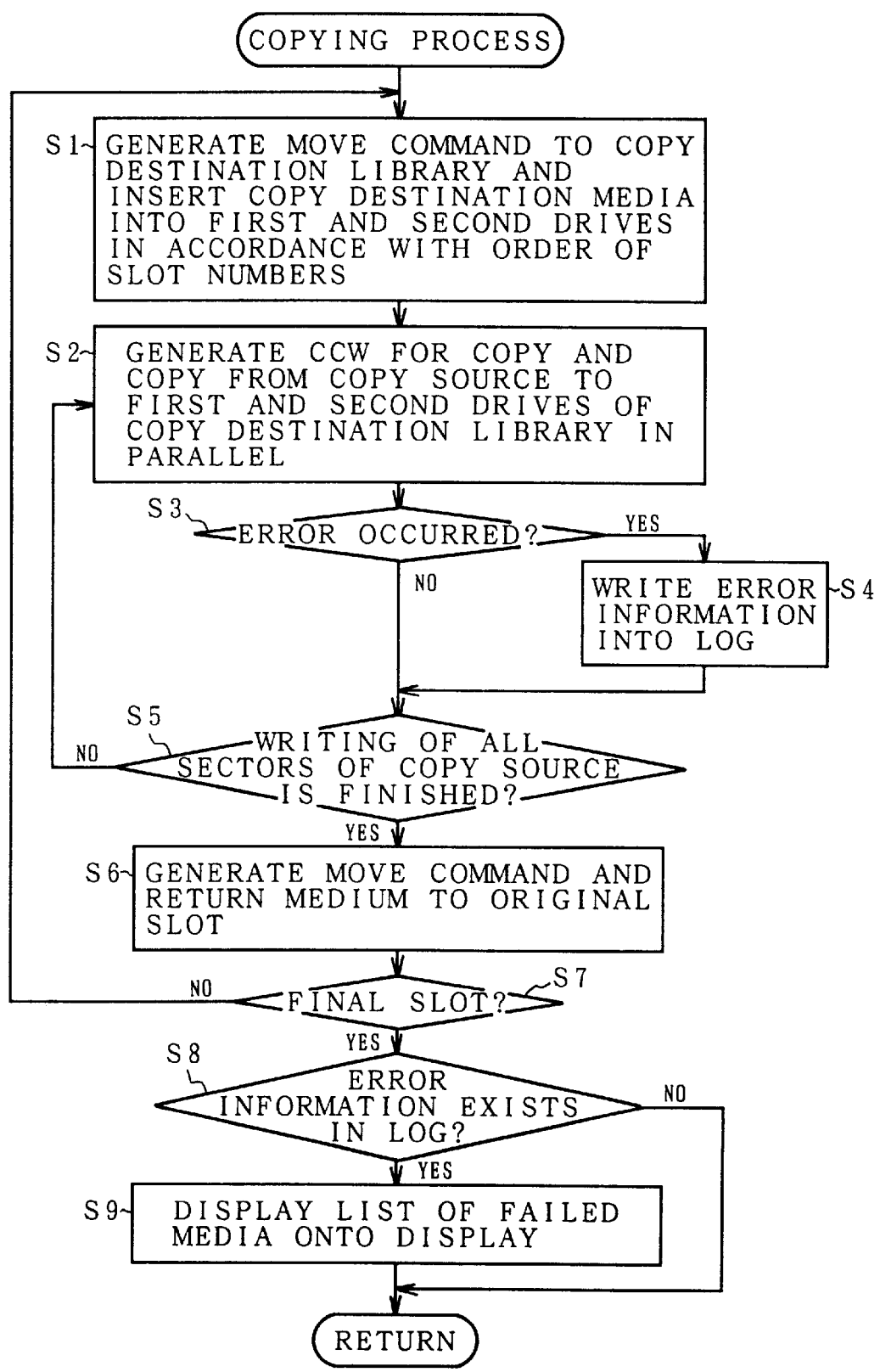
FIG. 39 is a flowchart for the copying process in FIG. 37 in which a copy source is set to the MO drive apparatus and a copy destination is set to the MO library apparatus.

FIG. 39 is a flowchart for the copying process in which a difference of the cartridge capacities is permitted in the case where the copy source in FIG. 37B is set to the MO drive apparatus 12-1 and the copy destination is set to the MO library apparatus 16-1. Even in such a copying process, the move command is issued to the MO library apparatus 16-1 of the copy destination and the cartridges are respectively inserted into the first and second MO drives, in step S1. After that, the channel command word CCW for copying is issued in step S2 and the parallel copying processes of the sector unit are repeated. When the medium capacity of the copy destination is smaller than the capacity of the copy source during the copying process, the write error occurs in the middle of the copying operation and the error generation is discriminated in step S3. The error information is written into the log with respect to the copy destination medium cartridge in step S4. The processes after step S5 are substantially the same as those after step S6 in FIG. 38. As mentioned above, in the copying process in which the difference of the cartridge capacities is permitted, the copy destination cartridge of the capacity smaller than the cartridge capacity of the copy source which could not be normally copy processed, namely, the cartridge having the error information can be recognized and eliminated from the error information caused during the copying operation. The copying process when the cartridge capacity of the copy destination is equal to or larger than that of the copy source can be normally performed. Particularly, as shown in FIG. 37A, the copying process in the case where the capacities of the copy destination cartridges are matched with the same capacity larger than that of the copy source can be properly performed.

[Copying Process Recognizing Recording Range]

Figure 40:
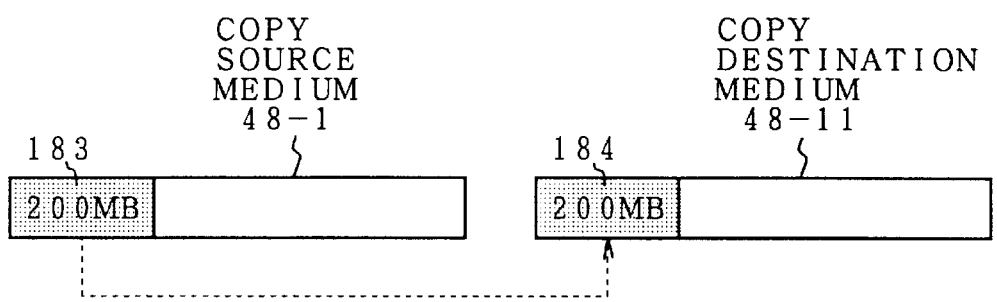
FIG. 40 is an explanatory diagram of a copying process of the invention which is executed by checking a recording range of the copying source.

FIG. 40 is an explanatory diagram of the copying process for recognizing a range of data actually recorded in the copy source cartridge 48-1 and copying the data to the copy destination cartridge 48-11. For example, file data has been recorded in a range of 200 MB as a recording range of the copy source cartridge 48-1. A recording range 183 is recognized and the data of 200 MB serving as a same recording range 184 as that of the recording range 183 is written into the copy destination cartridge 48-11. Specifically speaking, the number of sectors or the number of bytes is recognized from a file header or the like of the recording range 183 in the copy source cartridge 48-1 and the copying processes of the number corresponding to the number of sectors or the number of bytes recognized are executed for the copy destination cartridge 48-11, thereby finishing the copying process.

Figure 41A:
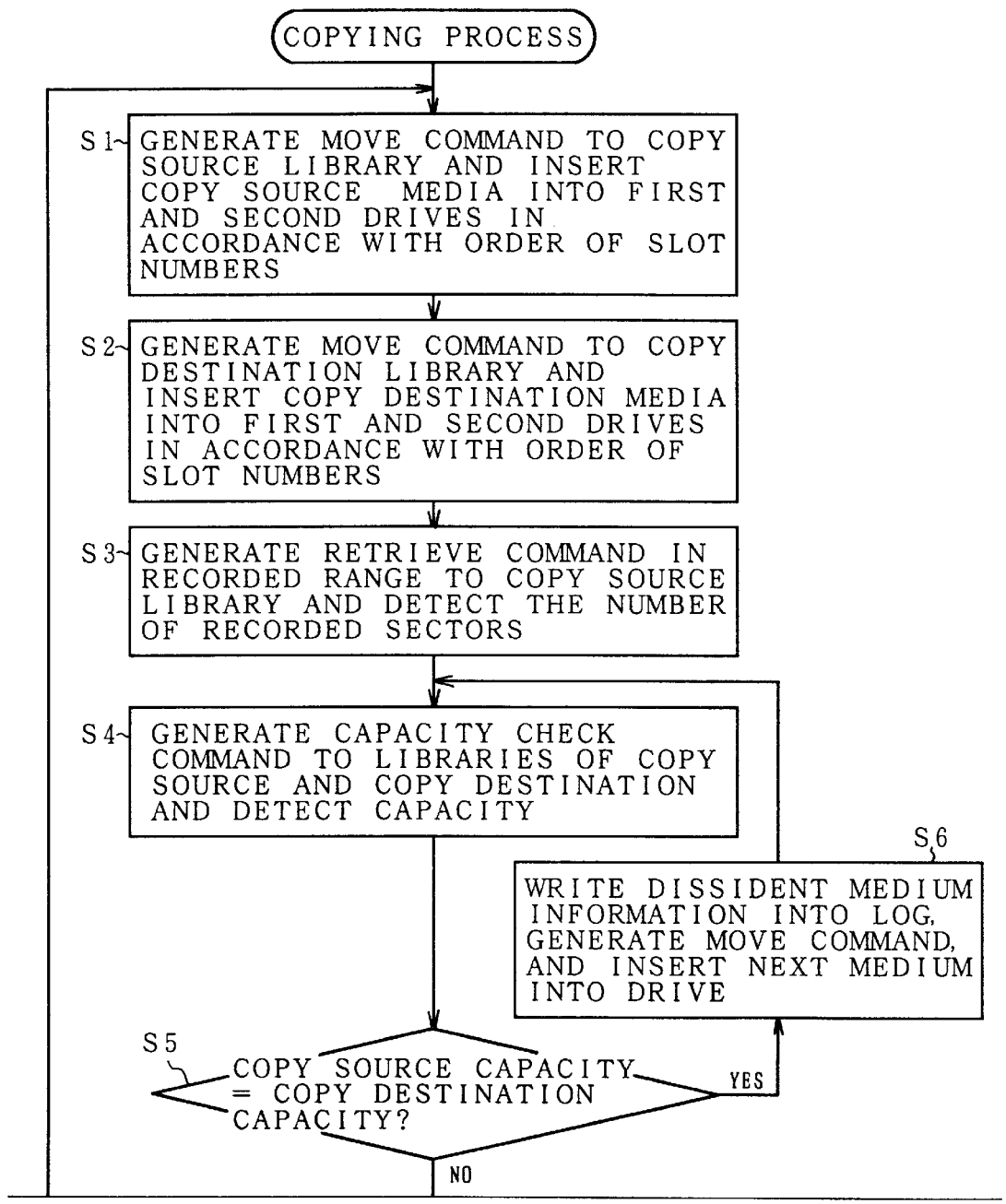

FIGS. 41A and 41B show the copying process recognizing a cartridge recording range of the copy source and relate to a case where the copy source is likewise set to the MO library apparatus and the copy destination is set to the MO library apparatus as an example. First in steps S1 and S2, the move command is issued to each of the MO library apparatuses of the copy source and copy destination and the cartridges are sequentially conveyed and inserted from the slots into the first and second MO drives, respectively. In step S3, a retrieve command of the recorded range is issued to the MO library apparatus of the copy source, thereby detecting, for example, the number of recorded sectors. In step S4, a capacity check command is issued to the MO library apparatuses of the copy source and copy destination and the cartridge capacity is detected. In step S5, a check is made to see if the cartridge capacities of the copy source and the copy destination are equal. When the cartridge capacities are different, medium information of dissidence is written into the log in step S6. After that, the move command is issued and the cartridge to the MO drive is replaced in the MO library apparatus of the copy destination. The processes are repeated until the capacities of the copy source and the copy destination coincide in step S5. When it is determined in step S5 that the capacities of the copy source and the copy destination coincide, step S7 follows and the channel command word CCW for copying is issued and the parallel copying processes of the sector unit are started. If an error occurs during the copying operation, it is discriminated in step S8. The error information is written into the log in step S9. The parallel copying processes of the sector unit are repeated until the writing of the detected sector indicative of the recording contents of the copy source is finished in step S10. When the writing in the recording range of the copy source is finished, the move command is issued in step S11 and the cartridges of the copy source and the copy destination are returned to the original slots. Such processes in steps S1 to S11 are repeated until the copying process of the final slot of the copy destination is finished in step S12. When the copying process of the final slot is finished, a check is made to see if the error information exists in the log in step S13. If YES, a list of the failed media is displayed on the display in step S4 and the series of error processes is finished.

Figure 42A:
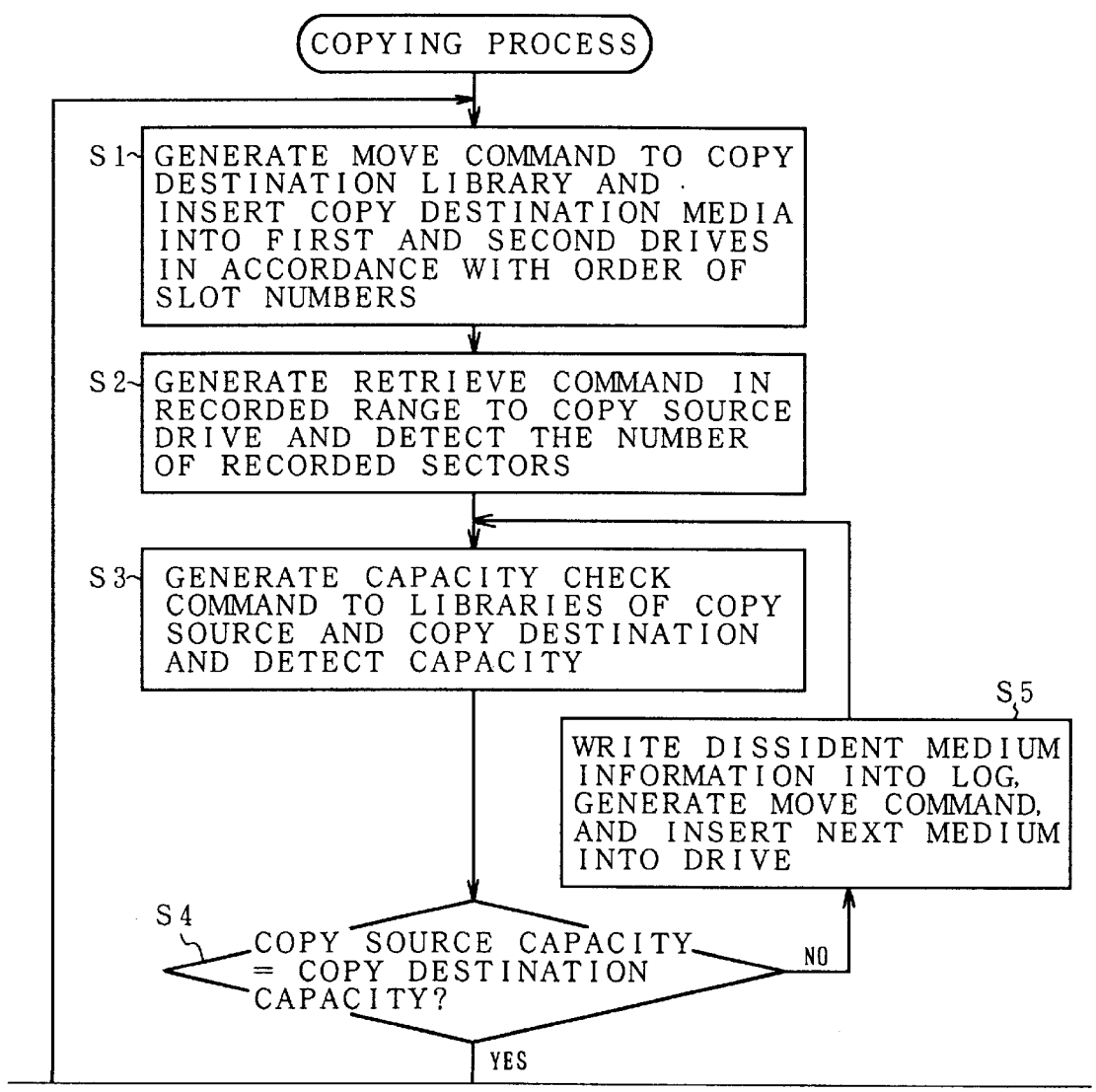
FIGS. 42A and 42B are flowcharts for the copying process in FIG. 41 in which a copy source is set to the MO drive apparatus and a copy destination is set to the MO library apparatus.
Figure 42B:
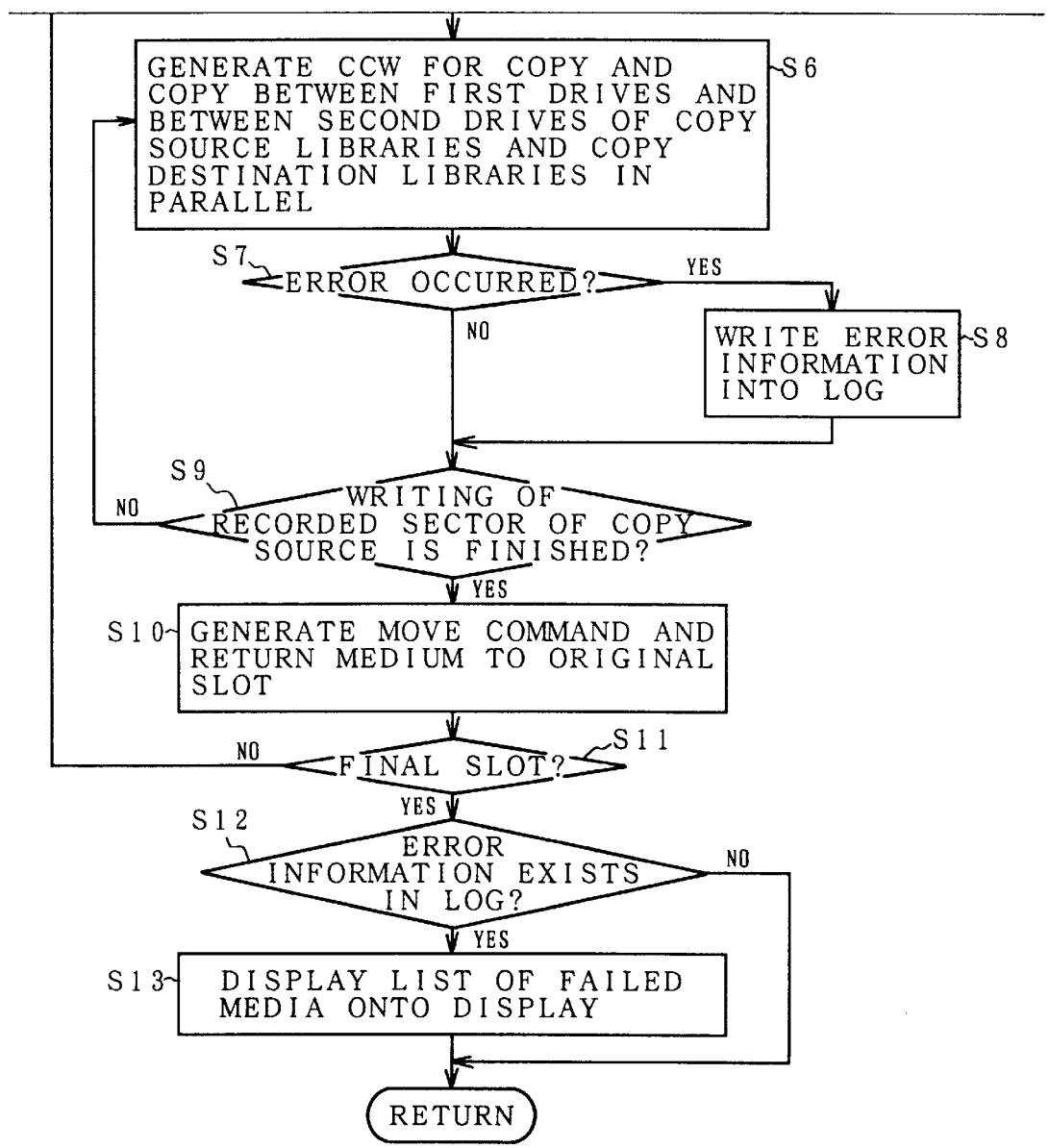

FIGS. 42A and 42B are a flowchart for the copying process recognizing the recording range of the copy source and relate to the copying process in the case where the copy source is set to the MO drive apparatus and the copy destination is set to the MO library apparatus. Even in this case, fundamentally, in a manner similar to the case of the copying process between the MO library apparatuses in FIGS. 41A and 41B, in step S2, the recorded range of the cartridge of the copy source is retrieved and the number of recorded sectors is detected prior to the copying process. In step S9, the copying process is finished by the end of the writing of the number of recorded sectors of the copy source during the copying process. As mentioned above, by performing the copying process recognizing the recording range of the copy source cartridge, the processing time that is required for the copying process can be reduced by only a time corresponding to the non-execution of the copying process in the non-recorded range of the copy source.

[Merge Copying Process]

FIG. 43 shows a merge copying process in which the recorded data of a plurality of cartridges 48-1 to 48-5 provided for the copy source MO library apparatus 16-1 is recorded in a lump into the cartridge 48-11 of the copy destination MO library apparatus 16-2. For example, file data each consisting of 50 MB is recorded as recording ranges 184-1 to 184-5 in the cartridges 48-1 to 48-5 of the copy source MO library apparatus 16-1. The file data is detected before copying and 200 MB is obtained as a total data amount of the copy source. The cartridge capacity is detected as a cartridge 48-11 of the copy destination MO library apparatus 16-2. When it is equal to or larger than the total data amount of 200 MB of the copy source, a merge copying process is executed, thereby merging into one cartridge.

FIGS. 44A and 44B are flowcharts for the merge copying process in FIG. 43. First in step S1, the channel command word is issued to the MO library apparatus 16-1 of the copy source, a plurality of copy source cartridges are designated, and sizes of all data are checked. In step S2, a check is made to see if the capacity is equal to or less than 640 MB as a maximum capacity of the cartridge which can be supported. If the capacity is equal to or less than 640 MB as a cartridge maximum capacity which can be supported, step S3 follows. The copy source cartridges are sequentially inserted into the copy source MO library apparatus 16-1 in accordance with the order of the slot numbers. In step S4, the move command is issued to the MO library apparatus 16-2 of the copy destination, the cartridges are sequentially inserted into the drive in accordance with the order of the slot numbers, and the medium capacities are checked. In step S5, a check is made to see if the copy destination cartridge capacities are equal to or larger than the total data amount of the copy source. When the copy destination cartridge capacity is insufficient, the processing routine is returned to step S6, the move command is issued, and the cartridge of the insufficient capacity is returned to the slot. In step S4, the next cartridge is taken out and the medium capacity is checked. In step S5, when the cartridge capacity of the copy destination of the total data amount of the copy source or more is discriminated, step S7 follows. The channel command word for copying is issued and, in this case, the writing operation is performed on a file unit basis from the copy source cartridge to the copy destination cartridge. When the error generation is discriminated in step S8 during the writing of the file unit, the error information is written into the log in step S9. Until the end of the writing of all files of the copy source in step S10, the writing operation to the copy destination cartridge of the file unit with respect to the copy source cartridge remaining in step S7 is repeated. When the writing of all files of the copy source cartridge is finished, the cartridges of the drives of the MO library apparatuses 16-1 and 16-2 of the copy destination and the copy source are returned to the original slots in step S11. The above processes in steps S3 to S11 are repeated up to the final slot of the MO library apparatus 16-2 of the copy destination in step S12. When the copying processes up to the final slot are finished, a check is made in step S13 to see if there is error information in the log. If YES, a list of the failed media is displayed on the display in step S14 and the series of copying processes is finished. By such a merging process for merging the data stored in the plurality of cartridges of the copy source into one cartridge of the copy destination on a file unit basis and copying, a copy cartridge in which a number of cartridges are merged into one cartridge can be formed. The number of cartridges to be copied by the copying process can be reduced.

[Group Copying Process]

Figure 45:
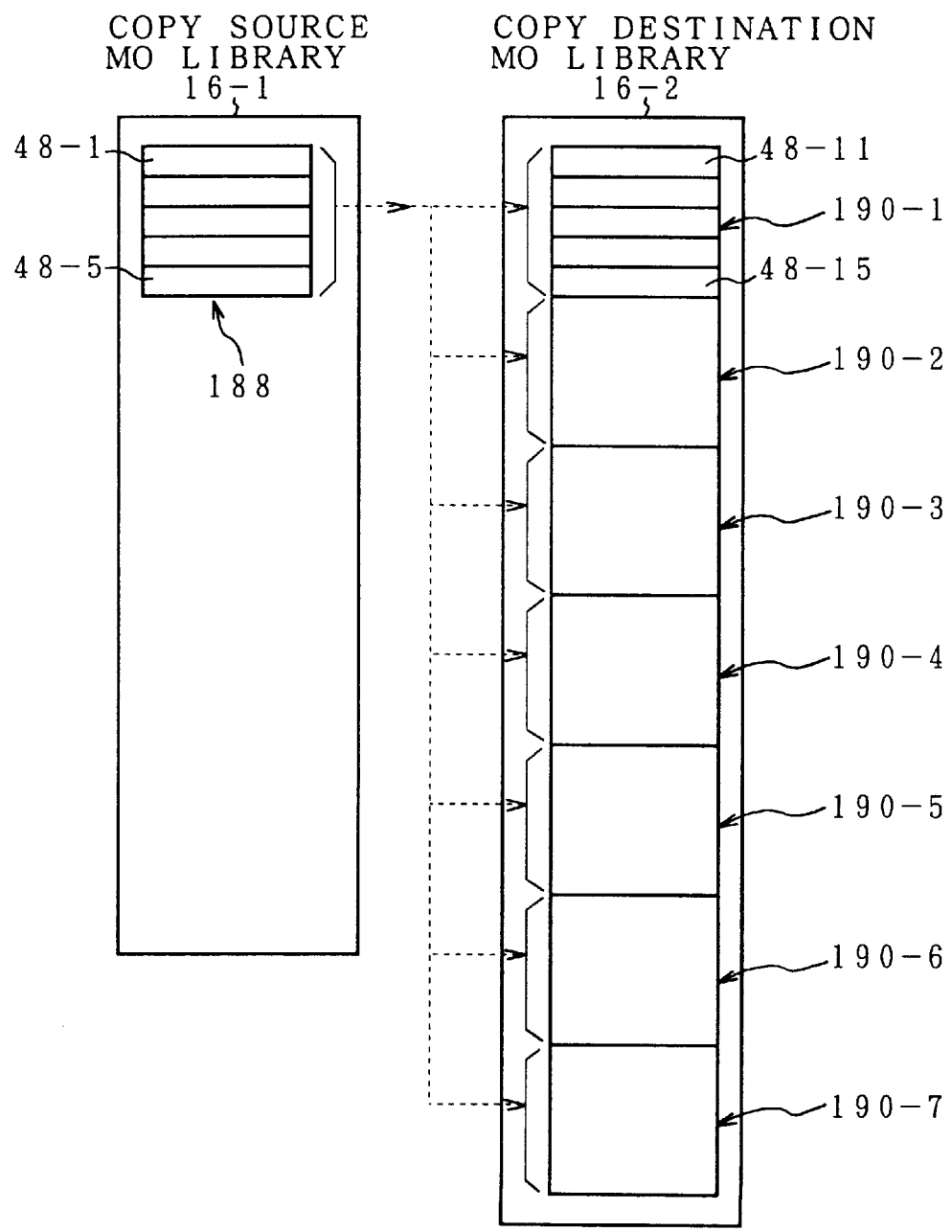
FIG. 45 is an explanatory diagram of a copying process of the invention in which a plurality of copy source media are set to one group and a plurality of groups are copied among the library apparatuses.

FIG. 45 shows a copying process for copying a plurality of groups each comprising a plurality of cartridges of the copy source from the copy source MO library apparatus 16-1 to the copy destination MO library apparatus 16-2. That is, there is a copy source group 188 of five cartridges 48-1 to 48-5 in the MO library apparatus 16-1 of the copy source. The group copying process of seven groups of copy destination groups 190-1 to 190-7 is performed to the cartridges of the MO library apparatus 16-2 of the copy destination on a copy group 188 unit basis.

Figure 46:
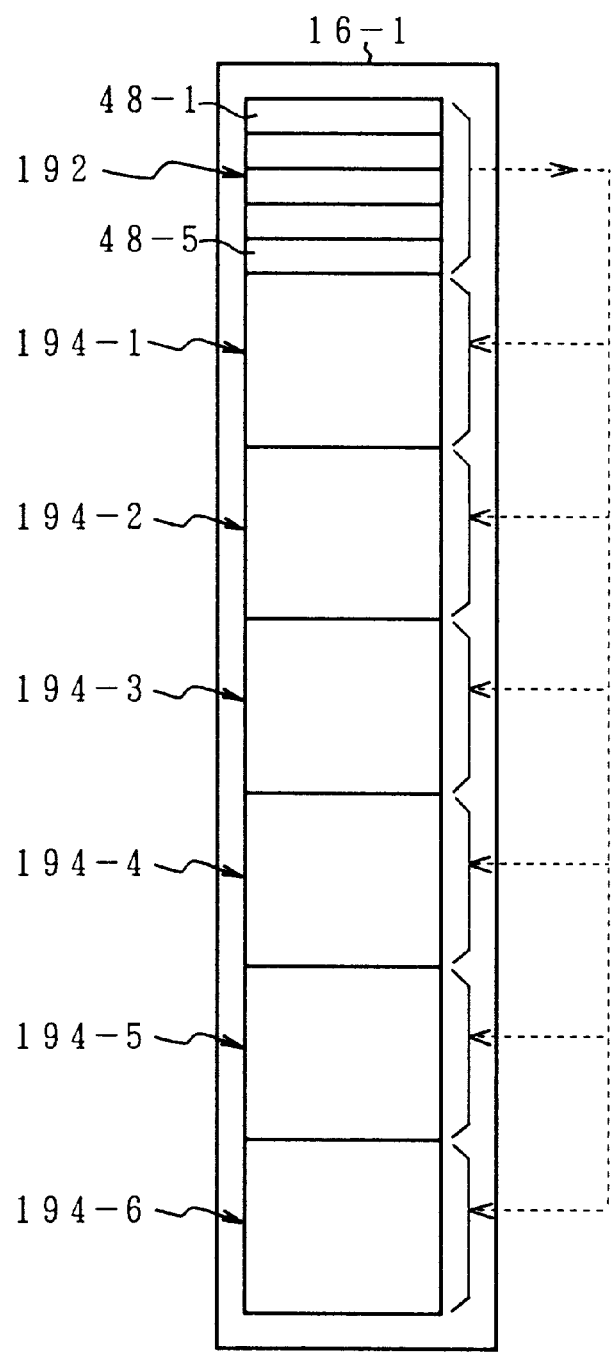
FIG. 46 is an explanatory diagram of a copying process of the invention in which a plurality of copy source media are set to one group and a plurality of groups are copied in the library apparatus.

FIG. 46 shows another embodiment of a group copy according to the invention and is characterized in that a group copy is performed in the MO library apparatus. That is, with respect to total 35 cartridges enclosed in the MO library apparatus 16-1, for example, five head cartridges 48-1 to 48-5 are set to a copy source group 192 and copy destination groups 194-1 to 194-6 are constructed with respect to the remaining 30 cartridges, thereby performing the group copy. The group copy in the same MO library apparatus 16-1 in FIG. 46 can be realized by constructing in a manner such that the MO library apparatus which is used in the invention has two drives of the first MO drive 32 and the second MO drive 34 as shown in FIG. 4.

Figure 47:
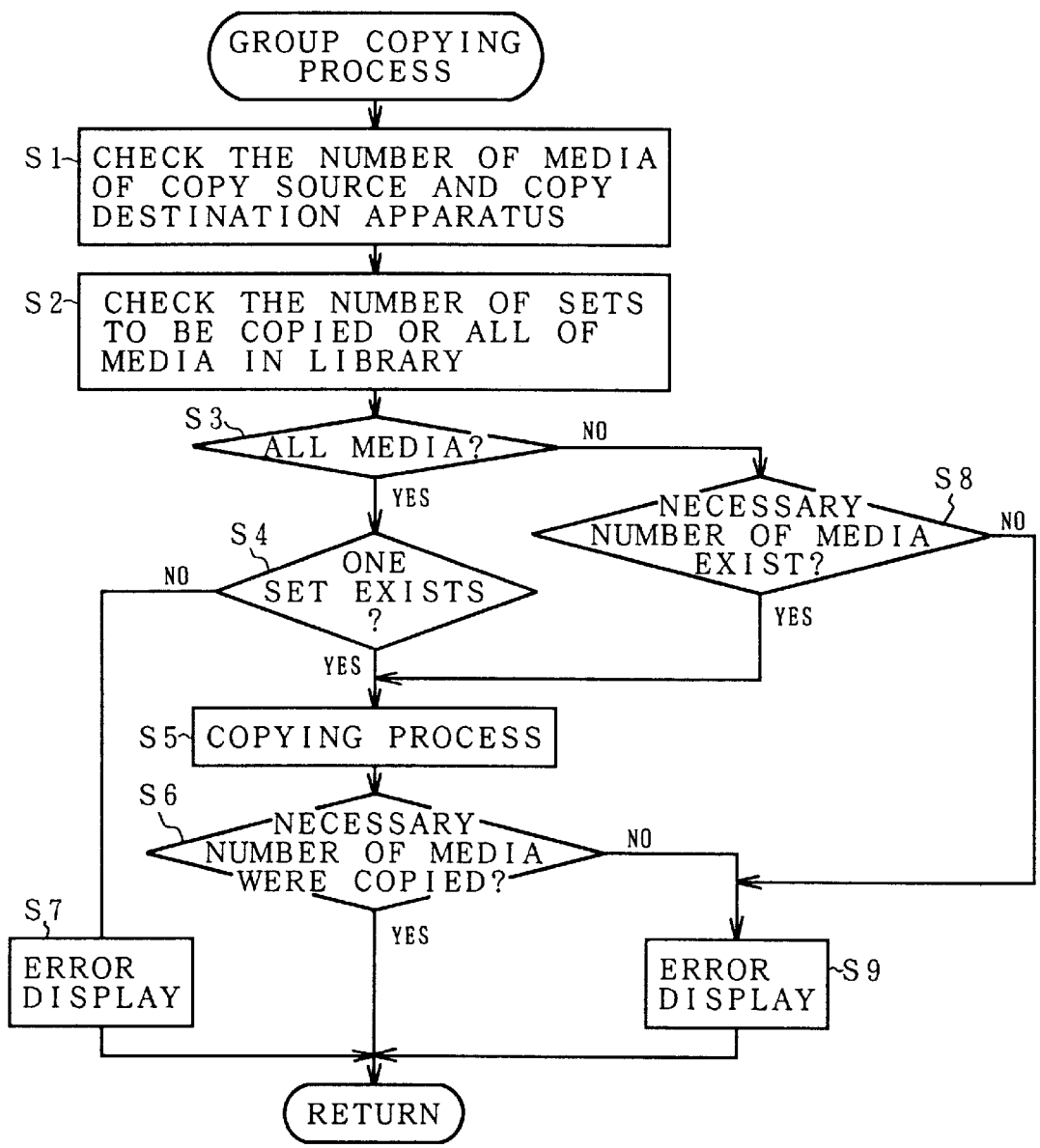
FIG. 47 is a flowchart for the copying process in FIGS. 45 and 46.

FIG. 47 is a flowchart for a group copying process in FIGS. 45 and 46. First in step S1, the number of cartridges of the copy source and the copy destination apparatus are checked. Upon examination of the copy destination apparatus, whether the group copy is executed between the different MO library apparatuses in FIG. 45 or in the same MO library apparatus in FIG. 46 is checked. In step S2, the number of sets (the number of groups) to be copied as copy destinations is checked or whether all of the cartridges in the MO library apparatus serving as a copy destination are set to the copy destinations or not is discriminated. In step S3, a check is made to see if the copy destination is set to all of the cartridge media. If YES, a check is made in step S4 to see if there are the copy destination cartridges of one set, namely, one group. If YES, the group copy is performed in step S5. By the copying process, a check is made in step S6 to see if the media of the necessary number have been copied. If YES, the processing routine is normally finished. When the copy destination cartridges of one set don't exist in step S4, an error is displayed in step S7. When the media of the necessary number cannot be copied in step S6 as well, an error is displayed in step S9. On the other hand, when the copy destination is not set to all of the cartridge media but the number of sets to be copied is designated in step S3, step S8 follows and a check is made to see if the necessary number of cartridges exist on the copy destination side. If YES, step S5 follows and the group copy is performed. When it is determined in step S8 that the necessary number of cartridges don't exist, an error is displayed in step S9. A plurality of cartridges of the copy source are set to one group and the copying process is performed on a group unit basis. Thus, there is no need to carry out the works of the user for copying the cartridges of the copy source of the necessary number one by one and, thereafter, sorting the copied cartridges, and merging on a group unit basis. The copying process in which a plurality of cartridges are grouped can be efficiently performed.

According to the invention as mentioned above, by mouse-clicking the check region for confirmation of the apparatus provided in the apparatus graphics on the operation picture plane of the copying process, the display lamps of the actual MO library apparatus and MO drive apparatus flicker and respond. It is unnecessary for the user to confirm the ID or the like of the device bus of the apparatus and to refer to an environment set file or the like on the copying processing side. The apparatuses on the operation picture plane and the environment of the apparatuses serving as copy sources and copy destinations can be easily recognized. An operability when the medium is inserted and extracted in the copying process can be remarkably improved. By providing the operating function for connection and disconnection of the system for the apparatus graphics on the apparatus constructing picture plane, an arbitrary software-like system form can be realized as necessary within the range of the installed state of the apparatuses. The system form of the copying process can be arbitrarily changed as necessary without changing the actual hardware connection. A degree of freedom of the system form of the copying process can be remarkably improved. With respect to the setting of the copy information that is necessary for the copying process, for example, by merely selecting the apparatus of the copy source, a system form as a copy mode to decide the optimum correspondence relation between the copy source and the copy destination suitable for the system form at that time can be automatically provided. Even if the numbers of MO drive apparatuses and MO library apparatuses which are used for the copying process increase, the user can execute the copying process by the system form of the optimum copy mode by merely simply designating the copy source apparatus. By preparing the copy information set picture plane that is necessary for the copying process, the user freely sets the correspondence relation between the copy source and the copy destination and the copying process of a high degree of freedom can be realized. Further, as copying processes, by providing forms of various copying processes such as copying process in which the medium capacities of the copy source and the copy destination are made coincide, copying process in which the medium capacities are made coincide by checking the medium capacities of the copy source and the copy destination, copying process in which the difference between the medium capacities on the assumption that the medium capacity of the copy destination is equal to or larger than the medium capacity of the copy source as a prerequisite condition is allowed, a copying process excluding an unrecording range where a recording range of the copy source is recognized, a merge copying process in which the whole data amount of a plurality of media of the copy source is examined and they are merged to one medium of the copy destination and the copying process is performed, and group copying process in which a plurality of media of the copy source are set to one group and the copying process is performed on a group unit basis, even if the medium capacities differ and the media of different capacities mixedly exist, the optimum copying process is efficiently performed, the processing time that is required for the copying process is reduced as much as possible, and an efficient copying process can be realized.

Although the above embodiments relate to the cases of the maximum construction comprising four MO drive apparatuses and eight MO library apparatuses as an example, a scale of the apparatus construction is not limited to the embodiments but can be properly determined as necessary. Although the above embodiments relate to the apparatus construction having therein the two MO drives as MO library apparatuses as an example, it will be obviously understood that the MO library apparatus having therein one MO drive can be also used. Further, the capacities of the MO cartridge which are used in the invention are not limited by the values shown in the embodiments.

Further, although the above embodiment has been described with respect to the MO drive apparatuses and MO library apparatuses as an example, the invention can be also applied as it is to drive apparatuses and library apparatuses using other replaceable media such as floppy disks, magnetic tapes, and the like. The invention can be also applied to a system in which drive apparatuses and library apparatuses using other replaceable media such as floppy disks, magnetic tapes, and the like are combined to the MO drive apparatuses and MO library apparatuses.

What is claimed is:

1. A storage system, comprising:
   at least one drive unit processing a single replaceable medium;
   at least one library unit having a medium enclosing unit in which a plurality of replaceable media are enclosed, a drive unit optically accessing the medium, and an accessor conveying the medium between said medium enclosing unit and said drive unit;

device buses of at least one system which are pulled out from an upper unit and connect said at least one drive unit and said at least one library unit as storage units;

a copy processing module, provided for said upper unit, copying storage contents of the medium of the storage unit of a preset copy source to the medium of the storage unit of a preset copy destination; and a confirmation processing module provided for said upper unit and constructed as unit graphics of said at least one storage unit, accessing targets of said copy processing module, are arranged and displayed on a picture plane, and when a check region corresponding to each of said unit graphics is instructed and operated on the picture plane, a check command is sent to each corresponding storage unit, executing an output operation allowing an operator to confirm that each corresponding unit is installed on the system.

2. The system according to claim 1, wherein said confirmation processing module drives a display lamp of said unit, allowing the operator to confirm the corresponding unit.

3. The system according to claim 1, wherein said confirmation processing module drives an acoustic unit of said target unit, allowing the operator to confirm the corresponding unit.

4. The system according to claim 2, wherein said confirmation processing module drives an accessor of said library unit, allowing the operator to confirm the corresponding unit.

5. The system according to claim 1, further comprising:

a system construction control module deciding a system construction by a system connection and a system disconnection of an arbitrary storage unit according to the necessity by operations of a connection instructing region to connect to a system provided for said unit graphics and a disconnection instructing region to disconnect from the system; and a copy information setting module setting copy information necessary to access said copy processing module for the system construction determined by said system construction control module as a target.

6. The system according to claim 5, wherein said copy information setting module automatically decides a copy source and a copy destination by the system construction determined by said system construction control module and sets the copy information.

7. The system according to claim 6, wherein said copy information setting module is constructed such that:

in case of a system construction in which at least one drive unit and at least one for a library unit is connected to one bus system, said drive unit is automatically set to the copy source and the at least one library unit is automatically set to the copy destinations;

in case of a system construction in which there is one drive unit and at least one library unit connected to a same bus system, said drive unit is automatically set to the copy source and the at least one library unit is automatically set to the copy destinations;

in case of a system construction in which one drive unit is provided for a plurality of bus systems and at least one of library unit is connected to each bus system, for every said bus system, the drive unit is automatically set to the copy source and the at least one library unit is automatically set to the copy destinations; and in case of a system construction in which only a plurality of library units are connected to different bus systems, the library unit of a predetermined specified bus is automatically set to the copy source and all of said other library units are automatically set to the copy destinations.

8. The system according to claim 7, wherein in the case where the library unit is set as a copy destination unit, said copy information setting module sets all of the media enclosed in said library unit into the copy destination medium.

9. The system according to claim 5, wherein said copy information setting module arbitrarily sets the copy source unit and the copy destination unit as necessary for the system construction, as a target, set by said system construction control module by using a copy information set picture plane.

10. The system according to claim 9, wherein in the case where the copy source unit is not designated by using the copy information set picture plane, said copy information setting module automatically sets a predetermined specified drive unit or library unit into the copy source unit.

11. The system according to claim 8, wherein in the case where the copy destination unit is not designated by using the copy information set picture plane, said copy information setting module automatically sets the at least one library unit excluding the copy source unit to the copy destination unit.

12. The system according to claim 5, wherein said copy information setting module further arbitrarily sets as necessary whether a copy is a copy in a group or a copy over the group with respect to the number of media of the copy source, the number of media of the copy destination, and a unit group divided every bus system by using a copy information set picture plane.

13. The system according to claim 12, wherein in the case where the copy destination is an library unit and the number of media of the copy destination is not set, said copy information setting module automatically sets all of the media of said library unit into a copy destination medium.

14. The system according to claim 12, wherein in the case where a medium of a capacity different from that of the copy destination medium is included in the copy source medium, said copy processing module copies into the copy destination medium of the same capacity.

15. The system according to claim 14, wherein said copy processing module is constructed such that a copying process from the copy source medium to the copy destination medium is repeated on a sector unit basis, a dummy copy of one sector is further executed after completion of the copy of a final sector of the copy source medium, when an error occurs by said dummy copy, it is determined that capacities of the copy source medium and the copy destination medium are equal, so that the copying process is normally finished, and when the dummy copy could normally be performed, it is decided that the capacities are different, error information is recorded, and the processes are finished.

16. The system according to claim 1, wherein when the copy is performed from the copy source unit to the copy destination unit, said copy processing module reads a capacity of the copy destination medium and the copy is executed to only the copy destination medium of the same capacity.

17. The system according to claim 1, wherein in the case where a medium of a capacity different from that of the copy source medium is included in the copy destination medium, said copy processing module copies to the copy destination medium of a capacity which is equal to or larger than that of the copy source medium.

18. The system according to claim 17, wherein said copy processing module is constructed such that the copying process from the copy source medium to the copy destination medium is repeated on a sector unit basis, when an error occurs for an interval of time up to the copy of the final sector of the copy source medium, it is determined that a capacity is insufficient, error information is recorded and finished, and when the copy is performed up to the final sector of the copy source medium, it is determined that a capacity of the copy destination medium is equal to or larger than the capacity of the copy source medium, and the copying process is normally finished.

19. The system according to claim 1, wherein said copy processing module previously reads a data recording region of the copy source medium and recognizes and copies only the recognized recording region to the copy destination medium.

20. The system according to claim 1, wherein said copy processing module is constructed such that data recording regions of a plurality of copy source media are previously read, a whole data amount of the copy sources is recognized, the copy destination medium is previously read, a capacity is recognized, and when the capacity of the copy destination medium is equal to or larger than the whole data amount of the copy sources, the data is copied in a lump from said plurality of copy source media to one copy destination medium.

21. The system according to claim 1, wherein said copy processing module sets a plurality of copy source media to one group and copies to the copy destination media of a plurality of groups.

22. The system according to claim 21, wherein said copy processing module sets a plurality of copy source media into one group for a plurality of media in a same library unit as targets and copies to the copy destination media of a plurality of groups.

23. The system according to claim 1, wherein said library unit has at least two drive units, and in the case where said at least one library unit is set to the copy destination, said copy processing module sequentially transfers copy data read out from the medium of the copy source unit to said two drive units provided for said library unit and writes to the media of the copy destinations in parallel.

24. The system according to claim 1, wherein said plurality of media include magnetooptic cartridge media of 230 MB, 540 MB, and 640 MB which are detachable for the storing unit enclosed in a cartridge.

25. A storage medium in which a copy processing program used in a storage system is stored, said storage medium comprising:

at least one drive unit processing a single replaceable medium;

at least one library unit having a medium enclosing unit in which a plurality of replaceable media are enclosed, a drive unit optically accessing the medium, and an accessor conveying the medium between said medium enclosing unit and said drive unit; and device buses of at least one system which is pulled out from an upper unit and connect said drive unit and a library unit as storage units, wherein said copy processing program includes:

a copy processing module installed in said upper unit and copying storage contents of the medium of the storage unit of a preset copy source to the medium of the storage unit of a preset copy destination; and a confirmation processing module installed in said upper unit and constructed as unit graphics of said at least one storage unit accessing targets of said copy processing modules is arranged and displayed on a picture plane, and when a check region corresponding to each of said unit graphics is instructed and operated on the picture plane, a check command is sent to each corresponding storage unit, executing an output operation allowing an operator to confirm that each corresponding unit is installed on the system.

26. A storage system comprising:

at least one drive unit processing a single replaceable medium;

at least one library unit having a medium enclosing unit in which replaceable media are enclosed, a drive unit accessing the medium, and an accessor conveying the medium between said medium enclosing unit and said drive unit;

device buses of at least one system which is pulled out from an upper unit and connect said drive unit and a library unit as storage units;

a copy processing module, provided for said upper unit, copying storage contents of the medium of the storage unit of a preset copy source to the medium of the storage unit of a preset copy destination; and a confirmation processing module provided for said upper unit and constructed as unit graphics of said at least one storage unit, accessing targets of said copy processing module, is arranged and displayed on a picture plane, and when a check region corresponding to each of said unit graphics is instructed and operated on the picture plane, a check command is sent to each corresponding storage unit, executing an output operation allowing an operator to confirm that each corresponding unit is installed on the system.

27. The system according to claim 26, wherein said confirmation processing module drives a display lamp of said target unit, allowing the operator to confirm the corresponding unit.

28. The system according to claim 26, wherein said confirmation processing module drives an acoustic unit of said target unit, allowing the operator to confirm the corresponding unit.

29. The system according to claim 27, wherein said confirmation processing module drives an accessor of said library unit, allowing the operator to confirm the corresponding unit.

30. The system according to claim 26, further comprising:

a system construction control module deciding a system construction by a system connection and a system disconnection of an arbitrary storage unit according to the necessity by operations of a connection instructing region to connect to a system provided for said unit graphics and a disconnection instructing region to disconnect from the system; and a copy information setting module setting copy information necessary to access said copy processing module for the system construction determined by said system construction control module as a target.

31. The system according to claim 30, wherein said copy information setting module automatically decides a copy source and a copy destination by the system construction determined by said system construction control module and sets the copy information.

32. The system according to claim 31, wherein said copy information setting module is constructed such that:

in case of a system construction in which one drive unit and at least one library unit is connected to one bus system, said drive unit is automatically set to the copy source and said at least one library unit is automatically set to the copy destinations;

in case of a system construction in which there is one drive unit and at least one library unit connected to a same bus system, said drive unit is automatically set to the copy source and said at least one library unit is automatically set to the copy destinations;

in case of a system construction in which one drive unit is provided for a plurality of bus systems and at least one library unit is connected to each bus system, for every said bus system, the drive unit is automatically set to the copy source and said at least one library unit is automatically set to the copy destinations; and in case of a system construction in which only a plurality of library units are connected to different bus systems, the library unit of a predetermined specified bus is automatically set to the copy source and all of said other library units are automatically set to the copy destinations.

33. The system according to claim 32, wherein in the case where the library unit is set as a copy destination unit, said copy information setting module sets all of the media enclosed in said library unit into the copy destination medium.

34. The system according to claim 30, wherein said copy information setting module arbitrarily sets the copy source unit and the copy destination unit as necessary for the system construction, as a target, set by said system construction control module by using a copy information set picture plane.

35. The system according to claim 34, wherein in the case where the copy source unit is not designated by using the copy information set picture plane, said copy information setting module automatically sets a predetermined specified drive unit or library unit into the copy source unit.

36. The system according to claim 33, wherein in the case where the copy destination unit is not designated by using the copy information set picture plane, said copy information setting module automatically sets all of the library units excluding the copy source unit to the copy destination unit.

37. The system according to claim 30, wherein said copy information setting module further arbitrarily sets as necessary whether a copy is a copy in a group or a copy over the group with respect to the number of media of the copy source, the number of media of the copy destination, and a unit group divided every bus system by using a copy information set picture plane.

38. The system according to claim 37, wherein in the case where the copy destination is a library unit and the number of media of the copy destination is not set, said copy information setting module automatically sets all of the media of said library unit into a copy destination medium.

39. The system according to claim 37, wherein in the case where a medium of a capacity different from that of the copy destination medium is included in the copy source medium, said copy processing module copies into the copy destination medium of the same capacity.

40. The system according to claim 39, wherein said copy processing module is constructed such that a copying process from the copy source medium to the copy destination medium is repeated on a sector unit basis, a dummy copy of one sector is further executed after completion of the copy of a final sector of the copy source medium, when an error occurs by said dummy copy, it is determined that capacities of the copy source medium and the copy destination medium are equal, so that the copying process is normally finished, and when the dummy copy could normally be performed, it is decided that the capacities are different, error information is recorded, and the processes are finished.

41. The system according to claim 26, wherein when the copy is performed from the copy source unit to the copy destination unit, said copy processing module reads a capacity of the copy destination medium and the copy is executed to only the copy destination medium of the same capacity.

42. The system according to claim 26, wherein in the case where a medium of a capacity different from that of the copy source medium is included in the copy destination medium, said copy processing module copies to the copy destination medium of a capacity which is equal to or larger than that of the copy source medium.

43. The system according to claim 42, wherein said copy processing module is constructed such that the copying process from the copy source medium to the copy destination medium is repeated on a sector unit basis, when an error occurs for an interval of time up to the copy of the final sector of the copy source medium, it is determined that a capacity is insufficient, error information is recorded and finished, and when the copy is performed up to the final sector of the copy source medium, it is determined that a capacity of the copy destination medium is equal to or larger than the capacity of the copy source medium, and the copying process is normally finished.

44. The system according to claim 26, wherein said copy processing module previously reads a data recording region of the copy source medium and recognizes and copies only the recognized recording region to the copy destination medium.

45. The system according to claim 26, wherein said copy processing module is constructed such that data recording regions of a plurality of copy source media are previously read, a whole data amount of the copy sources is recognized, the copy destination medium is previously read, a capacity is recognized, and when the capacity of the copy destination medium is equal to or larger than the whole data amount of the copy sources, the data is copied in a lump from said plurality of copy source media to one copy destination medium.

46. The system according to claim 26, wherein said copy processing module sets a plurality of copy source media to one group and copies to the copy destination media of a plurality of groups.

47. The system according to claim 46, wherein said copy processing module sets a plurality of copy source media into one group for a plurality of media in a same library unit as targets and copies to the copy destination media of a plurality of groups.

48. The system according to claim 26, wherein
said library unit has at least two drive units, and
in the case where said at least library unit is set to the copy destination, said copy processing module sequentially transfers copy data read out from the medium of the copy source unit to said two drive units provided for said library unit and writes to the media of the copy destinations in parallel.

49. A storage method, comprising:
processing a single replaceable medium;
enclosing an enclosing unit in which replaceable media are enclosed, optically accessing the medium using a drive unit, and conveying the medium between said enclosing unit and said drive unit;
connecting said drive unit and a library unit as storage units;

copying storage contents of the medium of the storage unit of a preset copy source to the medium of the storage unit of a preset copy destination; and arranging and displaying a confirmation processing module constructed as unit graphics, accessing targets of the storage contents, and when a check region corresponding to each of said unit graphics is instructed and operated on a picture plane, sending a check command to the corresponding storage unit, executing an output operation allowing an operator to confirm that each corresponding unit is installed in the system.

50. A storage system, comprising:

at least one drive unit processing replaceable media;

at least one library unit connected to said drive unit as a storage unit;

a copy processing module, copying contents of the medium of the storage unit of a copy source to the medium of the storage unit of a copy destination; and a confirmation processing module constructed as unit graphics of said at least one storage unit, accessing targets of said copy processing module, are arranged and displayed on a picture plane, and when a check region corresponding to each of said unit graphics is instructed and operated on the picture plane, a check command is sent to each corresponding storage unit, executing an output operation allowing an operator to confirm that each corresponding unit is installed on the system.

51. A storage method, comprising:

processing replaceable media using a drive unit;

connecting said drive unit and a library unit as storage units;

copying storage contents of the medium of the storage unit of a copy source to the medium of the storage unit of a copy destination; and arranging and displaying a confirmation processing module constructed as unit graphics, accessing targets of the storage contents, and when a check region corresponding to each of said unit graphics is instructed and operated on a picture plane, sending a check command to the corresponding storage unit, executing an output operation allowing an operator to confirm that each corresponding unit is installed in the system.

* * * * *

UNITED STATES PATENT AND TRADEMARK OFFICE
CERTIFICATE OF CORRECTION

PATENT NO.:     6,014,352
DATED     :     January 11, 2000
INVENTOR(S):    Hiromi KUBOTA, et al.

It is certified that [an/error[s]] appears in the above-identified patent and that said Letters Patent is hereby corrected as shown below:

Col. 31., line 22, insert --target-- after "said".

Col. 34, line 3, insert --,-- after "unit" and line 4, insert--,-- after "modules".

Signed and Sealed this

Fifth Day of December, 2000

*Attest:*

Q. TODD DICKINSON

*Attesting Officer*       *Director of Patents and Trademarks*